US011323277B2

(12) United States Patent
Atarius et al.

(10) Patent No.: US 11,323,277 B2
(45) Date of Patent: *May 3, 2022

(54) MISSION CRITICAL VIDEO IDENTIFIER FOR MISSION CRITICAL VIDEO POLICIES

(71) Applicant: Ofinno, LLC, Reston, VA (US)

(72) Inventors: Roozbeh Atarius, La Jolla, CA (US); Esmael Dinan, McLean, VA (US)

(73) Assignee: Ofinno, LLC, Reston, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/098,591

(22) Filed: Nov. 16, 2020

(65) Prior Publication Data

US 2021/0067357 A1 Mar. 4, 2021

Related U.S. Application Data

(63) Continuation of application No. 16/707,287, filed on Dec. 9, 2019, now Pat. No. 10,841,110, which is a continuation of application No. 16/284,213, filed on Feb. 25, 2019, now Pat. No. 10,505,746, which is a continuation of application No. 15/621,183, filed on Jun. 13, 2017, now Pat. No. 10,218,520.

(Continued)

(51) Int. Cl.

| | |
|---|---|
| ***H04L 12/14*** | (2006.01) |
| ***H04L 41/5067*** | (2022.01) |
| ***H04M 15/00*** | (2006.01) |
| ***H04W 72/04*** | (2009.01) |
| ***H04W 4/24*** | (2018.01) |

(52) U.S. Cl.

CPC ...... *H04L 12/1432* (2013.01); *H04L 12/1407* (2013.01); *H04L 41/5067* (2013.01); *H04M 15/61* (2013.01); *H04M 15/66* (2013.01); *H04W 4/24* (2013.01); *H04W 72/0446* (2013.01)

(58) Field of Classification Search

None

See application file for complete search history.

(56) References Cited

U.S. PATENT DOCUMENTS

2013/0236914 A1 9/2013 Wagner et al.
2014/0078899 A1 3/2014 Zhou (Continued)

OTHER PUBLICATIONS

3GPP TS 24.334 V13.2.0 (Dec. 2015), Technical Specification, 3rd Generation Partnership Project; Technical Specification Group Core Network and Terminals; Proximity-services (ProSe) User Equipment (UE) to ProSefunction; protocol aspects; Stage 3, (Release 13), Valbonne, France.

(Continued)

*Primary Examiner* — Said M Elnoubi

(74) *Attorney, Agent, or Firm* — Sachin Kandhari; Kavon Nasabzadeh; Jacob L. Mangan

(57) ABSTRACT

A policy control function device receives, from a mission critical video (MCVideo) application function, a DIAMETER AA-Request (AAR) command. The DIAMETER AAR command comprise: an attribute value pair (AVP) comprising an MCVideo-identifier identifying an MCVideo service; and a quality of service (QoS) parameter indicating a QoS of the MCVideo service. A Diameter command comprising one or more QoS policies based on the MCVideo-identifier and the QoS parameter is sent to a network function.

20 Claims, 30 Drawing Sheets

Related U.S. Application Data

(60) Provisional application No. 62/350,083, filed on Jun. 14, 2016.

(56) References Cited

U.S. PATENT DOCUMENTS

| | | | | |
|---|---|---|---|---|
| 2015/0264359 | A1 | 9/2015 | Vanam et al. | |
| 2015/0365963 | A1 | 12/2015 | Won et al. | |
| 2016/0330647 | A1 * | 11/2016 | Iwai | H04L 12/1407 |

OTHER PUBLICATIONS

3GPP TS 24.379 V1.2.1 (Feb. 2016), Technical Specification, 3rd Generation Partnership Project; Technical Specification Group Core Networks and Terminals; Mission Critical Push To Talk (MCPTT) call control Protocol specification (Release 13).

3GPP TS 24.380 V 13.0.2 Release 13, LTE; Mission Critical Push to Talk (MCPTT) media Plane Control; Protocol Specification, May 2016.

3GPP TS 24.380 V1.2.1 (Feb. 2016), Technical Specification, 3rd Generation Partnership Project; Technical Specification Group Core Network and Terminals, Mission Critical Push To Talk (MCPTT) media plane control; Protocol specification, (Release 13).

3GPP TS 24.383 V0.5.0 (Feb. 2016), Technical specification, 3rd Generation Partnership Project; Technical Specification Group Core Network and Terminals; Mission Critical Push To Talk (MCPTT) Management Object(MO), (Release 13).

The Internet Engineering Task Force (IETF), RFC 4566, SDP: Session Description Protocol, (Jul. 2006).

* cited by examiner

Transmit, from a wireless device to a network server, a media employing an EPS bearer corresponding to QoS parameter(s), wherein the wireless device comprises an audio state related to the media
2910

Modify the QoS parameter(s) of the media in response to a change of the audio state of the wireless device
2920

MISSION CRITICAL VIDEO IDENTIFIER FOR MISSION CRITICAL VIDEO POLICIES

CROSS-REFERENCE TO RELATED APPLICATIONS

This application is a continuation of U.S. patent application Ser. No. 16/707,287, filed Dec. 9, 2019, which is a continuation of U.S. patent Ser. No. 16/284,213, filed Feb. 25, 2019, (now patent Ser. No. 10/505,746, issued Dec. 10, 2019), which is a continuation of U.S. patent application Ser. No. 15/621,183, filed Jun. 13, 2017, (now U.S. Pat. No. 10,218,520, issued Feb. 26, 2019), which claims the benefit of U.S. Provisional Application No. 62/350,083, filed Jun. 14, 2016, which is hereby incorporated by reference in its entirety.

BRIEF DESCRIPTION OF THE SEVERAL VIEWS OF THE DRAWINGS

Examples of several of the various embodiments of the present invention are described herein with reference to the drawings.

DETAILED DESCRIPTION OF EMBODIMENTS

Figure 1:
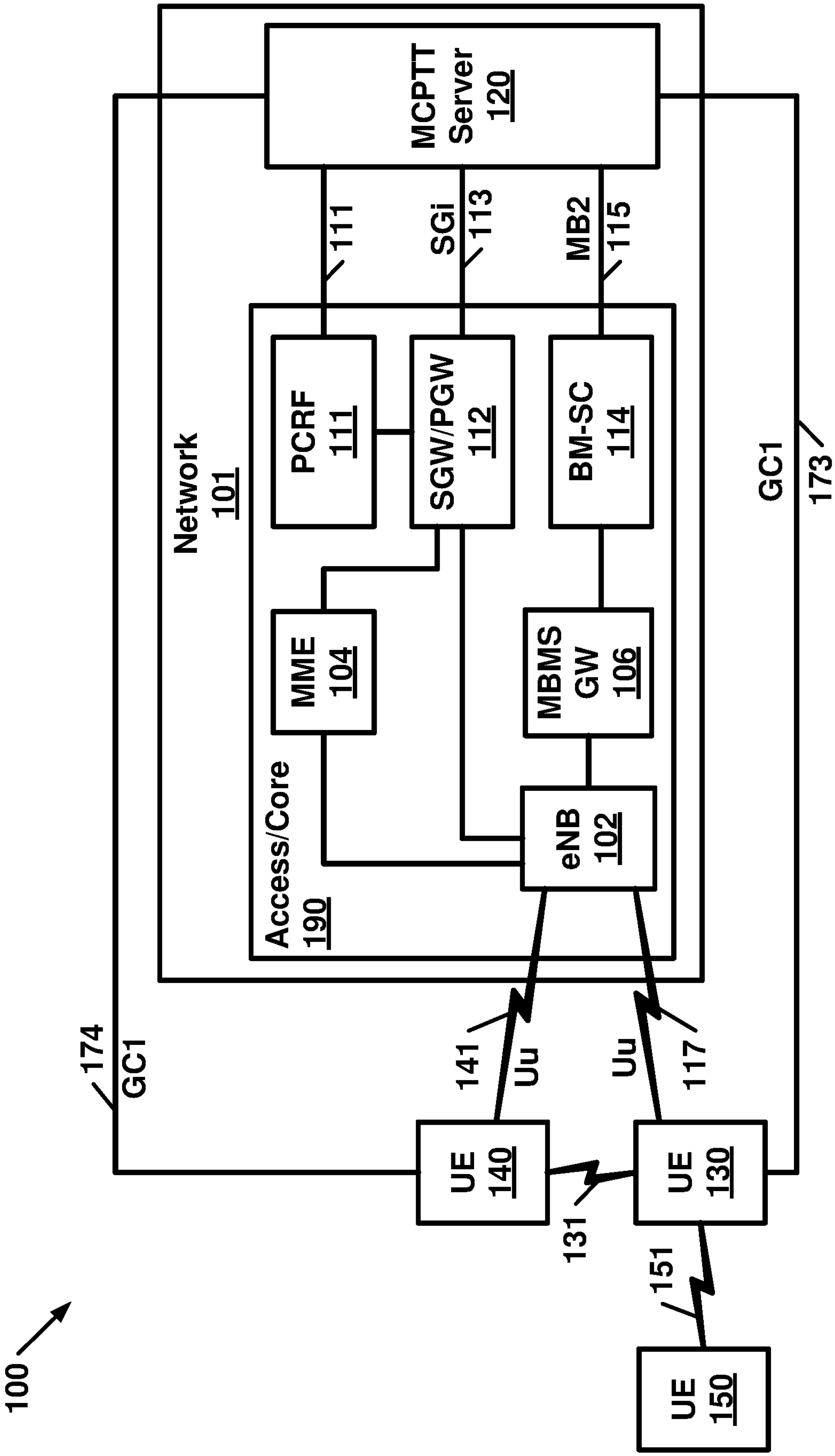
FIG. 1 illustrates a block diagram of an example system according to various embodiments.

Example embodiments are generally directed to critical communication service (e.g., MCPTT/MCVIDEO/MC-DATA/VIDEO) that may involve use of wireless mobile telecommunication cellular and/or wireless mobile broadband technologies. Wireless mobile broadband technologies may include wireless technologies suitable for use with wireless devices and/or user equipment (UE), such as one or more third generation (3G), fourth generation (4G) or fifth generation (5G) wireless standards, revisions, progeny and variants. Examples of wireless mobile broadband technologies may include without limitation any of the Institute of Electrical and Electronics Engineers (IEEE) 802.16m and 802.16p standards, 3rd Generation Partnership Project (3GPP) Long Term Evolution (LTE) and LTE-Advanced (LTE-A) standards, and International Mobile Telecommunications Advanced (IMT-ADV) standards, including their revisions, progeny, and variants. Other suitable examples may include, without limitation, Global System for Mobile Communications (GSM)/Enhanced Data Rates for GSM Evolution (EDGE) technologies, Universal Mobile Telecommunications System (UMTS)/High Speed Packet Access (HSPA) technologies, Worldwide Interoperability for Microwave Access (WiMAX) or the WiMAX II technologies, Code Division Multiple Access (CDMA) 2000 system technologies (e.g., CDMA2000 IxRTT, CDMA2000 EV-DO, CDMA EV-DV, and so forth), High Performance Radio Metropolitan Area Network (HIPERMAN) technologies as defined by the European Telecommunications Standards Institute (ETSI) Broadband Radio Access Networks (BRAN), Wireless Broadband (WiBro) technologies, GSM with General Packet Radio Service (GPRS) system (GSM/GPRS) technologies, High Speed Downlink Packet Access (HSDPA) technologies, High Speed Orthogonal Frequency-Division Multiplexing (OFDM) Packet Access (HSOPA) technologies, High-Speed Uplink Packet Access (HSUPA) system technologies, 3 GPP Rel. 8, 9, 10 or 11 of LTE/System Architecture Evolution (SAE), and so forth. The examples are not limited in this context. In this disclosure, the term "critical" is being employed as a term of art as disclosed, for example, in various communication specifications and is therefore not intended to otherwise limit the scope of the claims.

By way of example and not limitation, various examples may be described with specific reference to various 3 GPP radio access network (RAN) standards, such as the 3 GPP Universal Terrestrial Radio Access Network (UTRAN), the 3 GPP Evolved Universal Terrestrial Radio Access Network (E-UTRAN) and 3GPP's suite of UMTS and LTE/LTE-Advanced Technical Specifications (in case of LTE/LTE-Advanced collectively "3GPP LTE Specifications" according to the 36 Series of Technical Specifications), and IEEE 802.16 standards, such as, for example, the IEEE 802.16-2009 standard and current third revision to IEEE 802.16 referred to as "802.16Rev3" consolidating standards 802.16-2009, 802.16h-2010 and 802.16m-201 1, and the IEEE 802.16p draft standards including IEEE P802.16.1b/D2 Jan. 2012 titled "Draft Amendment to IEEE Standard for WirelessMAN-Advanced Air Interface for Broadband Wireless Access Systems, Enhancements to Support Machine-to-Machine Applications" (collectively "IEEE 802.16 Standards"), and any drafts, revisions or variants of the 3 GPP LTE Specifications and the IEEE 802.16 Standards. Although some embodiments may be described as a 3GPP LTE Specifications or IEEE 802.16 Standards system by way of example and not limitation, it may be appreciated that other types of communications system may be implemented as various other types of mobile broadband communications systems and standards. The examples are not limited in this context.

As contemplated in the present disclosure, MCPTT/MCVIDEO/MCDATA/VIDEO may support an enhanced PTT service, suitable for mission critical scenarios and may be based upon 3GPP EPS services. MCPTT/MCVIDEO/MCDATA/VIDEO may typically be a session initiation protocol (SIP) based service that may be provided via a centralized MCPTT/MCVIDEO/MCDATA/VIDEO server residing in a network (e.g., a 3GPP EPS network). The MCPTT/MCVIDEO/MCDATA/VIDEO server may be an IP Multimedia Subsystem (IMS) application server, but the MCPTT/MCVIDEO/MCDATA/VIDEO server may also be a non-IMS based SIP server. User equipment (UEs) may directly attach to the network to receive critical communication services from an MCPTT/MCVIDEO/MCDATA/VIDEO server. Some UEs may also utilize Proximity Services (ProSe) capabilities to indirectly attach to the network through a relay UE. UEs utilizing ProSe capabilities may be outside of a coverage area of the network and may be referred to as remote UEs.

FIG. 1 illustrates a block diagram of an example system 100 according to various embodiments. According to an embodiment, elements of system 100 may be arranged for providing critical communication services to one or more UEs (e.g. UE 130, UE 140 and UE 150). These critical communication services may comprise mission critical (MCPTT/MCVIDEO/MCDATA/VIDEO) services as specified in, for example, 3GPP technical specification (TS) 22.179, entitled "Technical Specification Group Services and System Aspects; Mission Critical (MCPTT/MCVIDEO/MCDATA/VIDEO) over LTE, Stage 1", Release 13, V13.0.1, published in January of 2015, and/or previous or subsequent releases or versions (hereinafter referred to as 3GPP TS 22.179). For example, as shown in FIG. 1, a network 101 may include an MCPTT/MCVIDEO/MCDATA/VIDEO server 120 that may serve as centralized server to enable network 101 to provide a SIP-based critical communication service to UEs 130, 140 or 150. MCPTT/MCVIDEO/MCDATA/VIDEO server 120 may be arranged as, for example, an IMS application server or a non-IMS based SIP server.

According to an embodiment, access/core 190 may comprise elements of network 101 typically associated with 3GPP E-UTRAN access and 3GPP E-UTRAN core elements. For example, a UE such as UE 130 may gain access to network 101 via Uu 117 coupled to evolved Node B (eNB) 102. Also, as shown in FIG. 1, MCPTT/MCVIDEO/MCDATA/VIDEO server 120 may couple to various access/core 190 elements. For example, MCPTT/MCVIDEO/MCDATA/VIDEO server 120 may couple to a policy and charging rules function (PCRF) 111 via 111. Link 111 may represent an Rx interface reference point. MCPTT/MCVIDEO/MCDATA/VIDEO server 120 may also couple to a serving gateway/packet data gateway (SGW/PWG) 112 via SGi 113. SGi 113 may represent an SGi interface reference point. (According to various embodiments, an interface may comprise and/or be a reference point). MCPTT/MCVIDEO/MCDATA/VIDEO server 120 may also couple to a broadcast/multicast-service center (BM-SC) 114 via MB2 115. MB2 115 may represent an MB2 reference point.

Mobile management entity (MME) 104 and multimedia broadcast/multicast service gateway (MBMS GW) 106 may provide core 3 GPP E-UTRAN services to MCPTT/MCVIDEO/MCDATA/VIDEO server 120 and/or UEs 130, 140 and 150 to facilitate network 101 in providing critical communication services.

According to an embodiment, UE 130 may attach directly to MCPTT/MCVIDEO/MCDATA/VIDEO server 120. UE 130 may comprise an MCPTT/MCVIDEO/MCDATA/VIDEO client that may be arranged as a SIP-based MCPTT/MCVIDEO/MCDATA/VIDEO client for communication with MCPTT/MCVIDEO/MCDATA/VIDEO server 120. MCPTT/MCVIDEO/MCDATA/VIDEO server 120 may be arranged as a type of group communication service application server (GCS AS) and GC1 173 may represent a GC1 reference point through which MCPTT/MCVIDEO/MCDATA/VIDEO server 120 couples with MCPTT/MCVIDEO/MCDATA/VIDEO client at UE 130.

According to an embodiment, UEs out of network coverage of network 101 may still be able to obtain critical communication service by coupling through UEs serving as UE-to-network relays such as UE 130. For example, UE 150 may be able to indirectly couple to MCPTT/MCVIDEO/MCDATA/VIDEO server 120 via a first link 151 between UE 150 and UE 130 and through a second link (GC1 173) between UE 130 and MCPTT/MCVIDEO/MCDATA/VIDEO server 120.

According to an embodiment, UE 130 acting as an UE-to-network relay may relay traffic from MCPTT/MCVIDEO/MCDATA/VIDEO server 120 for authorized UEs and/or authorized groups of UEs (e.g., belonging to an MCPTT/MCVIDEO/MCDATA/VIDEO group). UE 130 may act as an UE-to-network relay for groups of which it is not a member. As such, a relay UE, such as UE 130, may comprise logic and/or features to enable the relay UE to act as a node between an MCPTT/MCVIDEO/MCDATA/VIDEO server and a remote UE such as UE 150 via link 151.

According to an embodiment, critical communication content may be delivered to directly coupled UEs such as UEs 130 or 140 in either a unicast mode (e.g., via EPS bearers) and/or in multicast mode (e.g., via evolved MBMS (eMBMS) bearers). Use of eMBMS bearers may be justified in cases where a sufficient number of UEs are physically located within a same coverage area or cell. When the number of UEs in a cell is low, unicast delivery via EPS may be more efficient compared to eMBMS or multicast delivery. MCPTT/MCVIDEO/MCDATA/VIDEO server 120 may comprise logic and/or features capable of monitoring the number of UEs in a cell and then adjust a delivery mode accordingly.

According to an embodiment, as part of ProSe capabilities, UE 130 and UE 150 may establish a direct link 151. UE 130 may couple to MCPTT/MCVIDEO/MCDATA/VIDEO server 120 through GC1 173. Alternatively, UE 150 may couple to MCPTT/MCVIDEO/MCDATA/VIDEO server 120 via: (1) link 151 between UE 150 and UE 130; (2) link 131 between UE 130 and UE 140; and (3) GCI 174 between UE 140 to MCPTT/MCVIDEO/MCDATA/VIDEO Server 120. Establishment of the direct link may comprise relay discovery, mutual authentication and IP address assignment. Establishment of the direct link may comprise UE 130 and UE 150 setting up a wireless local area network (WLAN) direct connection. The WLAN direct connection may be arranged to operate according to Ethernet wireless standards (including progenies and variants) associated with the IEEE Standard for Information technology-Telecommunications and information exchange between systems—Local and metropolitan area networks—Specific requirements Part 11: WLAN Media Access Controller (MAC) and Physical Layer (PHY) Specifications, published March 2012, and/or later versions of this standard ("IEEE 802.11"). According to an embodiment, following the same logic as mentioned above for MCPTT/MCVIDEO/MCDATA/VIDEO server 120 selecting a unicast or multicast delivery mode, logic and/or features of a relay UE such as UE 130 and/or 140 may choose a unicast or multicast delivery mode to relay information (e.g., critical communication content) to one or more remote UEs such as UE 150 and/or each other.

A direct link between UEs 140 and 130 may be established via, for example, a PC5 interface (e.g. 131). The PC5 interface may be selectively chosen to communicate information. It may be possible to use unicast delivery via the LTE-Uu interface.

Concepts expressed herein may be implemented in connection with cellular telephones and/or other types of User Equipment (UE) used on communication networks, and particularly wireless communication networks. Described below are one or more example communication networks and related equipment within which at least some of the aspects of the herein described concepts may be implemented.

Figure 2:
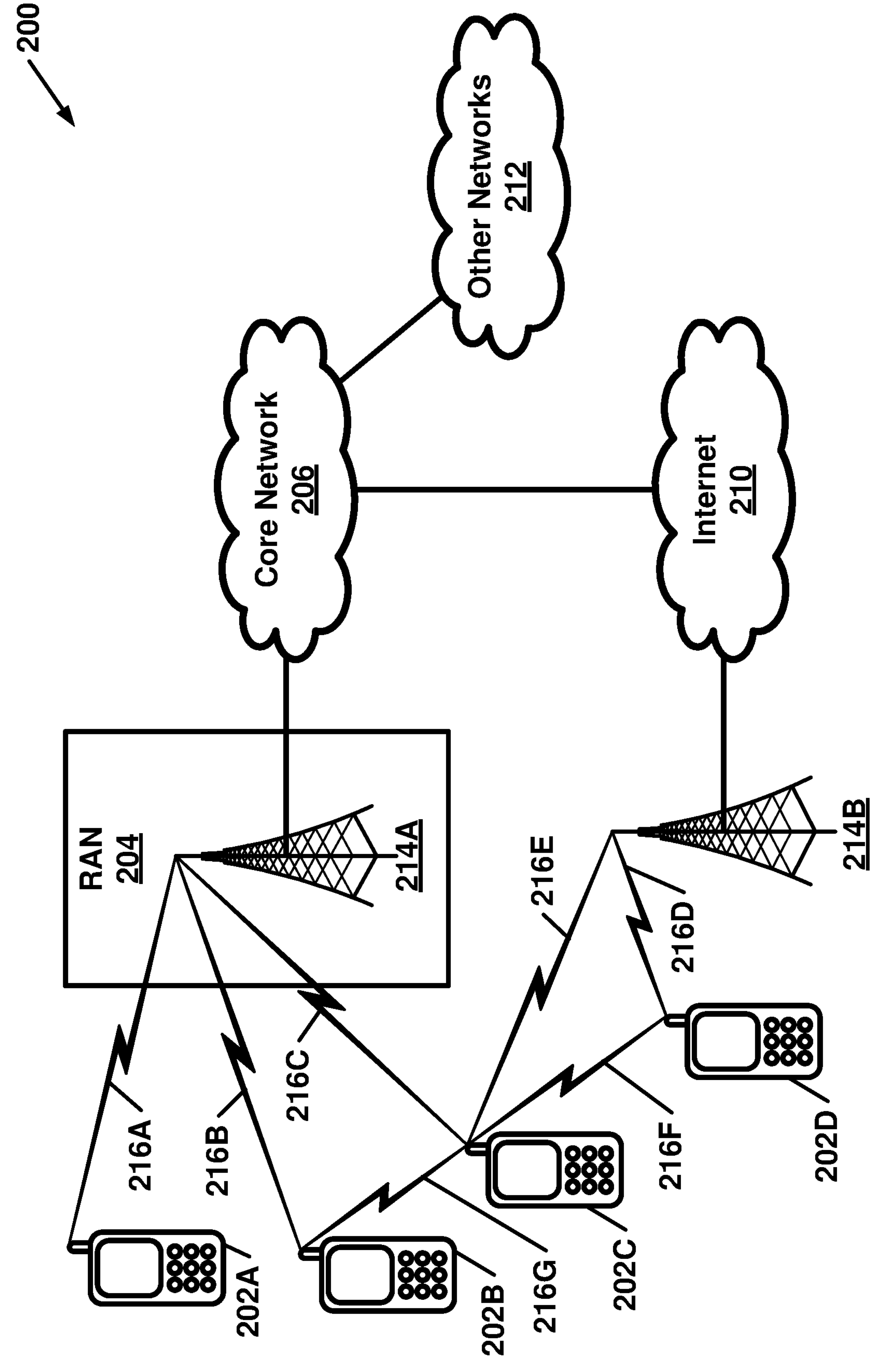
FIG. 2 is a system diagram of an example communications system in which one or more disclosed embodiments may be implemented.

FIG. 2 is a diagram of an example communications system 200 in which one or more disclosed embodiments may be implemented. The communications system 200 may comprise a multiple access system configured to provide content, such as voice, data, video, messaging, broadcast, etc., to multiple wireless users. The communications system 200 may enable multiple wireless users to access such content through the sharing of system resources, including, for example, wireless bandwidth. For example, communications systems 200 may employ one or more channel access processes, such as code division multiple access (CDMA), time division multiple access (TDMA), frequency division multiple access (FDMA), orthogonal FDMA (OFDMA), single-carrier FDMA (SC-FDMA), and/or the like.

As shown in FIG. 2, the communications system 200 may comprise wireless transmit/receive units (WTRUs) 202A, 202B, 202C, 202D, a radio access network (RAN) 204, a core network 206, the Internet 210, and/or other networks 212. It will be appreciated that the disclosed embodiments contemplate various numbers of WTRUs, base stations, networks, and/or network elements. Each of the WTRUs 202A, 202B, 202C, 202D may be configured to operate and/or communicate in a wireless environment. By way of example, WTRUs 202A, 202B, 202C, 202D may be configured to transmit and/or receive wireless signals and may comprise user equipment (UE), a mobile station, a fixed or mobile subscriber unit, a pager, a cellular telephone, a personal digital assistant (PDA), a smartphone, a laptop, a netbook, a personal computer, a wireless sensor, consumer electronics, combinations thereof, and/or the like.

The communications systems 200 may also comprise a base station 214A and/or base station 214B. Each of the base stations 214A, 214B may be a type of device configured to wirelessly interface with at least one of the WTRUs 202A, 202B, 202C, 202D to facilitate access to one or more communication networks, such as core network 206, Internet 210 and/or networks 212. By way of example, base stations 214A and/or 214B may comprise a base transceiver station (BTS), a Node-B, an eNode B, a Home Node B, a Home eNode B, a site controller, an access point (AP), a wireless router, combinations thereof, and/or the like. While base stations 214A and 214B are each depicted as a single element, it will be appreciated that base stations 214A and 214B may comprise various numbers of interconnected base stations and/or network elements.

As illustrated, base station 214A may be a part of the RAN 204, which may also comprise other base stations and/or network elements (not shown), such as, for example, a base station controller (BSC), a radio network controller (RNC), relay nodes, combinations thereof, and/or the like. Base station 214A and/or the base station 214B may be configured to transmit and/or receive wireless signals within a particular geographic region, which may be referred to as a cell (not shown). The cell may be further divided into cell sectors. For example, the cell associated with the base station 214A may be divided into three sectors. Thus, according to an embodiment, base station 214A may comprise three transceivers, i.e., one for each sector of the cell. According to an embodiment, base station 214A may employ multiple-input multiple output (MIMO) technology and, therefore, may utilize multiple transceivers for each sector of the cell.

Base stations 214A and/or 214B may communicate with one or more of the WTRUs (e.g. 202A, 202B, 202C, and 202D) over an air interface (e.g. 216A, 216B, (216C and/or 216E), and 216D, respectively), which may comprise a wireless communication link (e.g., radio frequency (RF), microwave, infrared (IR), ultraviolet (UV), visible light, etc.). An air interface (e.g. 216A, 216B, 216C, 216D, 216E, 216F and 216G) may be established employing a suitable radio access technology (RAT).

More specifically, as noted above, communications system 200 may comprise a multiple access system and may employ one or more channel access schemes, such as CDMA, TDMA, FDMA, OFDMA, SC-FDMA, combinations thereof, and/or the like. For example, base station 214A in the RAN 204 and WTRUs 202A, 202B, and 202C may implement a radio technology such as Universal Mobile Telecommunications System (UMTS) Terrestrial Radio Access (UTRA), which may establish air interface (e.g. 202A, 202B, and 202C) employing wideband CDMA (WCDMA). WCDMA may comprise communication protocols such as High-Speed Packet Access (HSPA) and/or Evolved HSPA (HSPA+). HSPA may comprise High-Speed Downlink Packet Access (HSDPA) and/or High-Speed Uplink Packet Access (HSUPA).

According to an embodiment, base station 214A and WTRUs 202A, 202B, 202C may implement a radio technology such as Evolved UMTS Terrestrial Radio Access (E-UTRA), which may establish air interface (e.g. 216A, 216B, and 216C, respectively) employing Long Term Evolution (LTE) and/or LTE-Advanced (LTE-A).

According to an embodiment, base station 214A and WTRUs 202A, 202B, 202C may implement radio technologies such as IEEE 802.16 (i.e., Worldwide Interoperability for Microwave Access (WiMAX)), CDMA2000, CDMA2000 1×, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), combinations thereof, and/or the like.

Base station 214B in FIG. 2 may comprise a wireless router, Home Node B, Home eNode B, or an access point, for example, and may utilize a RAT for facilitating wireless connectivity in a localized area, such as a place of business, a home, a vehicle, a campus, combinations thereof, and/or the like. According to an embodiment, base station 214B and WTRUs 202C, 202D may implement a radio technology such as IEEE 802.11 to establish a wireless local area network (WLAN). According to an embodiment, base station 214B and WTRUs 202C and 202D may implement a radio technology such as IEEE 802.15 to establish a wireless personal area network (WPAN). According to an embodiment, base station 214B and WTRUs 202C and 202D may utilize a cellular-based RAT (e.g., WCDMA, CDMA2000, GSM, LTE, LTE-A, etc.) to establish a picocell or femtocell. As shown in FIG. 2, base station 214B may have a direct connection to the Internet 210. Thus, base station 214B may not be required to access the Internet 210 via the core network 206.

The RAN 204 may be in communication with the core network 206, which may be a type of network configured to provide voice, data, applications, and/or voice over internet protocol (VoIP) services to one or more of the WTRUs 202A, 202B, 202C, and 202D. For example, core network 206 may provide call control, billing services, mobile location-based services, pre-paid calling, Internet connectivity, video distribution, etc., and/or perform high-level security functions, such as user authentication. Although not shown in FIG. 2, it anticipated that according to an embodiment, RAN 204 and/or core network 206 may be in direct or indirect communication with other RANs that employ the same RAT as the RAN 204 or a different RAT. For example, in addition to being connected to the RAN 204, which may utilize an E-UTRA radio technology, the core network 206 may also be in communication with another RAN (not shown).

Core network 206 may serve as a gateway for the WTRUs 202A, 202B, 202C and/or 202D to access the PSTN 208, the Internet 210 and/or other networks 212. The Internet 210 may comprise a global system of interconnected computer networks and devices that use common communication protocols, such as the transmission control protocol (TCP), user datagram protocol (UDP) and the internet protocol (IP) in the TCP/IP internet protocol suite. Other networks 212 may comprise wired and/or wireless communications networks owned and/or operated by other service providers. For example, the networks 212 may comprise another core network connected to one or more RANs, which may employ the same RAT as the RAN 204 or a different RAT.

Some or all of the WTRUs 202A, 202B, 202C, and 202D in the communications system 200 may comprise multi-mode capabilities (i.e., the WTRUs 202A, 202B, 202C, and 202D may comprise multiple transceivers for communicating with different wireless networks over different wireless links). For example, example WTRU 300 shown in FIG. 3 may be configured to communicate with base station 214A, which may employ a cellular-based radio technology, and with the base station 214B, which may employ an IEEE 802 radio technology.

Figure 3:
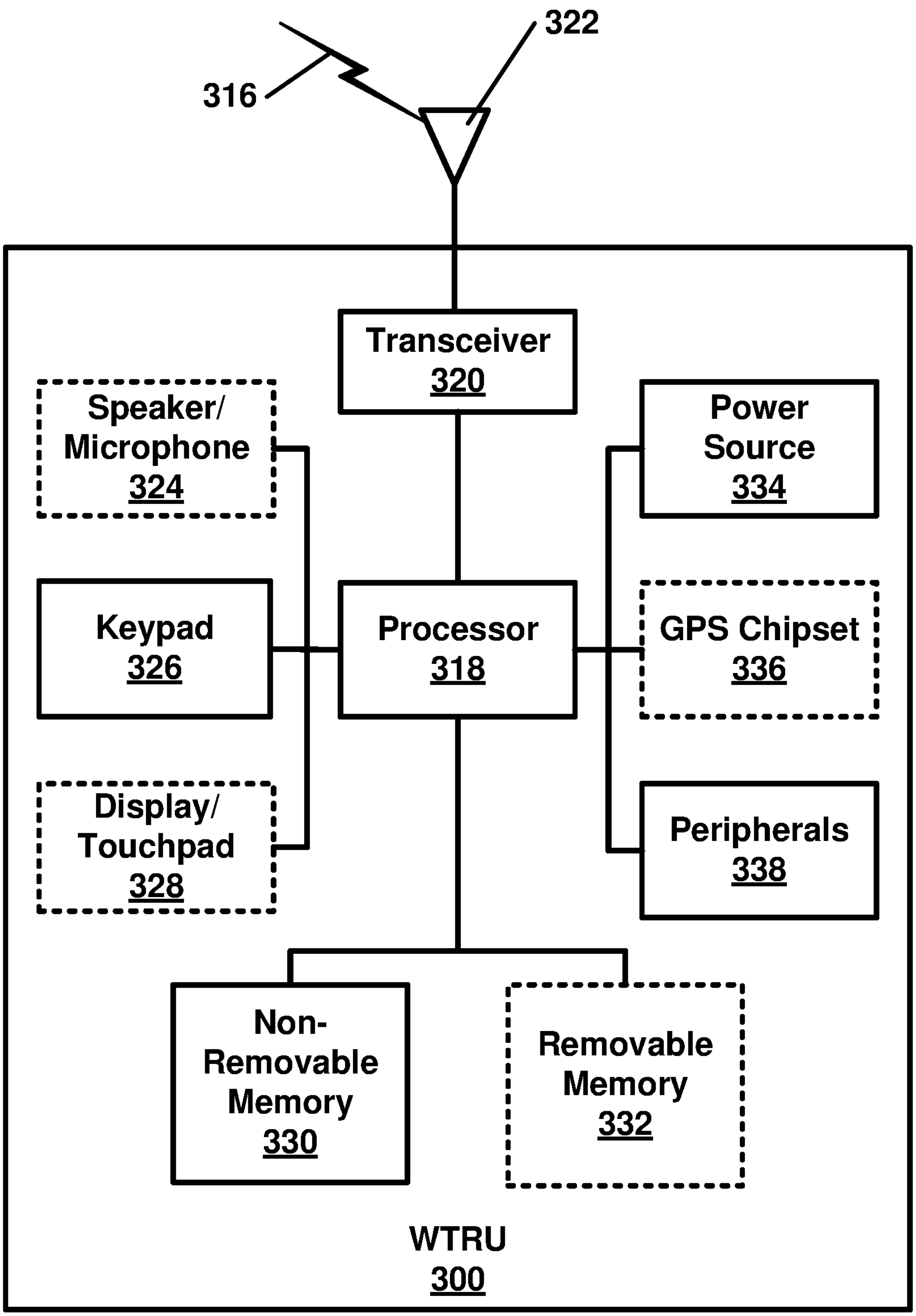
FIG. 3 is a system diagram of an example wireless transmit/receive unit (WTRU) as per an aspect of an embodiment of the present invention.

FIG. 3 is a system diagram of an example WTRU 300. As shown in FIG. 3, example WTRU 300 may comprise a processor 318, a transceiver 320, a transmit/receive element 322, a speaker/microphone 324, a keypad 326, a display/touchpad 328, non-removable memory 330, removable memory 332, a power source 334, a global positioning system (GPS) chipset 336, and other peripherals 338. It will be appreciated that the WTRU 300 may comprise a sub-combination of the foregoing elements while remaining consistent with an embodiment. For example, an WRTU 300 embodiment may be implemented without one or more of the dashed elements 324, 328, 336 and/or 332.

The processor 318 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. Processor 318 may perform signal coding, data processing, power control, input/output processing and/or other functionality that enables example WTRU 300 to operate in a wireless environment. Processor 318 may be coupled to the transceiver 320, which may be coupled to the transmit/receive element 322. While FIG. 3 depicts elements such as, for example, processor 318 and transceiver 320 as separate components, it will be appreciated that the elements such as processor 318 and the transceiver 320 may be integrated together in an electronic package and/or chip. While FIG. 3 depicts elements such as, for example, processor 318 and transceiver 320 as individual components, it will be appreciated that the elements such as processor 318 and the transceiver 320 may be implemented as a collection of other elements.

The transmit/receive element 322 may be configured to transmit signals to, or receive signals from, a base station (e.g., the base station 214A) over the air interface 316. For example, in an embodiment, the transmit/receive element 322 may be an antenna configured to transmit and/or receive RF signals. According to an embodiment, the transmit/receive element 322 may be an emitter/detector configured to transmit and/or receive IR, UV, or visible light signals, for example. According to an embodiment, the transmit/receive element 322 may be configured to transmit and receive both RF and light signals. It will be appreciated that the transmit/receive element 322 may be configured to transmit and/or receive any combination of wireless signals.

In addition, although the transmit/receive element 322 is depicted in FIG. 3 as a single element, example WTRU 300 may comprise any number of transmit/receive elements 322. More specifically, example WTRU 300 may employ MIMO technology. Thus, according to an embodiment, example WTRU 300 may comprise two or more transmit/receive elements 322 (e.g., multiple antennas) for transmitting and receiving wireless signals over the air interface 316.

Transceiver 320 may be configured to modulate signals that are to be transmitted by transmit/receive element 322 and to demodulate signals received by transmit/receive element 322. As noted above, example WTRU 300 may have multi-mode capabilities. Thus, the transceiver 320 may comprise multiple transceivers for enabling example WTRU 300 to communicate via multiple RATs, such as E-UTRA and IEEE 802.11, for example.

Processor 318 of example WTRU 300 may be coupled to, and may receive user input data from, for example, the speaker/microphone 324, the keypad 326 and/or the display/touchpad 328 (e.g., a liquid crystal display (LCD) display unit or organic light-emitting diode (OLED) display unit). Processor 318 may output user data to, for example, the speaker/microphone 324, the keypad 326 and/or the display/touchpad 328. Processor 318 may access information from, and store data in, a type of suitable memory, such as the non-removable memory 330 and/or the removable memory 332. The non-removable memory 330 may comprise random-access memory (RAM), read-only memory (ROM), a hard disk, and/or other type of memory storage device. The removable memory 332 may comprise a subscriber identity module (SIM) card, a memory stick, a secure digital (SD) memory card, and/or the like. According to an embodiment, processor 318 may access information from, and store data in, memory that is not physically located on example WTRU 300, such as on a server or a home computer (not shown).

Processor 318 may receive power from the power source 334, and may be configured to distribute and/or control the power to the other components in example WTRU 300. Power source 334 may be a suitable device for powering example WTRU 300. For example, power source 334 may comprise one or more dry cell batteries (e.g., nickel-cadmium (NiCd), nickel-zinc (NiZn), nickel metal hydride (NiMH), lithium-ion (Li-ion), etc.), solar cells, fuel cells, combinations thereof, and/or the like.

Processor 318 may also be coupled to GPS chipset 336, which may be configured to provide location information (e.g., longitude and latitude) regarding the current location of example WTRU 300. In addition to, and/or in lieu of, the information from the GPS chipset 336, example WTRU 300 may receive location information over the air interface 316 from a base station (e.g., base stations 214A, 214B) and/or determine a location based on the timing of the signals being received from two or more nearby base stations. It will be appreciated that the WTRU 300 may acquire location information by way of other suitable location-determination process(es) while remaining consistent with an embodiment.

Processor 318 may further be coupled to other peripherals 338, which may comprise one or more software and/or hardware modules that provide additional features, functionality, and/or wired or wireless connectivity. For example, peripherals 338 may comprise, for example, an accelerometer, an e-compass, a satellite transceiver, a digital camera (for photographs or video), a universal serial bus (USB) port, a vibration device, a television transceiver, a hands free headset, a Bluetooth™ module, a frequency modulated (FM) radio unit, a digital music player, a media player, a video game player module, an Internet browser, a combination thereof, and/or the like.

Figure 4:
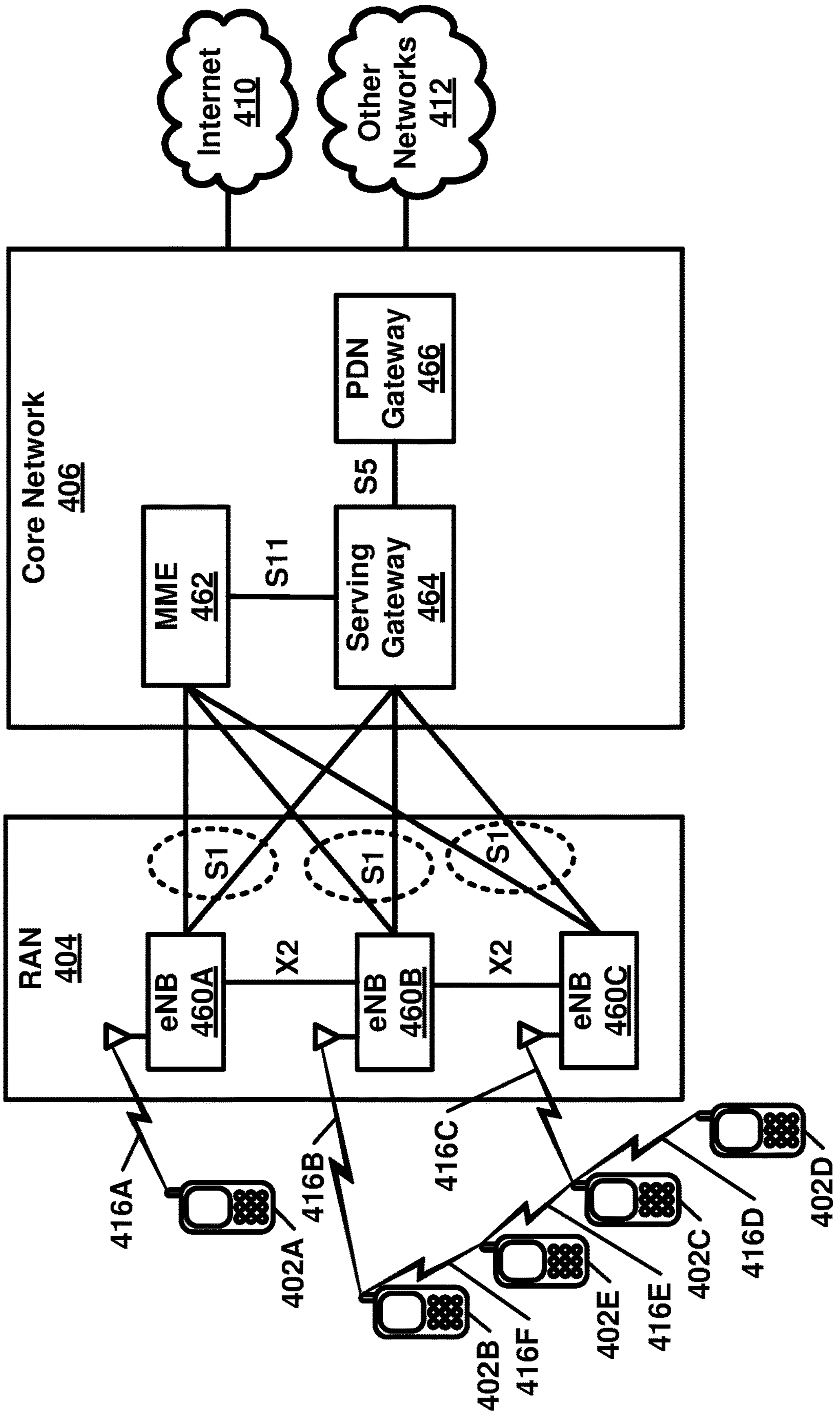
FIG. 4 is a system diagram of an example radio access network and core network as per an aspect of an embodiment of the present invention.

FIG. 4 is a system diagram of an example communications system comprising an example RAN 404 and an example core network 406. This example communications system is disclosed for example purposes. Variations in communications systems may be implemented within the scope of the embodiment. In this example embodiment, RAN 404 may employ an E-UTRA radio technology to communicate with the WTRUs 402A, 402B and/or 402C over air interfaces 416A, 416*b* and/or 416C respectively. RAN 404 may be in communication with the core network 406.

Example RAN 404 may comprise eNBs 460A, 460B and/or 460C, though it will be appreciated that the RAN 404 may comprise various numberd of eNBs while remaining consistent with an embodiment. The eNBs 460A, 460B and/or 460C may each comprise one or more transceivers for communicating with the WTRUs 402A, 402B and/or 402C over air interface 416A, 416B and/or 416C respectively. In an embodiment, the eNBs 460A, 460B and/or 460C may implement MIMO technology. Thus, the eNB 460A, for example, may use multiple antennas to transmit wireless signals to, and receive wireless signals from, example WTRUs 402A.

Some WTRUs may be configured to communicate with each other directly. For example, as illustrated, WTRU 402E may be configured to communicate with example WTRU 402B and/or example WTRU 402C over the air interfaces 416F and/or 416E, respectively. Similarly, example WTRU 402D may be configured to communicate with example WTRU 402C over the air interfaces 416D.

Each of the eNBs 460A, 460B, and/or 460C may be associated with a particular cell (not shown) and may be configured to handle radio resource management decisions, handover decisions, scheduling of users in the uplink and/or downlink, and the like. As shown in FIG. 4, the eNBs 460A, 460B and/or 460C may communicate with one another over, for example: an X2 interface, a reference point, and/or the like.

Example core network 406 shown in FIG. 4 may comprise a mobility management gateway (MME) 462, a serving gateway 464, a packet data network (PDN) gateway 466, and/or the like. While each of the foregoing elements are depicted as part of the core network 406, it will be appreciated that various elements operating in a core network (e.g. 406) may be owned and/or operated by an entity other than the core network operator.

The MME 462 may be connected to each of the eNBs 460A, 460B, 460C in RAN 404 via an S1 interface, a reference point, and/or the like and may serve as a control node. For example, the MME 462 may be responsible for authenticating users of the WTRUs 402A, 402B, 402C, 402D and/or 402E, bearer activation/deactivation, selecting a particular serving gateway during an initial attach of the WTRUs 402A, 402B, 402C, 402D and/or 402E, and/or the like. The MME 462 may also provide a control plane function for switching between the RAN 404 and other RANs (not shown) that employ other radio technologies, such as, for example, GSM and/or WCDMA.

Serving gateway 464 may be connected to each of the eNode Bs 460A, 460B and/or 460C in the RAN 404 via an S1 interface, a reference point, and/or the like. The serving gateway 464 may generally route and forward user data packets to and from the WTRUs 402 *a*, 402B and/or 402C. The serving gateway 464 may also perform other functions, such as anchoring user planes during inter-eNode B handovers, triggering paging when downlink data is available for the WTRUs 402A, 402B and/or 402C, managing and storing contexts of the WTRUs 402A, 402B and/or 402C, and/or the like.

The serving gateway 464 may also be connected to the PDN gateway 466, which may provide the WTRUs 402*a*, 402B and/or 402C with access to packet-switched networks, such as the Internet 410, to facilitate communications between the WTRUs 402A, 402B and/or 402C and IP-enabled devices.

Example core network 406 may facilitate communications with other networks. For example, core network 406 may provide the WTRUs 402A, 402B and 402C with access to circuit-switched networks to facilitate communications between the WTRUs 402A, 402B, 402C and traditional land-line communications devices. For example, the core network 406 may comprise, and/or may communicate with, an IP gateway (e.g., an IP multimedia subsystem (IMS) server) that serves as an interface between the core network 406 and a PSTN. In addition, the core network 406 may provide the WTRUs 402A, 402B, 402C with access to the networks 412, which may comprise other wired or wireless networks that are owned and/or operated by other service providers.

Figure 5:
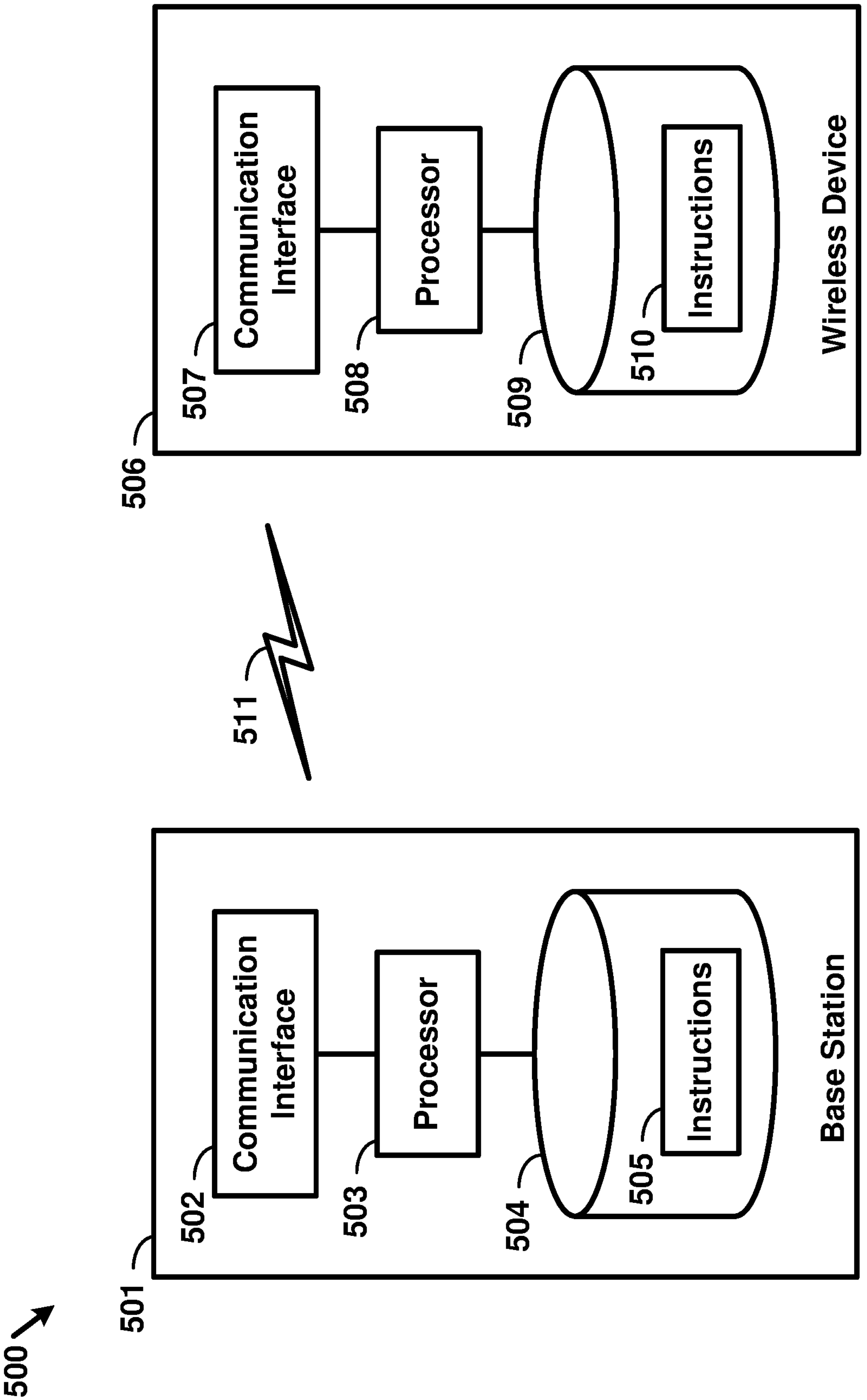
FIG. 5 is a block diagram of a base station and a wireless device as per an aspect of an embodiment of the present invention.

FIG. 5 is an example block diagram of a base station 501 and a wireless device 506, as per an aspect of an embodiment of the present invention. A communication network 500 may comprise at least one base station 501 and at least one wireless device 506. The base station 501 may comprise at least one communication interface 502, at least one processor 503, and at least one set of program code instructions 505 stored in non-transitory memory 504 and executable by the at least one processor 503. The wireless device 506 may comprise at least one communication interface 507, at least one processor 508, and at least one set of program code instructions 510 stored in non-transitory memory 509 and executable by the at least one processor 508. Communication interface 502 in base station 501 may be configured to engage in communication with communication interface 507 in wireless device 506 via a communication path that comprises at least one wireless link 511. Wireless link 511 may be a bi-directional link. Communication interface 507 in wireless device 506 may also be configured to engage in a communication with communication interface 502 in base station 501. Base station 501 and wireless device 506 may be configured to send and receive data over wireless link 511 using multiple frequency carriers. According to some of the various aspects of embodiments, transceiver(s) may be employed. A transceiver is a device that comprises both a transmitter and receiver. Transceivers may be employed in devices such as wireless devices, base stations, relay nodes, and/or the like.

An interface may be a hardware interface, a firmware interface, a software interface, and/or a combination thereof. The hardware interface may comprise connectors, wires, electronic devices such as drivers, amplifiers, and/or the like. A software interface may comprise code stored in a memory device to implement protocol(s), protocol layers, communication drivers, device drivers, combinations thereof, and/or the like. A firmware interface may comprise a combination of embedded hardware and code stored in and/or in communication with a memory device to implement connections, electronic device operations, protocol(s), protocol layers, communication drivers, device drivers, hardware operations, combinations thereof, and/or the like.

The term configured may relate to the capacity of a device whether the device is in an operational or non-operational state. Configured may also refer to specific settings in a device that effect the operational characteristics of the device whether the device is in an operational or non-operational state. In other words, the hardware, software, firmware, registers, memory values, and/or the like may be "configured" within a device, whether the device is in an operational or nonoperational state, to provide the device with specific characteristics. Terms such as "a control message to cause in a device" may mean that a control message has parameters that may be used to configure specific characteristics in the device, whether the device is in an operational or non-operational state.

According to some of the various aspects of embodiments, an LTE network may comprise a multitude of base stations, providing a user plane PDCP/RLC/MAC/PHY and control plane (RRC) protocol terminations towards the wireless device. The base station(s) may be interconnected with other base station(s) (e.g. employing an X2 interface, reference point, and/or the like). The base stations may also be connected employing, for example, an S1 interface to an EPC. For example, the base stations may be interconnected to the MME employing the S1-MME interface, reference point, and/or the like and to the Serving Gateway (S-G) employing the S1-U reference point. The S1 interface, reference point, and/or the like may support a many-to-many relation between MMEs/Serving Gateways and base stations. A base station may comprise many sectors for example: 1, 2, 3, 4, or 6 sectors. A base station may comprise many cells, for example, ranging from 1 to 50 cells or more. A cell may be categorized, for example, as a primary cell or secondary cell. At RRC connection establishment/re-establishment/handover, one serving cell may provide the NAS (non-access stratum) mobility information (e.g. TAI), and at RRC connection re-establishment/handover, one serving cell may provide the security input. This cell may be referred to as the Primary Cell (PCell). In the downlink, the carrier corresponding to the PCell may be the Downlink Primary Component Carrier (DL PCC), while in the uplink, it may be the Uplink Primary Component Carrier (UL PCC). Depending on wireless device capabilities, Secondary Cells (SCells) may be configured to form together with the PCell a set of serving cells. In the downlink, the carrier corresponding to an SCell may be a Downlink Secondary Component Carrier (DL SCC), while in the uplink, it may be an Uplink Secondary Component Carrier (UL SCC). An SCell may or may not have an uplink carrier.

A cell, comprising a downlink carrier and optionally an uplink carrier, may be assigned a physical cell ID and a cell index. A carrier (downlink or uplink) may belong to only one cell. The cell ID or Cell index may also identify the downlink carrier or uplink carrier of the cell (depending on the context it is used). In the specification, cell ID may be equally referred to a carrier ID, and cell index may be referred to carrier index. In implementation, the physical cell ID or cell index may be assigned to a cell. A cell ID may be determined using a synchronization signal transmitted on a downlink carrier. A cell index may be determined using RRC messages. For example, when the specification refers to a first physical cell ID for a first downlink carrier, the specification may mean the first physical cell ID is for a cell comprising the first downlink carrier. The same concept may apply to, for example, carrier activation. When the specification indicates that a first carrier is activated, the specification may equally mean that the cell comprising the first carrier is activated.

Embodiments may be configured to operate as needed. The disclosed mechanism may be performed when certain criteria are met, for example, in a wireless device, a base station, a radio environment, a network, a combination of the above, and/or the like. Example criteria may be based, at least in part, on for example, traffic load, initial system set up, packet sizes, traffic characteristics, a combination of the above, and/or the like. When the one or more criteria are met, various example embodiments may be applied. Therefore, it may be possible to implement example embodiments that selectively implement disclosed protocols.

A base station may communicate with a mix of wireless devices. Wireless devices may support multiple technologies, and/or multiple releases of the same technology. Wireless devices may have some specific capability(ies) depending on its wireless device category and/or capability(ies). A base station may comprise multiple sectors. When this disclosure refers to a base station communicating with a plurality of wireless devices, this disclosure may refer to a subset of the total wireless devices in a coverage area. This disclosure may refer to, for example, a plurality of wireless devices of a given LTE release with a given capability and in a given sector of the base station. The plurality of wireless devices in this disclosure may refer to a selected plurality of wireless devices, and/or a subset of total wireless devices in a coverage area which perform according to disclosed methods, and/or the like. There may be a plurality of wireless devices in a coverage area that may not comply with the disclosed methods, for example, because those wireless devices perform based on older releases of LTE technology.

In order to set an MCPTT call, MCPTT UEs affiliated to MCPTT groups may first discover each other. This discovery may be a restricted discovery since MCPTT is a public safety feature. In the restricted discovery, the discoverer UEs and discoveree UEs may be authorized by being pre-provisioned with one or more parameters for the discovery procedure. Examples for ProSe direct discovery methods comprise Model A and Model B.

Model A may include the following examples two roles for the ProSe-enabled UEs that are participating in ProSe Direct Discovery: Announcing UE: a) The UE announces certain information that may be used by UEs in proximity that have permission to discover. b) Monitoring UE: The UE that monitors certain information of interest in proximity of announcing UEs. In Model A the announcing UE may broadcast discovery messages at discovery intervals (e.g. pre-defined intervals) and the monitoring UEs that are interested in these messages may read them and may process them. In an example, this model may be equivalent to "I am here" since the announcing UE may broadcast information about itself e.g. its restricted ProSe application code in the discovery message. The UE may act as "announcing UE" in the carrier frequency signaled by the serving PLMN when using Model A mode. The UE may act as a "monitoring" UE in the resources of the serving PLMN and Local PLMNs, when using Model A mode. When inter-PLMN discovery transmission is supported, the carrier frequency may be operated by a PLMN other than the serving PLMN. Open and/or restricted discovery types may be supported by Model A.

Model B, when restricted discovery type is used, includes the following examples two roles for the ProSe-enabled UEs that are participating in ProSe Direct Discovery: a) Discoverer UE: The UE transmits a request containing certain information about what it is interested to discover; and b) Discoveree UE: The UE that receives the request message may respond with some information related to the discoverer's request. In an example, it is equivalent to "who is there/are you there". The discoverer UE sends information about other UEs that may like to receive responses from, e.g. the information may be about a ProSe application identity corresponding to a group and the members of the group may respond.

When using Model B discovery, the discoverer UE and discoveree UE may announce in the carrier frequency signaled by the serving PLMN. When inter-PLMN discovery transmission is supported, the carrier frequency may be operated by a PLMN other than the serving PLMN. The discoverer UE and discoveree UE may be allowed to monitor in the serving PLMN and Local PLMNs when authorized. In an example implementation, only restricted discovery type may support by Model B. In an example application, the public safety discovery may be considered restricted. The monitoring UE/discoverer UE may need to have authorization (such as through pre-provisioned parameters) to perform discovery of the appropriate service(s). The public safety discovery may be considered restricted and may depend on Model A or Model B. The public safety discovery may use ProSe restricted code for Model A. The public safety discovery may use ProSe query code/ProSe response code respectively for Model B.

Code parameters may ben bits, e.g. 64 bits, and may be part of ProSe Application Code. They may correspond to one or more restricted ProSe application user ID(s) (RPAUID). The ProSe application user ID may be allocated and bound to ProSe discovery UE ID (PDUID) by the ProSe application server.

Figure 6:
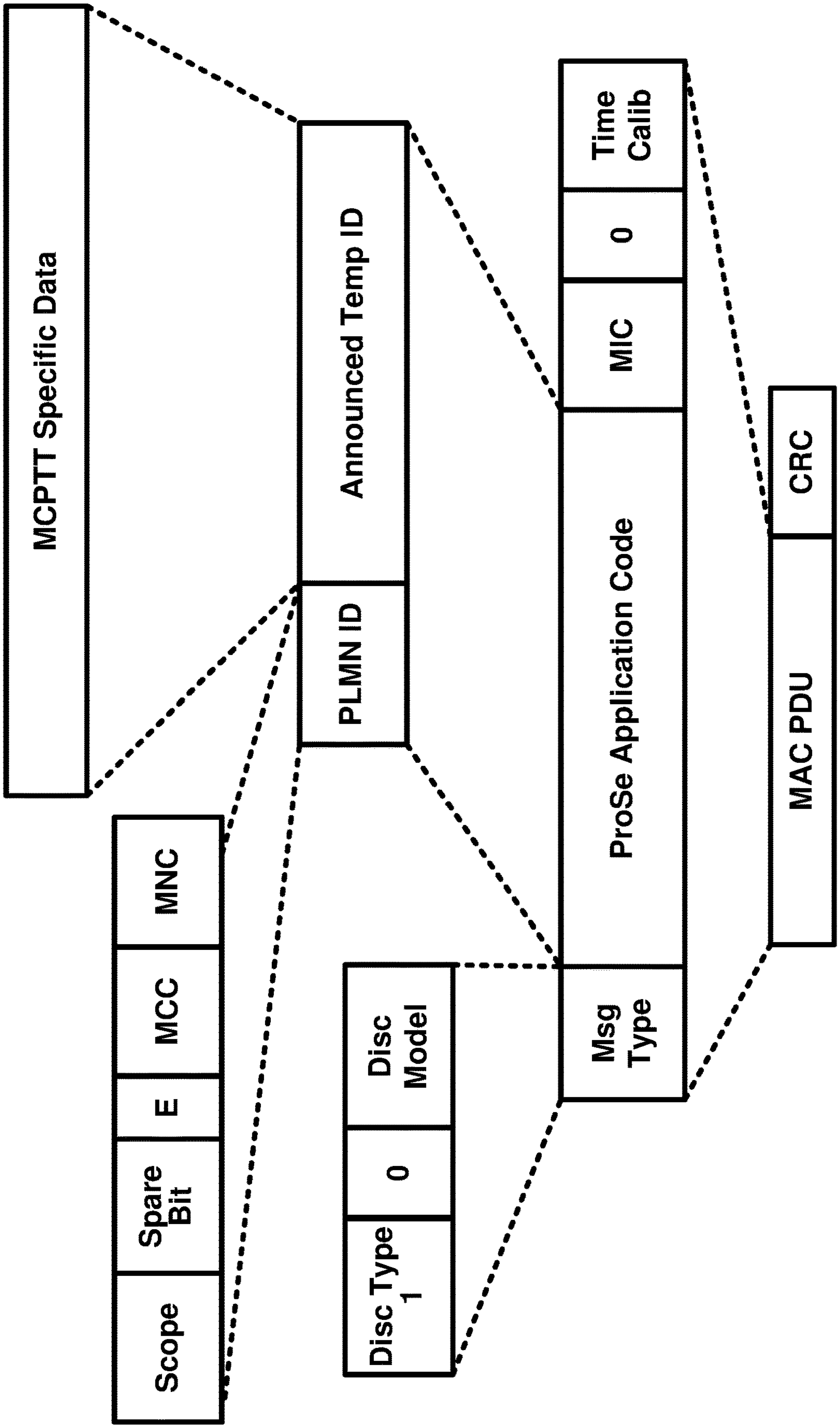
FIG. 6 is a diagram of an example ProSe Discovery message as per an aspect of an embodiment of the present invention.

FIG. 6 is an example of the ProSe Discovery message which is employed for discovery procedures in Model A and Model B. In Model A, the announcing MCPTT UE may use ProSe restricted code and if the application-controlled extension is used, it may use ProSe restricted code prefix and ProSe restricted code suffix(es) to announce its identity over the PC5 interface. The monitoring MCPTT UE may use discovery filter which may be provided by the HPLMN ProSe function comprising the ProSe restricted code (or ProSe restricted code prefix with ProSe Restricted Code suffix pool if restricted direct discovery with application-controlled extension was requested by the announcing MCPTT UE) to monitor the announcing MCPTT UE for a duration of time.

Model A may compromise a procedure for the announcing MCPTT UE and a procedure for the monitoring MCPTT UE. It may include a matching procedure for the case when the monitoring MCPTT UE receives ProSe restricted code over the air that matches the discovery filter provided by the HPLMN ProSe function to the monitoring MCPTT UE in the discovery response message, however the corresponding restricted ProSe application UE identity (RPAUID) may not have a valid validity timer.

Figure 7:
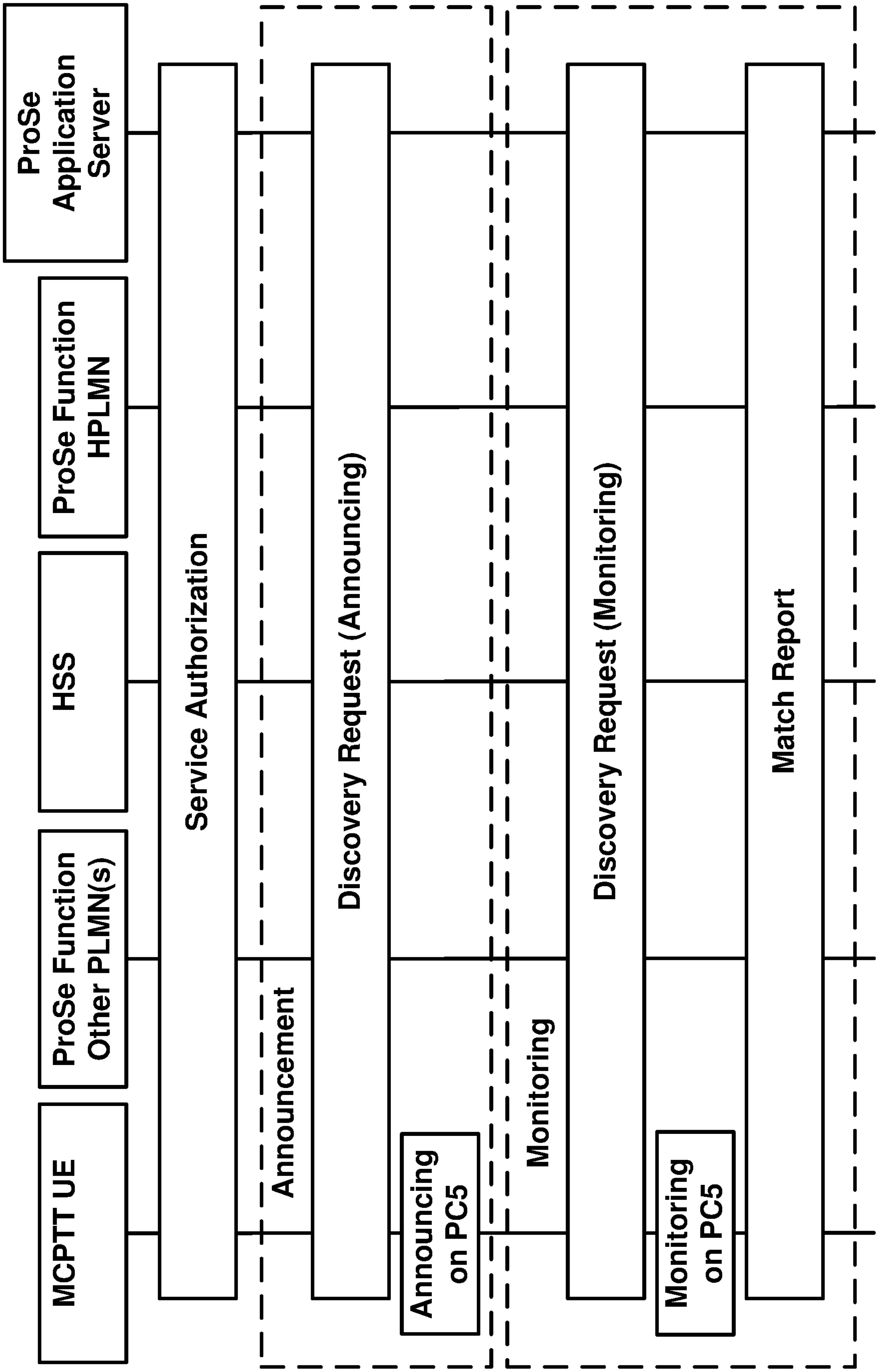
FIG. 7 is a flow diagram showing an example procedure for Model A discovery as per an aspect of an embodiment of the present invention.

FIG. 7 illustrates a flow diagram showing an example procedure for Model A discovery. An example procedure for Model A discovery may include authorization, announcement, and monitoring.

Authorization where the MCPTT UE may get authorized for restricted ProSe direct discovery. In an example, MCPTT may be public safety and the ProSe direct discovery may be restricted.

Announcement, where the announcing MCPTT UE may request for discovery and may receive the ProSe restricted code (or ProSe restricted code prefix and ProSe restricted code suffix(es) to announce itself, if the application-controlled extension is used). The announcing MCPTT UE may announce the ProSe restricted code (or ProSe restricted code prefix and ProSe restricted code suffix(es) to announce itself, if the application-controlled extension is used).

Monitoring, where the monitoring MCPTT UE may request for discovery and may receive the ProSe Filter comprising the ProSe Restricted Code (or ProSe Restricted Code Prefix and ProSe Restricted Code Suffix(es) to announce itself, if the application-controlled extension is used). The monitoring MCPTT UE may monitor for the ProSe restricted code (or ProSe restricted code prefix and ProSe restricted code suffix(es) to announce itself, if the application-controlled extension is used). The monitoring UE may match-report if having monitored ProSe restricted code (or ProSe restricted code prefix and ProSe restricted code suffix(es) to announce itself, if the application-controlled extension is used) with corresponding PRAUID with no valid validity timer.

Figure 8:
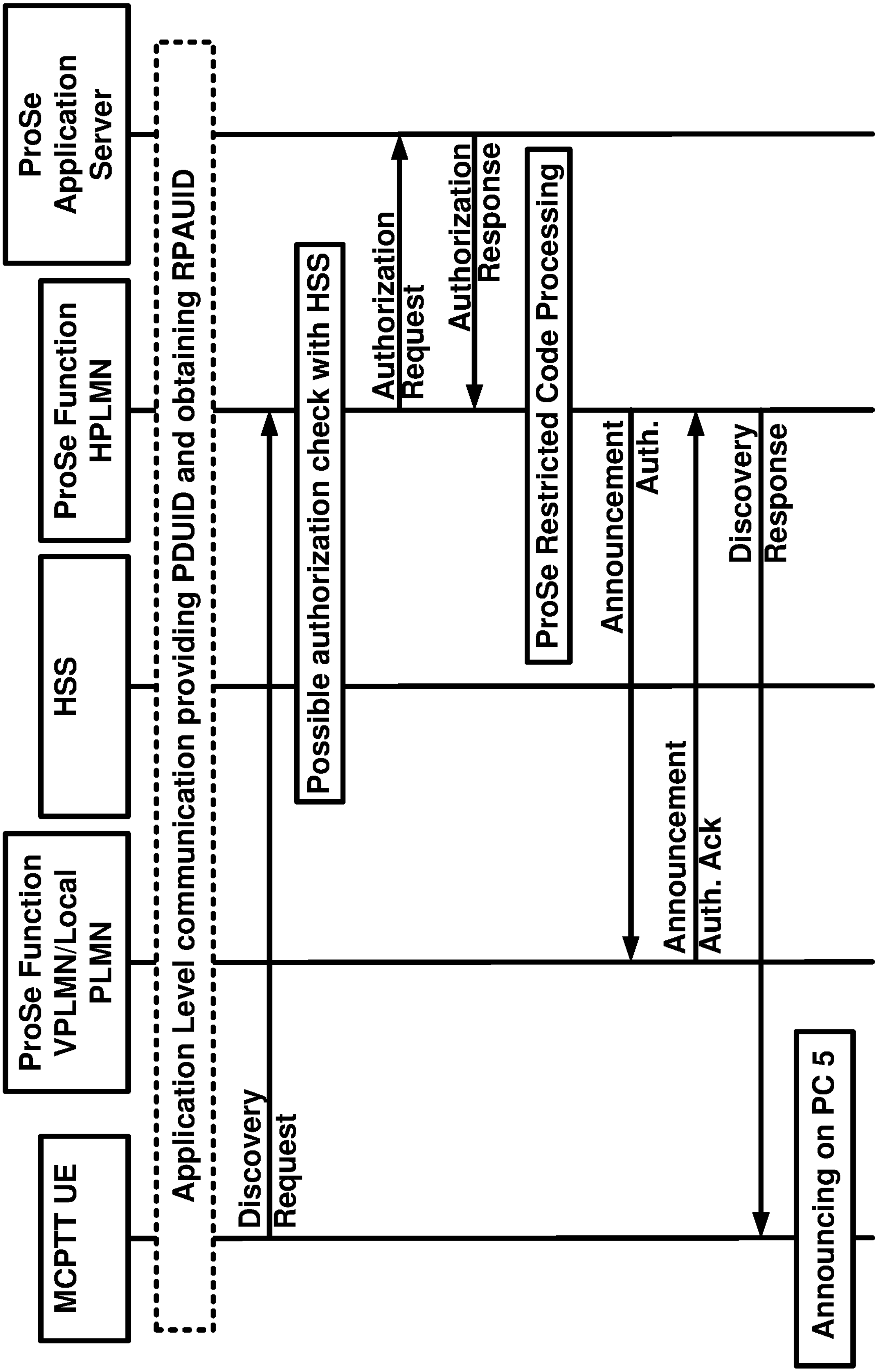
FIG. 8 is a flow diagram illustrating an example procedure for the announcing MCPTT (mission critical push-to-talk) UE (user equipment) as per an aspect of an embodiment of the present invention.

FIG. 8 is a flow diagram illustrating an example procedure for the announcing MCPTT UE. The procedure for the announcing MCPTT UE may comprise the application client in the MCPTT UE retrieving the ProSe discovery UE identity (PDUID) and providing it to the ProSe application server. The ProSe application server may: allocate a restricted ProSe application UE identity (RPAUID) for that PDUID, store the binding between the PDUID and the RPAUID, and return the RPAUID to the application client in the MCPTT UE. The MCPTT UE may use RPAUID instead of PDUID since MCPTT is a public safety feature. The MCPTT UE may construct a discovery request message containing RPAUID, UE identity set to international mobile subscriber identity (IMSI), command=announce, discovery type set to restricted discovery, application ID set to unique identifier of the MCPTT application ID, discovery entry ID indicating if this is a new request, optional requested discovery timer set to validity timer associated with the expected ProSe restricted code from the HPLMN ProSe Function (if it is set to zero, the MCPTT UE is requesting to remove the discovery entity ID and release the associated resources), (if application-controlled extension is used) application level container containing the request and the relevant information, announcing type such as “on demand” for the indicated application, and the PLMN ID of the carrier frequency in announcing PLMN ID if the serving PLMN signaled carrier frequency is not operated by HPLMN or VPLMN and if inter-PLMN ProSe discovery transmission is supported. MCPTT UE may send the discovery request message to HPLMN ProSe function. The HPLMN ProSe function may check for authorization for the MCPTT application. If there is not any associated MCPTT UE context, the HPLMN ProSe function may check with HSS and if needed may create a new context for the MCPTT UE that contains the subscription parameters for this MCPTT UE. HSS may provide MSISDN of the MCPTT UE and PLMN ID of where the MCPTT UE is registered.

The HPLMN ProSe function may send an authorization request containing RPAUID and request type set to “restricted discovery/announce” towards the ProSe application server. The authorization request may comprise allowed number of suffixes if restricted Direct Discovery with application-controlled extension is used. The request type may be set to “restricted discovery with application-controlled extension/announce”. The ProSe application server may answer by an authorization response containing PDUID(s) corresponding the RPAUID stored in the ProSe application server and response type set to “restricted discover/announce ack.” The authorization respond may include ProSe restricted code suffix pool with allocated suffixes by the ProSe Application if restricted direct discovery with application-controlled extension may be used. The response type may be set to “restricted discovery with application-controlled extension/announce ack.” The HPLMN ProSe function may assign a ProSe restricted code corresponding to the RPAUID in the discovery request and an associated validity timer which identifies the duration of validity of the ProSe restricted code. MCPTT UE may use this ProSe restricted code within this validity duration if PLMN is not changed. If restricted direct discovery with application-controlled is used, then HPLMN ProSe functions may assign ProSe restricted code prefix instead of ProSe restricted code. If discovery request message indicates “on demand” announcing and the “on demand” announcing is authorized and enabled based on application ID and operator’s policy, the HPLMN ProSe function may store RPAUID, PreSe restriced code (or ProSe restricted code prefix) with the associated validity timer, and enabled indicator in the user context. “On demand” announcing may only be activated based on an ongoing monitoring request, otherwise, the following steps may not be executed.

If the Discovery request is authorized, the HPLMN ProSe Function may construct announce authorization message containing RPAUID, MCPTT application ID, ProSe restricted code (or ProSe restricted code prefix with ProSe restricted code suffix pool if restricted direct discovery with application-controlled extension is used) set to assigned code for this request, UE ID set to IMSI or mobile station identifier number (MSISDN), discovery entry ID, and validity timer. The HPLMN ProSe function may update the existing announcing MCPTT UE’s discovery entry with the new ProSe restricted code (or the ProSe restricted code prefix with ProSe restricted code suffix pool if restricted direct discovery with application-controlled extension is used) and the new validity timer by using the MCPTT UE’s corresponding discovery entry ID included in the discovery request message. If discovery request message included discovery timer set to zero for a discovery entity ID, then the HPLMN ProSe function may inform the VPLMN ProSe function to remove resources for that discovery entry ID by setting the timer to zero. The HPLMN ProSe function may send the announce authorization message towards the VPLMN ProSe Function. The VPLMN ProSe function may acknowledge the HPLMN ProSe function that it authorizes the MCPTT UE to perform restricted discovery announcing if the announce authorization message contain a new discovery entry ID. If the discovery entry ID already exists, the VPLMN ProSe function may acknowledge the update as requested.

If the announcing is not “on-demand,” the HPLMN ProSe function may construct a discovery respond message with ProSe restricted code (or ProSe restricted code prefix with ProSe restricted code suffix pool if restricted direct discovery with application-controlled extension is used), validity timer, and discovery entity ID. If the announcing is “on-demand” and is authorized and enabled, the HPLMN ProSe function may construct the discovery respond message with validity timer, announcing enabled indicator, and discovery entity ID. The validity timer is set to zero if it is zero in discovery request message originated by the MCPTT UE. The HPLMN ProSe function may send the discovery respond message towards the MCPTT UE. MCPTT UE may start announcing the provided ProSe restricted code. if restricted direct discovery with application-controlled extension is used, the MCPTT UE may append a ProSe restricted code suffix from the received ProSe restricted code suffix pool to the ProSe Restricted Code Prefix to form a ProSe Restricted Code. The MCPTT UE may use different suffixes from the provided ProSe restricted code suffix pool to form and announce different ProSe restricted codes without having to contact the HPLMN ProSe function as long as the validity timer permits. If "on-demand" announcing is used and the HPLMN ProSe function has not provided ProSe restricted code (or ProSe restricted code prefix with ProSe restricted code suffix pool if restricted direct discovery with application-controlled extension is used), the MCPTT UE may need to wait for an announcing alert request message from the HPLMN ProSe function before announcing on PC5 interface.

Figure 9:
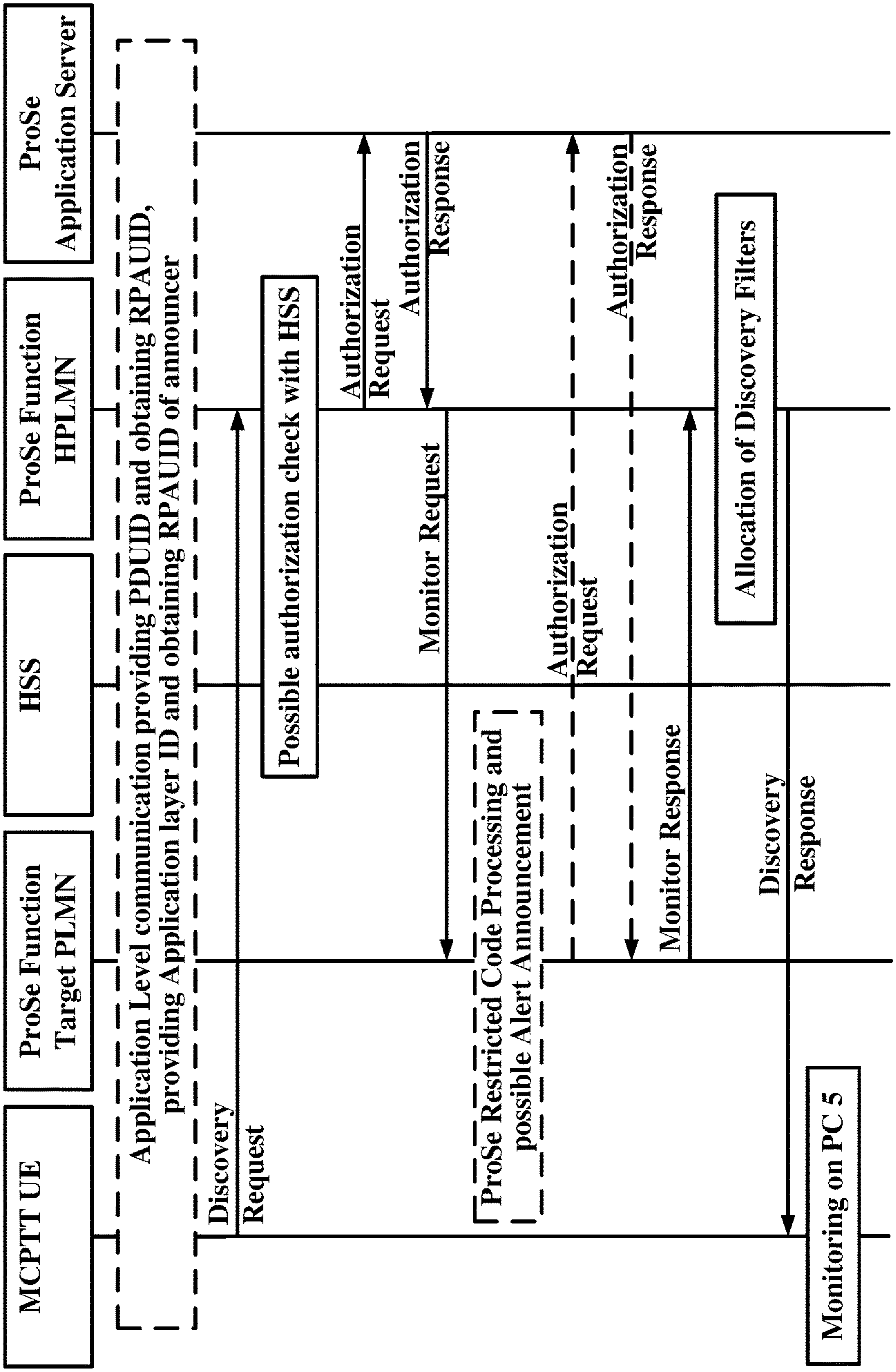
FIG. 9 is a flow diagram illustrating an example process for monitoring an MCPTT UE as per an aspect of an embodiment of the present invention.

FIG. 9 is a flow diagram illustrating an example process for monitoring an MCPTT UE. The procedure for monitoring MCPTT UE comprises an application client in the MCPTT UE retrieving a ProSe discovery UE identity (PDUID) and providing it to a ProSe application server. The ProSe application server may allocate a restricted ProSe application UE identity (RPAUID) for that PDUID, may store the binding between the PDUID and the RPAUID and may return the RPAUID to the application client in the MCPTT UE. The MCPTT UE may obtain RPAUIDs of those MCPTT target users from the ProSe Application Server passed in an application level container. RPAUID instead of PDUID is used since MCPTT is a public safety feature. In order to get the discovery filter, the monitoring MCPTT UE may construct a discovery request message comprising RPAUID set to the monitoring MCPTT UE identity, UE identity set to IMSI, command=monitor, discovery type, application ID set to unique identifier for the application that triggered discovery procedure, application level container compromising the Target RPAUIDs that the MCPTT UE is to monitor, discovery entry ID showing the discovery identity that it is a new discovery or an existing one, and the optional requested discovery timer. The requested discovery timer may be set to zero to indicate HPLMN to delete the discovery filter(s) for that discovery entry ID. The application level container may include some information about ProSe restricted code suffix such as group or user specific information if direct discovery with application-controlled extension is used. The MCPTT UE may send the discovery request message towards HPLMN ProSe function.

The HPLMN ProSe function may check for authorization for the MCPTT application. If there is not any associated MCPTT UE context, the HPLMN ProSe function may check with HSS and if needed may create a new context for the MCPTT UE that contains the subscription parameters for this MCPTT UE. HSS may also provide MSISDN of the MCPTT UE and PLMN ID of where the MCPTT UE is registered. The HPLMN ProSe function may send an authorization request containing RPAUID and request type set to "restricted discovery/monitor" towards the ProSe application server. If restricted direct discovery with application-controlled extension is used, the request type may then be set to "restricted discovery with application-controlled extension/monitor". The ProSe application server constructs an authorization response comprising target PDUIDs and corresponding Target RPAUID that the RPAUID in the authorization request may monitor, PDUID of the requesting MCPTT UE, and response type set to "restricted discovery/monitor ack" (or to "restricted discovery with application-controlled extension/monitor ack" if restricted direct discovery with application-controlled extension is used). The ProSe application server may send the authorization response towards the HPLMN ProSe function.

The HPLMN ProSe function may construct a monitor request message comprising RPAUID of monitoring MCPTT UE, UE identity set to IMSI or MSISDN, Target PDUID and corresponding target RPAUID, application ID set to unique identifier for application that triggered the discovery procedure, and discovery entry ID to identify the discovery entry being new or an existing one. The HPLMN ProSe function may send the monitor request towards the target PLMN ProSe function which belongs to the monitoring MCPTT UE. If the discovery entry ID is an existing one, the target PLMN ProSe function may modify the existing discovery procedure with the parameters included in the monitor request message.

The target PLMN ProSe function may retrieve the ProSe restricted code (or the ProSe restricted code prefix if the restricted direct discovery with application-controlled extension is used) corresponding to the targeted PDUID, targeted RPAUID, and application ID. If in the context of the announcing MCPTT UE, the announcing enabled indicator is stored, the target PLMN ProSe function may construct an announcing alert request message comprising RPAUID indicating which monitoring MCPTT UE is interested in the targeted MCPTT UE announcement, application ID set to unique identifier for the application that triggered discovery procedure, ProSe restricted code which was retrieved from the context of the targeted announcing MCPTT UE (or ProSe restricted code prefix with ProSe restricted code suffix pool if restricted direct discovery with application-controlled extension was requested by the announcing MCPTT UE), and discovery entry ID to indicate it is a new discovery entity or an existing one. The target PLMN PRoSe function may send the message towards the targeted MCPTT UE and upon receipt of the announce alert response message from that MCPTT announcing UE, the ProSe function removes the announcing enabled indication associated to the ProSe restricted code (or ProSe restricted code prefix with ProSe restricted code suffix pool if restricted direct discovery with application-controlled extension was requested by the announcing MCPTT UE) from the Announcing MCPTT UE context. The MCPTT UE may now start announcing the ProSe restricted code (or ProSe restricted code prefix with ProSe restricted code suffix pool if restricted direct discovery with application-controlled extension was requested by the announcing MCPTT UE).

The target ProSe function may construct an authorization request message comprising RPAUID set to that of the monitoring MCPTT UE, Request Type set to "restricted discovery/permission", and target RPAUID set to that of the announcing MCPTT UE. The target ProSe function may send the authorization request message towards the ProSe application server.

The ProSe application server may acknowledge the target ProSe function by constructing an authorization response message comprising PDUID of the announcing MCPTT UE which is to be monitored and response type set to "restricted discovery/permission ack" and by sending it towards the target PLMN ProSe function.

The target ProSe function constructs a monitor response message compromising ProSe restricted code (or ProSe restricted code prefix with ProSe restricted code suffix pool if restricted direct discovery with application-controlled extension was requested by the announcing MCPTT UE) and the corresponding validity timer. The target ProSe function may send the monitor response message towards the HPLMN ProSe function.

From the ProSe application server, the HPLMN ProSe function has now retrieved the ProSe restricted code (or ProSe restricted code prefix with ProSe restricted code suffix pool if restricted direct discovery with application-controlled extension was requested by the announcing MCPTT UE) and the corresponding validity timer for each pair of target PDUID-target RPAUID bound with application ID and stored as the user content of the monitoring MCPTT UE. The HPLMN ProSe function based on the ProSe restricted code (or ProSe restricted code prefix with ProSe restricted code suffix pool if restricted direct discovery with application-controlled extension was requested by the announcing MCPTT UE) and the corresponding validity timer, allocates a discovery filter with corresponding time-to-live (TTL).

The HPLMN ProSe function may construct a discovery response message comprising target RPAUID(s) and the corresponding discovery filter(s) that comprises ProSe restricted code (or ProSe restricted code prefix with ProSe restricted code suffix pool if restricted direct discovery with application-controlled extension was requested by the announcing MCPTT UE) to be monitored and the corresponding TTL showing how long the filter is valid. If the requested discovery timer in discovery request message sent by MCPTT monitoring UE was set to zero, the TTL in the discovery response message is set to zero. The discovery response message also comprises discovery entry ID to identify the discovery entity. The HPLMN ProSe function may send the discovery response message towards the monitoring MCPTT UE. The MCPTT UE may use the discovery filter to monitor the announcing MCPTT UE.

Figure 10:
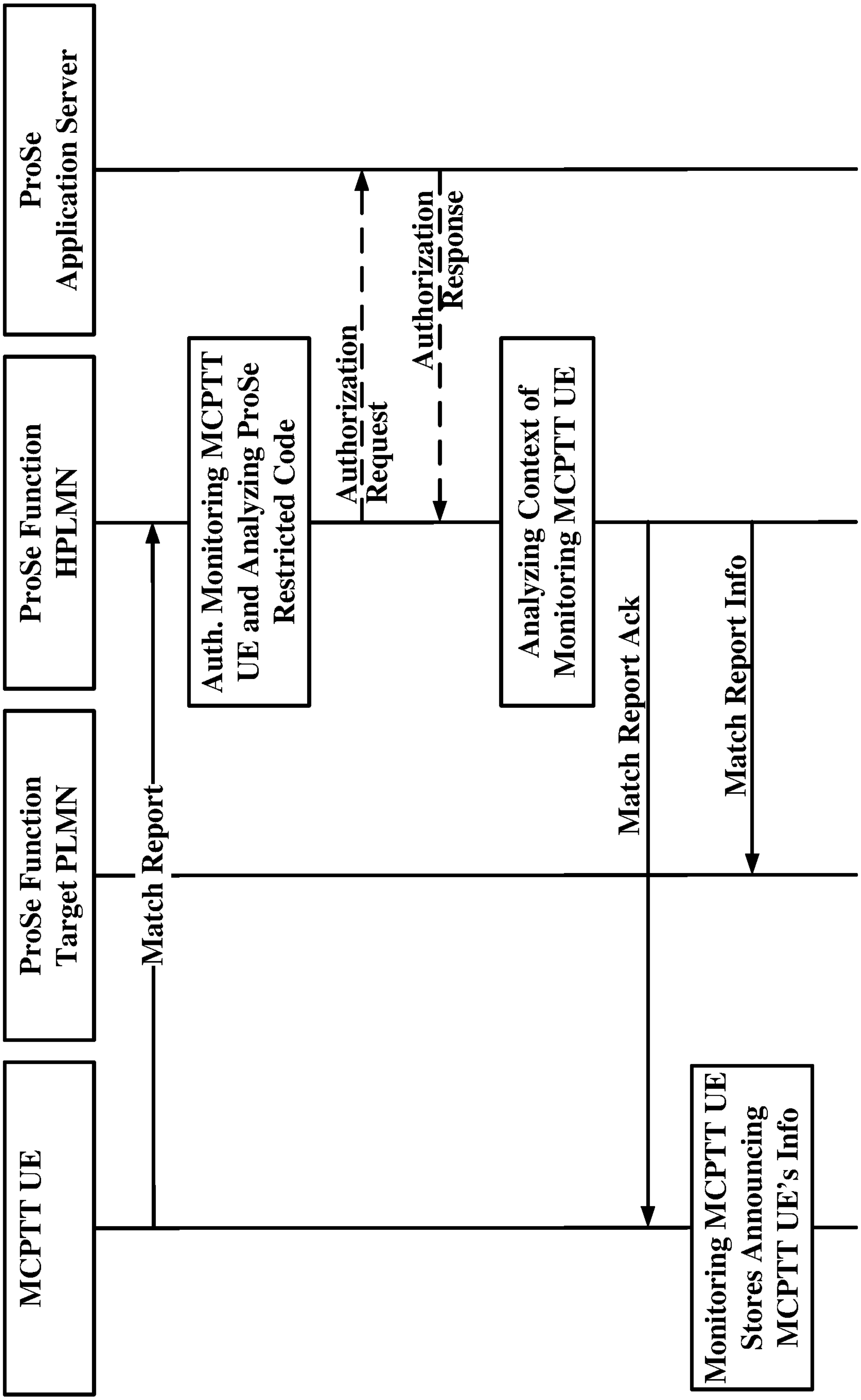
FIG. 10 is a flow diagram illustrating an example procedure in the matched report announcing and/or monitoring as per an aspect of an embodiment of the present invention.

FIG. 10 illustrates a flow diagram showing procedure for match report announcing and/or monitoring. The procedure for match report for announcing/monitoring is if the monitoring MCPTT UE has over the air received a ProSe restricted code (or the ProSe restricted code prefix and the ProSe restricted code suffix if the restricted direct discovery with application-controlled extension is used) is matching the discovery filter obtained in the discovery response message from the HPLMN ProSe function but the announcing MCPTT UE does not have an RPAUID with a valid TTL, the monitoring MCPTT UE may construct a match report message comprising its own RPAUID, its IMSI or MSISDN as UE identity, discovery type set to "restricted discovery", application ID set to unique identifier for the application that triggered the monitoring request, the over the air received ProSe restricted code, optional metadata requested, and announcing PLMN ID of the PLMN where the announcing MCPTT UE was monitored. The monitoring MCPTT UE transmits the match report message towards the HPLMN ProSe function.

The HPLMN ProSe function may verify if the monitoring MCPTT UE may perform restricted discovery and may analyze ProSe restricted code (or the ProSe restricted code prefix and the ProSe restricted code suffix if the restricted direct discovery with application-controlled extension is used). The HPLMN ProSe function may identify the announcing MCPTT UE's RPAUID in the context of the monitoring MCPTT UE.

If metadata requested was included to the originated match report message by the monitoring MCPTT UE, the HPLMN ProSe function may locate the ProSe application server from the application ID and may construct an authorization request message comprising monitoring MCPTT UE's RPAUID, announcing MCPTT UE's RPAUID, and request type set to "restricted discovery/match". The HPLMN ProSe function may send the authorization request message towards the ProSe application server. This step is optional if metadata requested was not included into the original match report message.

The ProSe application server may construct an authorization response comprising monitoring MCPTT UE's PDUID, announcing MCPTT UE's PDUID, response type set to "restricted discovery/match ack", and metadata corresponding to the Announcing MCPTT UE.

The HPLMN ProSe function may verify that the PDUID belongs to the monitoring MCPTT UE and the announcing MCPTT UE's PDUID are the same as the announcing MCPTT UE's PDUID that is stored in the context of the Monitoring MCPTT UE.

The HPLMN ProSe function may construct a match report ack comprising application ID set to unique identifier for the application that triggered the monitoring request, announcing MCPTT UE's RPAUID, validity timer, and optionally meta data.

The monitoring MCPTT UE may store the mapping between the ProSe restricted code (or the ProSe restricted code prefix and the ProSe restricted code suffix if the restricted direct discovery with application-controlled extension is used), announcing MCPTT UE's PRAUID, the application ID unique identifier of the application that triggered the monitoring procedure, and the related validity timer.

The HPLMN ProSe function may construct a Mach Report Info message comprising Monitoring MCPTT UE's RPAUID, announcing MCPTT UE's RPAUID, announcing MCPTT UE's identity set to IMSI or MSISDN for charging purposes, ProSe restricted code (or the ProSe restricted code prefix and the ProSe restricted code suffix if the restricted direct discovery with application-controlled extension is used), and discovery type set to "restricted discovery". The HPLMN ProSe function may send the match report info message towards the announcing MCPTT UE's PLMN ProSe function and the ProSe function of the PLMN where the announcing MCPTT UE may be roaming in.

In Model B, the discoverer MCPTT UE may use ProSe query code to find the discoveree MCPTT UE. The discoveree MCPTT UE may use ProSe response code to identify itself. The ProSe response code is sent by the discoveree MCPTT UE over the air upon receiving a ProSe query code matching any discovery query filter(s). The discoverer MCPTT UE discovers then the discoveree MCPTT UE by matching the ProSe response code to any discovery response filter(s). The ProSe query code, and the discovery response filter(s) are allocated by HPLMN ProSe function to the discoverer MCPTT UE. The ProSe response code and discovery query filter(s) are allocated by the HPLMN ProSe function to the discoveree MCPTT UE.

Model B compromises procedure for the discoveree MCPTT UE and procedure for the discoverer MCPTT UE procedure. It may include matching procedure for the case when the discoverer MCPTT UE receives ProSe response code over the air that matches the discovery filter provided by the HPLMN ProSe function to the discoveree MCPTT UE in the discovery response message, however the corresponding RPAUID does not have valid validity timer. Model B may be for restricted discovery.

Figure 11:
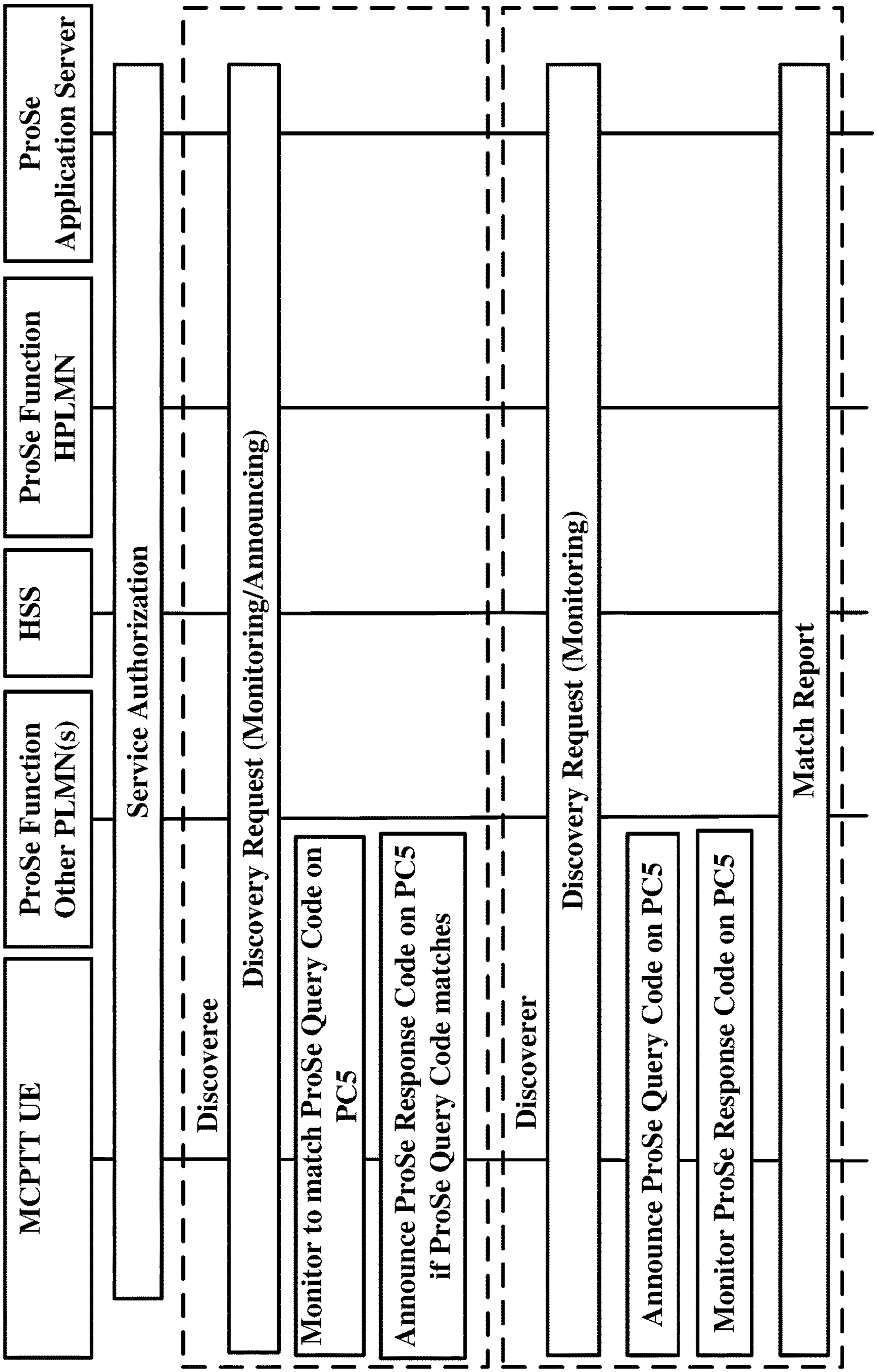
FIG. 11 is a flow diagram illustrating an example procedure for Model B discovery as per an aspect of an embodiment of the present invention.

FIG. 11 is a flow diagram illustrating an example procedure for Model B discovery. The procedure for Model B discovery comprises authorization, discoveree procedure, and discoverer procedure.

Authorization, where the MCPTT UE may get authorized for restricted ProSe direct discovery. In an example, MCPTT may be public safety and the ProSe direct discovery may be restricted.

Discoveree procedure, where the discoveree MCPTT UE may request for discovery and may receive the ProSe response code and associated discovery query filter(s). The discoveree MCPTT UE may employ the discovery filter(s) to monitor ProSe query code on PC5. The discoveree MCPTT UE may announce the ProSe response code if receiving a ProSe query code over the air which matches any of discovery filter(s).

Discoverer procedure, where the discoverer MCPTT UE may request for discovery and may receive the ProSe query code and associated discovery response filter(s). The discoverer MCPTT UE may announce the ProSe query code on PC5 interface. The discoverer MCPTT UE may monitor ProSe response code on PC5 interface that may match any of the discovery response filter(s). The discoverer UE may match-report if having discovered ProSe response code with corresponding PRAUID with no valid validity timer. The discoveree, discoverer, and match-report procedures are explained below.

Figure 12:
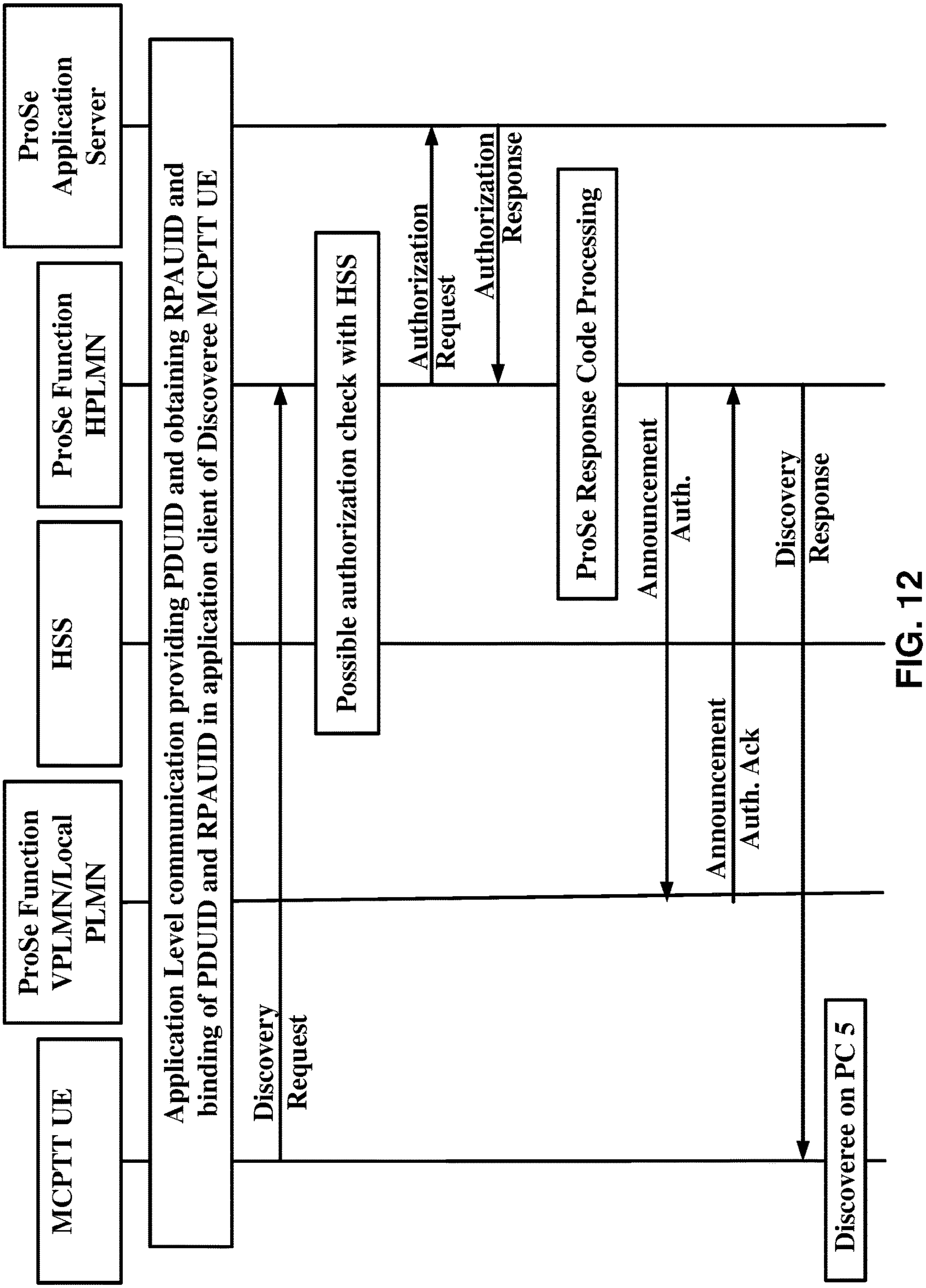
FIG. 12 is a flow diagram illustrating an example procedure for a discoveree MCPTT UE as per an aspect of an embodiment of the present invention.

FIG. 12 is a flow diagram illustrating an example procedure for a discoveree MCPTT UE as per an aspect of an embodiment of the present invention. The procedure for discoveree MCPTT UE is that he application client in the MCPTT UE may retrieve the ProSe discovery UE identity (PDUID) and may provide it to the ProSe application server. The ProSe application server may allocate a restricted ProSe application UE identity (RPAUID) for that PDUID, may store the binding between the PDUID and the RPAUID and may return the RPAUID to the application client in the MCPTT UE. The application client in the MCPTT UE may store the binding between the RPAUID and its own PDUID and may use those RPAUID to perform discoveree request procedure.

The discoveree MCPTT UE may establish connection to HPLMN ProSe function and may construct a discovery request message comprising RPAUID set to what the MCPTT UE will announce, UE identity set to IMSI, command indicating this is for discoveree UE, discovery type set to "restricted discovery", discovery model indicating Model B, application ID set to unique identifier for the application that triggered discovery procedure, discovery entry ID showing the discovery identity that it is a new discovery or an existing one, and PLMN ID of the carrier frequency in announcing PLMN ID if the serving PLMN signaled carrier frequency is not operated by HPLMN or VPLMN and if inter-PLMN ProSe discovery transmission is supported. MCPTT UE may send the discovery request message to HPLMN ProSe function.

HPLMN ProSe function may check for authorization for the MCPTT application. If there is not any associated MCPTT UE context, the HPLMN ProSe function may check with HSS and if needed may create a new context for the MCPTT UE that contains the subscription parameters for this MCPTT UE. HSS may provide MSISDN of the MCPTT UE and PLMN ID of where the MCPTT UE is registered.

The HPLMN ProSe function may locate the ProSe application server based on the application ID in the discovery request message and may send an authorization request containing RPAUID and request type set to "restricted discovery/response" towards the ProSe application server.

The ProSe application server may answer by an authorization response containing PDUID(s) corresponding the RPAUID stored in the ProSe application server and response type set to "restricted discover/response ack".

The HPLMN ProSe function may verify that at least of one of the PDUID(s) may belong to the discovree MCPTT UE. The HPLMN ProSe function may assign a ProSe response code and ProSe query code with the associated discovery query filter(s). The ProSe response code corresponds to the RPAUID in the discovery request and the HPLMN ProSe function may assign an associated validity timer for the ProSe response code and ProSe query code with the associated discovery query filter(s). The validity timer identifies the duration of validity of the ProSe response code and ProSe query code with the associated discovery query filter(s). The discoveree MCPTT UE may use this ProSe response code within this validity duration if PLMN is not changed. The HPLMN ProSe function may store ProSe response code with its associated validity timer and ProSe query code with associated discovery query filter(s) in the context of the MCPTT user.

If the discovery request is authorized, HPLMN ProSe function may construct announce authorization message containing RPAUID, MCPTT application ID, ProSe response set to assigned code for this request, UE ID set to IMSI or MSISDN, discovery entry ID to identify the discovery entry, and validity timer indicating how long the ProSe response code will be valid. The HPLMN ProSe function may send the announce authorization message towards the VPLMN ProSe function.

The VPLMN ProSe function may acknowledge the HPLMN ProSe function that it authorizes the MCPTT UE to perform restricted discovery announcing if the announce authorization message contain a new discovery entry ID. If the discovery entry ID already exists, the VPLMN ProSe function may acknowledge the update as requested i.e. updating the discoveree MCPTT UE's discovery entry by the new ProSe response code and its associated validity timer.

The HPLMN ProSe function may construct a discovery response message with discovery type set to Model B, ProSe response code, discovery query filter(s) suited for certain ProSe Query code, validity timer associated to ProSe response code and the discovery query filter(s), and discovery entity ID to identify the discovery identity. The MCPTT discoveree UE may use the discovery query filter(s) (which may be multiple) to determine which ProSe query code triggers that the MCPTT discoveree UE announces the assigned ProSe response code. The HPLMN ProSe function may send the discovery response message towards MCPTT discoveree UE.

The MCPTT discoveree UE may use the discovery query filter(s) which many be multiple to determine which ProSe query code triggers that the MCPTT discoveree UE announces the assigned ProSe response code. If the validity timer expires, the MCPTT discoveree ue may send a new discovery request message towards the HPLMN ProSe function.

Figure 13:
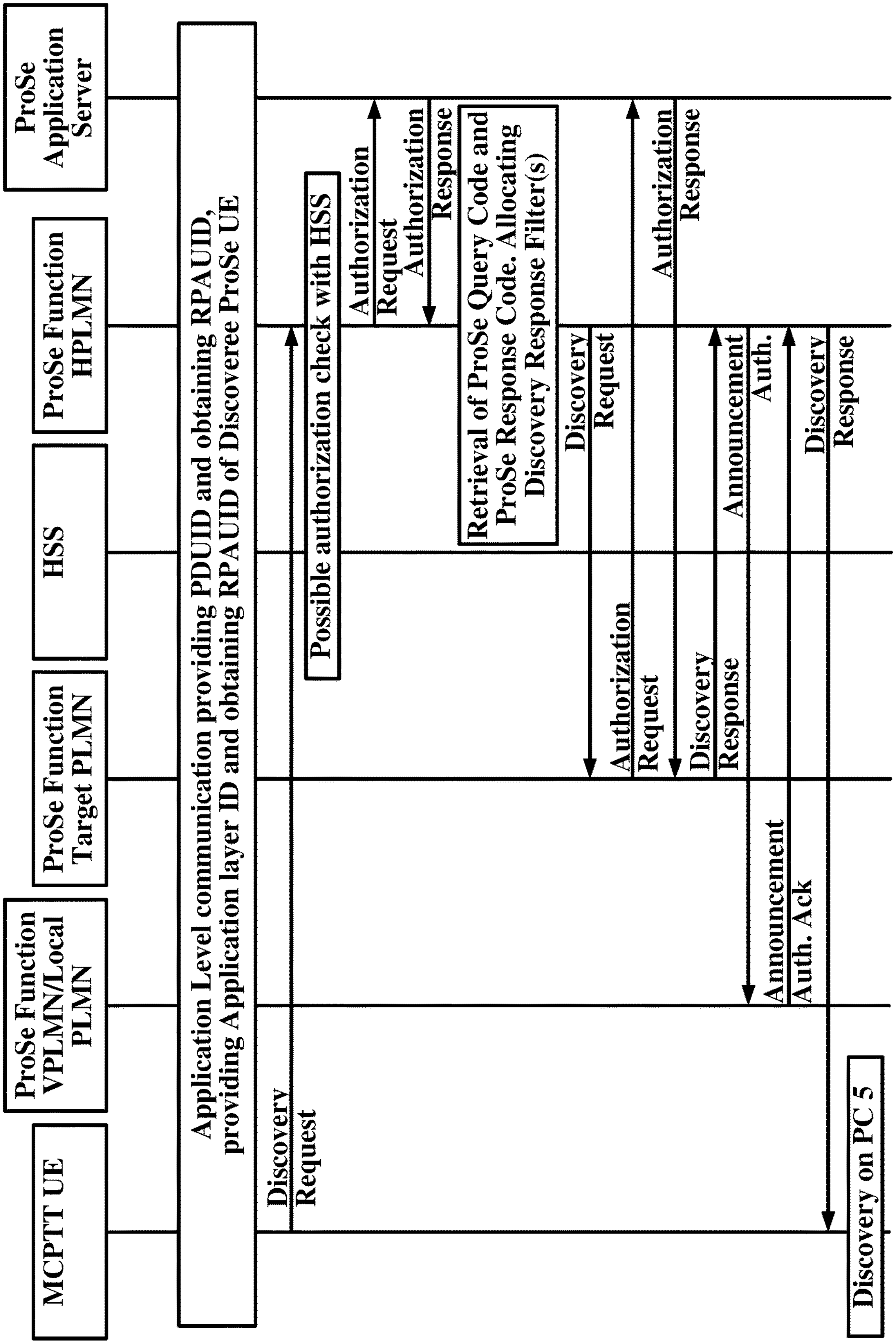
FIG. 13 is a flow diagram illustrating an example procedure for a discoverer MCPTT UE as per an aspect of an embodiment of the present invention.

FIG. 13 illustrates an example flow diagram showing the procedure for discoverer MCPTT UE. The procedure for the discoverer MCPTT UE comprises an application client in the MCPTT UE retrieving a ProSe discovery UE identity (PDUID) and providing it to the ProSe application server. The ProSe application server allocates a restricted ProSe application UE identity (RPAUID) for that PDUID, may store the binding between the PDUID and the RPAUID and may return the RPAUID to the application client in the MCPTT UE. The MCPTT UE may obtain RPAUIDs of those MCPTT target users from the ProSe application server passed in an application level container. RPAUID instead of PDUID may be used for public safety feature MCPTT.

The discoverer MCPTT UE may establish connection to the MPLMN ProSe function and may construct a discovery request message comprising RPAUID set to what the discoverer MCPTT UE wants to announce, UE identity set to IMSI, command showing this is for ProSe query procedure, discovery type set to "restricted discover", discovery model set to Model B, application ID set to unique identifier for the application that triggered discovery procedure, application level container compromising the target RPAUIDs that the MCPTT UE is to discover, discovery entry ID showing the discovery identity that it is a new discovery or an existing one, and the optional requested discovery timer. The requested discovery timer is set to zero to indicate HPLMN to delete the discovery filter(s) for that discovery entry ID. The MCPTT UE may send the discovery request message towards HPLMN ProSe Function.

HPLMN ProSe function may check for authorization for the MCPTT application. If there is not any associated MCPTT UE context, the HPLMN ProSe function may check with HSS and if needed may create a new context for the MCPTT UE that contains the subscription parameters for this MCPTT UE. HSS may provide MSISDN of the MCPTT UE and PLMN ID of where the MCPTT UE is registered.

The HPLMN ProSe function may locate the ProSe application server based on the application ID in the discovery request message and may send an authorization request containing RPAUID, request type set to "restricted discovery/query", and application level container towards the ProSe application server.

The ProSe application server may construct an authorization response comprising target PDUIDs and corresponding target RPAUID that the RPAUID in the authorization request may discover, PDUID of the requesting MCPTT UE, and response type set to "restricted discovery/query ack". The ProSe application server may send the authorization response towards the HPLMN ProSe function.

The HPLMN ProSe function may allocate the context for the discoveree UE(s) if the PLMN ID in the target PDUID-target RPAUID corresponds to a valid ProSe response code. The HPLMN ProSe function may allocate the discovery response filter(s) which trigger the MCPTT discoveree UE to transmit the ProSe response code. This procedure has expiration time which is specified by validity timer.

The HPLMN ProSe function may construct a discovery request message comprising RPAUID of discoveree MCPTT UE, UE identity set to IMSI or MSISDN, target PDUID and corresponding target RPAUID, application ID set to unique identifier for application that triggered the discovery procedure, and discovery entry ID to identify the discovery entry being new or an existing one. The HPLMN ProSe function may send the discovery request towards the target PLMN ProSe Function which belongs to the discoveree MCPTT UE. If the discovery entry ID is an existing one, the Target PLMN ProSe function may modify the existing discovery procedure with the parameters included in the discovery request message.

The target ProSe Function has an option to construct an authorization request message comprising RPAUID set to that of the discoverer MCPTT UE, Request Type set to "restricted discovery/query", and target RPAUID set to that of the discoveree MCPTT UE. The target ProSe function may send the authorization request message towards the ProSe application server.

The ProSe application server may acknowledge the target ProSe function by constructing an authorization response message comprising PDUID of the discovery MCPTT UE, response type set to "restricted discovery/query ack", and target PDUID of the discoveree MCPTT UE. The ProSe application server may send the authorization response message towards the target PLMN ProSe function.

The target PLMN ProSe function may allocate the context of the discoveree MCPTT UE based on target PDUEID-target RPAUID and the application ID. The target PLMN ProSe function may respond with a discovery response comprising ProSe query code which will be used by HPLMN ProSe function to build the discovery query filter so that it triggers the discoveree UE to send ProSe Response code, the actual ProSe response code, and validity timer to indicate for how long the ProSe Query code and ProSe response code are valid.

The HPLMN ProSe function may construct an announce authorization message comprising RPAUID of the discovery MCPTT UE, application ID, ProSe query code and its associated validity timer, UE identity set to IMSI or MSISDN of discovery MCPTT UE for charging purposes in the visiting domain, and discovery entry ID to identify the discovery entry. The HPLMN ProSe function may send the announce authorization message towards the VPLMN ProSe function.

The VPLMN may acknowledge that it authorizes the discovery MCPTT UE to perform ProSe direct discovery procedure. If the discovery entry ID in the announce authorization message corresponded an already discovery entry, the VPLMN ProSe function may acknowledge the replacement of the existing ProSe query code and its associated validity timer.

The HPLMN ProSe function may construct the discovery response message comprising discovery model set to Model B, ProSe query code, one or multiple discovery response filters which are generated by the HPLMN ProSe function based on ProSe response code, and validity timer for how long the ProSe query code and discovery response filter(s) are valid. The HPLMN ProSe Function may transmit the Discovery Response message to the Discoverer MCPTT UE.

The discoverer MCPTT UE may obtain the information from the discovery response message to discover discoveree MCPTT UE. If the validity timer is expired, the discoverer MCPTT UE may send a new discovery request message towards the HPLMN ProSe function.

Figure 14:
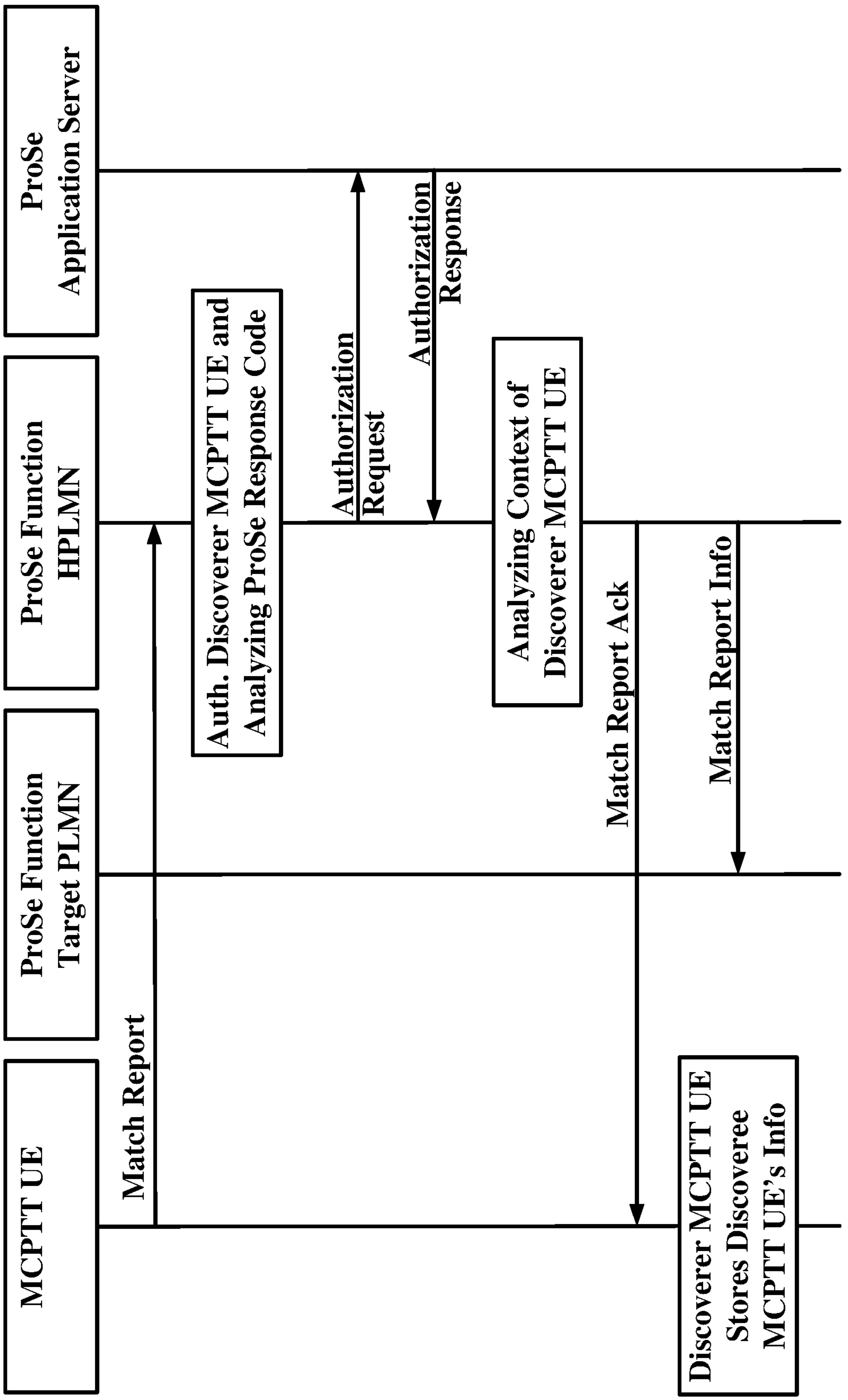
FIG. 14 is a flow diagram illustrating an example procedure for a matched report for a discoveree/discoverer as per an aspect of an embodiment of the present invention.

FIG. 14 illustrates an example flow diagram showing the procedures for a matched report for discoveree/discoverer. The procedure for a match report for a discoveree/discoverer comprises if the discoverer MCPTT UE may have received over the air a ProSe response code is matching the discovery response filter obtained in the discovery response message from the HPLMN ProSe function but the discoveree MCPTT UE does not have an RPAUID with a valid TTL, the discoverer MCPTT UE may construct a match report message comprising its own RPAUID, its IMSI or MSISDN as UE Identity, discovery type set to "restricted discovery", application ID set to unique identifier for the application that triggered the monitoring request, the over the air received ProSe response code, optional metadata requested, and discoveree PLMN ID of the PLMN where the discoveree MCPTT UE was discovered. The discovere MCPTT UE may transmit the match report message towards the HPLMN ProSe Function.

The HPLMN ProSe function may verify if the discoverer MCPTT UE has performed restricted discovery and may analyze Prose response code. The HPLMN ProSe function may identify the discoveree MCPTT UE's RPAUID in the context of the discoverer MCPTT UE.

If metadata requested was included to the originated match report message by the discoverer MCPTT UE, the HPLMN ProSe function may locate the ProSe application server from the application ID and may construct an authorization request message comprising discoverer MCPTT UE's RPAUID, discoveree MCPTT UE's RPAUID, and request type set to "restricted discovery/match". The HPLMN ProSe function may send the authorization request message towards the ProSe application server. This step is optional if metadata requested was not included into the original match report message.

The ProSe application server may construct an authorization response comprising discoverer MCPTT UE's PDUID, discoveree MCPTT UE's PDUID, response type set to "restricted discovery/match ack", and metadata corresponding to the discoveree MCPTT UE.

The HPLMN ProSe function may verify that the PDUID belongs to the discoverer MCPTT UE and the discoveree MCPTT UE's PDUID are the same as the discoveree MCPTT UE's PDUID that is stored in the context of the discoverer MCPTT UE.

The HPLMN ProSe function may construct a match report ack comprising application ID set to unique identifier for the application that triggered the discovery request, discoveree MCPTT UE's RPAUID, validity timer, and optionally meta data.

The discoverer MCPTT UE may store the mapping between the ProSe response code, discoveree MCPTT UE's PRAUID, the application ID unique identifier of the application that triggered the discovery procedure, and the related validity timer.

The HPLMN ProSe Function may construct a mach report info message comprising discoverer MCPTT UE's RPAUID, discoveree MCPTT UE's RPAUID, discoveree MCPTT UE's Identity set to IMSI or MSISDN for charging purposes, ProSe response code, and discovery type set to "restricted discovery". The HPLMN ProSe function may send the match report info message towards the discoveree MCPTT UE's PLMN ProSe function and the ProSe function of the PLMN where the discoveree MCPTT UE may be roaming in.

A public safety ProSe (MCPTT) UE may provide the functionality to support connectivity to the network for a remote MCPTT UE. An MCPTT UE is considered to be remote if it has established a successful PC5 link connection to a UE-to-Network relay. A remote MCPTT UE may be out of E-UTRAN coverage. An MCPTT UE may be within a coverage of E-UTRAN and may choose not to use E-UTRAN coverage. At the time of discovery ProSe relay service codes for MCPTT services in the MCPTT UE-to-Network relay are recognized by the remote MCPTT UE to identify the MCPTT UE-to-Network relay. Relay service codes are pre-provisioned in the MCPTT UE-to-Network relay and the remote MCPTT UE and are communicated by discovery announcement message for Model A ProSe discovery and by discovery solicitation message/discovery response message for Model B ProSe discovery.

Figure 15:
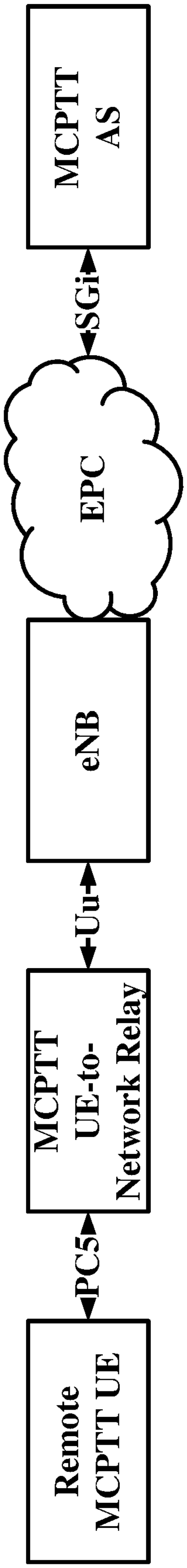
FIG. 15 is a block diagram of an example MCPTT UE-to-network relay as per an aspect of an embodiment.

FIG. 15 is a block diagram of an example MCPTT UE-to-network relay as per an aspect of an embodiment. The remote MCPTT UE may employ the MCPTT UE-to-Network relay to access E-UTRAN and thereby performing IMS registration and also MCPTT call establishment.

The MCPTT UE-to-Network relay may function as a relay for unicast traffic between remote UE and the network by relaying any IP traffic to the UE. The MCPTT UE-to-Network relay may function as a relay for multicast broadband multicast service (MBMS) traffic using one ProSe Direct Communication.

In this context, the MCPTT UE may be represented by a remote MCPTT UE and a UE-to-Network MCPTT UE which have PC5 interface to each other. This may be transparent to the E-UTRAN network and/or IMS network.

To set up an on-network MCPTT call, the MCPTT UEs may register with IP Multimedia Subsystem (IMS) network. At the time of registration to the IMS network, an MCPTT UE may include its supported IMS communication service identifier (ICSI) values for the IMS communication services it intends to use. The MCPTT UE may register its supported IMS application reference identifier (IARI) values for the IMS applications it intends to use at the time of IMS registration as described here. The UE may include supported ICSI values in a g.3gpp.icsi-ref media feature tag for the IMS communication services it intends to use, and IARI values, for the IMS applications it intends to use in a g.3gpp.iari-ref media feature tag. The UE may include the media feature tags for supported streaming media types.

Figure 16:
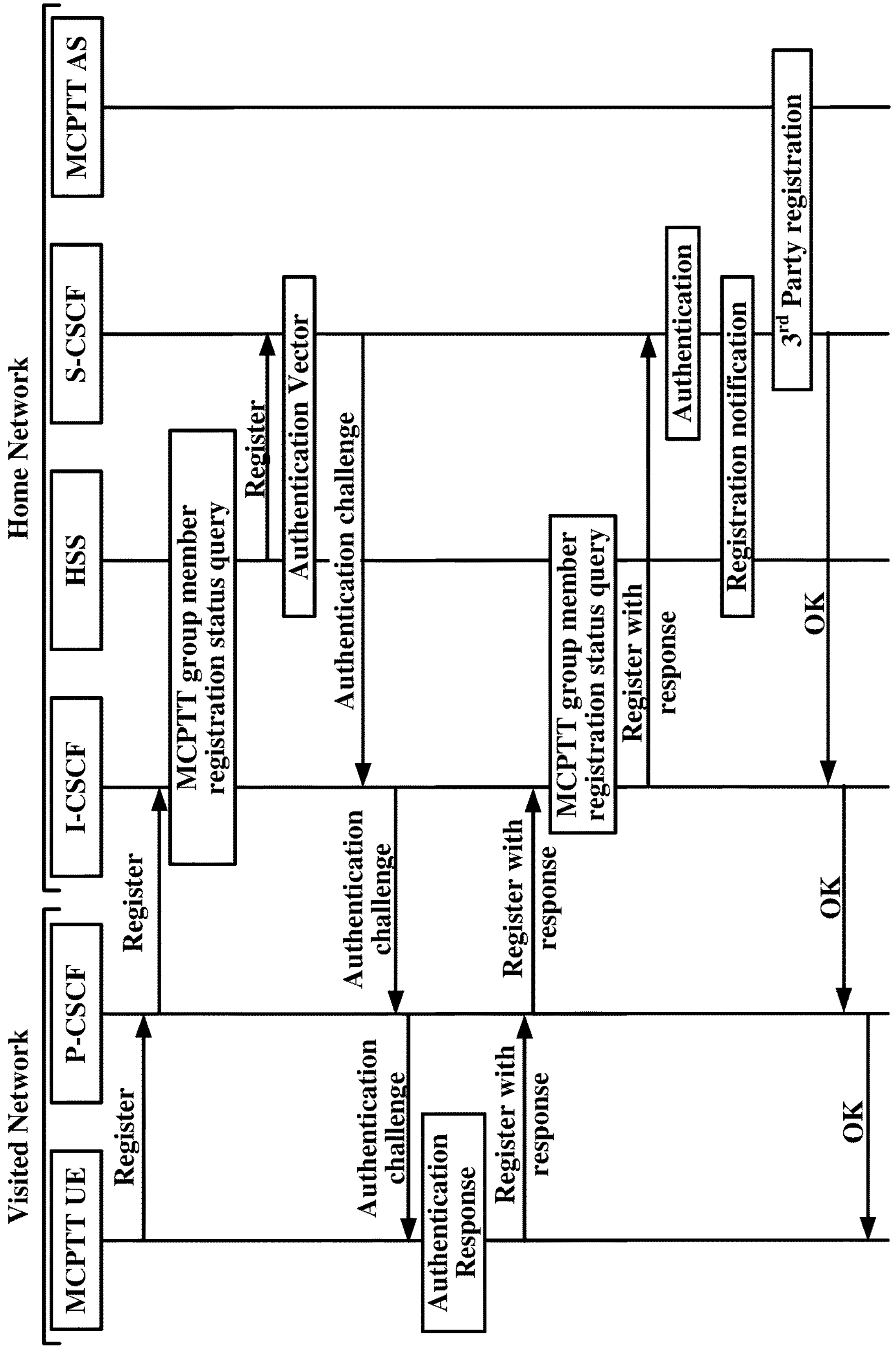
FIG. 16 is a flow diagram showing an example IMS registration procedure of an MCPTT UE as per an aspect of an embodiment.

FIG. 16 illustrates a flow diagram showing IMS registration of an MCPTT UE. MCPTT UE may send a SIP REGISTER request containing MCPTT feature tag in contact header field towards the P-CSCF in the visiting network; P-CSCF may use the MCPTT UE's ID to locate the I-CSCF in the home network by DNS query; I-CSCF in the home network may select suitable S-CSCF with help of HSS; S-CSCF may challenge the registration by requesting an authentication. If the authentication information is not valid, S-CSCF may get it from HSS; MCPTT UE may provide authentication response and may send the SIP REGISTER request containing authentication response and the MCPTT feature tag in the contact header towards the P-CSCF in the visiting network; P-CSCF may use the MCPTT UE's ID to locate the I-CSCF in the home network by DNS query; I-CSCF in the home network may select suitable S-CSCF with help of HSS; S-CSCF may authenticate the MCPTT UE and may send registration notification to the HSS and may receive the MCPTT user profile from the HSS; The MCPTT user profile may be used for the 3rd party register to the MCPTT application server (AS); and S-CSCF may respond to OK to the MCPTT UE.

Existing MCPTT calls may include audio. The existing MCPTT does not support various enhanced call capabilities. There is a need to enhance MCPTT signaling to support advanced call capabilities. In an example embodiment, enhanced MCPTT calls may include capabilities such as audio, video, data, full duplex, dispatching, and/or administering. To avoid or reduce any possible compatibility issues, new service or application identifiers may be implemented for the additional capabilities. An example embodiment, enhances ICSI to indicate different capabilities for MCPTT e.g. audio, video, data, full duplex, dispatching, and/or administering capabilities. One or more IMS service parameters be communicated during the registration process to indicate at least one MCPTT capability to a network server, e.g. a proxy server, a registrar server.

The wireless device registers one or more IMS communication service identifiers (ICSIs) of push-to-talk (e.g. mission critical PTT) in a wireless network. one of the one or more ICSIs indicates at least one of audio, video, data, full duplex, dispatching, and/or administering capabilities of the wireless device. ICSI may be in the form of a media feature tag. A feature tag may indicate one or more capability of the wireless device. For, example a specific feature tag, such as 3gpp-service.ims.icsi.mcpttvideo may indicate video capability. This is an example, other features tag names may be used. One or more ICSI may indicate a combination of at least two of audio, video, data, full duplex, dispatching, and/or administering capabilities of the wireless device. For example, a feature tag 3gpp-service.ims.icsi.mcpttmedia, may indicate capability for both audio and video.

In another example, one or more additional parameters may be included in the registration message along with a feature tag to indicate the wireless device capability or a combination of one or more capabilities of the wireless device.

In an implementation, the wireless device may transmit the registration message to a UE relay which relays to message to a network node. The wireless device may discover the UE relay using discovery model A or model B. In an example, the UE relay may decode the registration message and may update the message headers before retransmitting the message. The UE relay may update the source and destination address in the registration message.

In an example, the registration message may further register one or more IMS application reference identifiers (IARIs). One of the one or more IARIs may indicate at least one of audio, video, data, full duplex, dispatching, and/or administering capabilities of the wireless device. IARI may be in the form of a media feature tag. A feature tag may indicate one or more capability of the wireless device. For, example a specific feature tag, such as 3gpp-application.ims.iari.mcpttvideo may indicate video capability. This is an example, other features tag names may be used. One or more IARI may indicate a combination of at least two of audio, video, data, full duplex, dispatching, and/or administering capabilities of the wireless device. For example, a feature tag 3gpp-application.ims.iari.mcpttmedia, may indicate capability for both audio and video.

In an example embodiment, the wireless device may register one or more IMS application reference identifiers (IARIs) of push-to-talk in a wireless network. One of the one or more IARIs indicates at least one of audio, video, data, full duplex, dispatching, and/or administering capabilities of the wireless device. In an example, the one or more IARIs may indicate a combination of at least two of audio, video, data, full duplex, dispatching, and/or administering capabilities of the wireless device. The wireless device may further registering one or more IMS communication service identifiers (ICSIs. One of the one or more ICSIs indicates at least one of video and data capabilities of the wireless device.

In an example, the wireless device may register one or more IMS service parameters of push-to-talk in a wireless network. The one or more IMS service parameters may indicate a combination of at least two of audio, video, data, full duplex, dispatching, and/or administering capabilities of the wireless device. The one or more IMS service parameters indicate at least one of audio, video, data, full duplex, dispatching, and/or administering capabilities of the wireless device.

In an example, the embodiments may include enhanced service identifiers representing new services such as 3gpp-service.ims.icsi.mcpttaudio; 3gpp-service.ims.icsi.mcpttvideo; 3gpp-service.ims.icsi.mcpttdata; 3gpp-service.ims.icsi.mcpttfullduplex; 3gpp-service.ims.icsi.mcpttdispatcher; and 3gpp-service.ims.icsi.mcpttadminiter.

In an example, the embodiments may include enhanced application identifiers that represent applications for the MCPTT service 3gpp-service.ims.icsi.mcptt; 3gpp-application.ims.iari.mcpttaudio; 3gpp-application.ims.iari.mcpttvideo; 3gpp-application.ims.iari.mcpttdata; 3gpp-application.ims.iari.mcpttfullduplex; 3gpp-application.ims.iari.mcpttdispatcher; and 3gpp-application.ims.iari.mcpttadminister.

Release 13 of MCPTT supports audio with service identifier 3gpp-service.ims.icsi.mcptt. In an example embodiment, in order to maintain interoperability with release 13, release 14 may create three enhanced service identifiers for MCPTT, MCPTT video, and MCPTT data, such as 3gpp-service.ims.icsi.mcpttdefault; 3gpp-service.ims.icsi.mcpttvideo; 3gpp-service.ims.icsi.mcpttdata; 3gpp-service.ims.icsi.mcpttfullduplex; 3gpp-service.ims.icsi.mcpttdispatcher; and 3gpp-service.ims.icsi.mcpttadminister.

In an example, two enhanced application identifier for MCPTT video and MCPTT data and a service identifier for default MCPTT may be employed 3gpp-service.ims.icsi.mcpttdefault; 3gpp-application.ims.iari.mcpttvideo; 3gpp-application.ims.iari.mcpttdata; 3gpp-application.ims.iari.mcpttfullduplex; 3gpp-application.ims.iari.mcpttdatadispatcher; and 3gpp-application.ims.iari.mcpttadminister.

Figure 17:
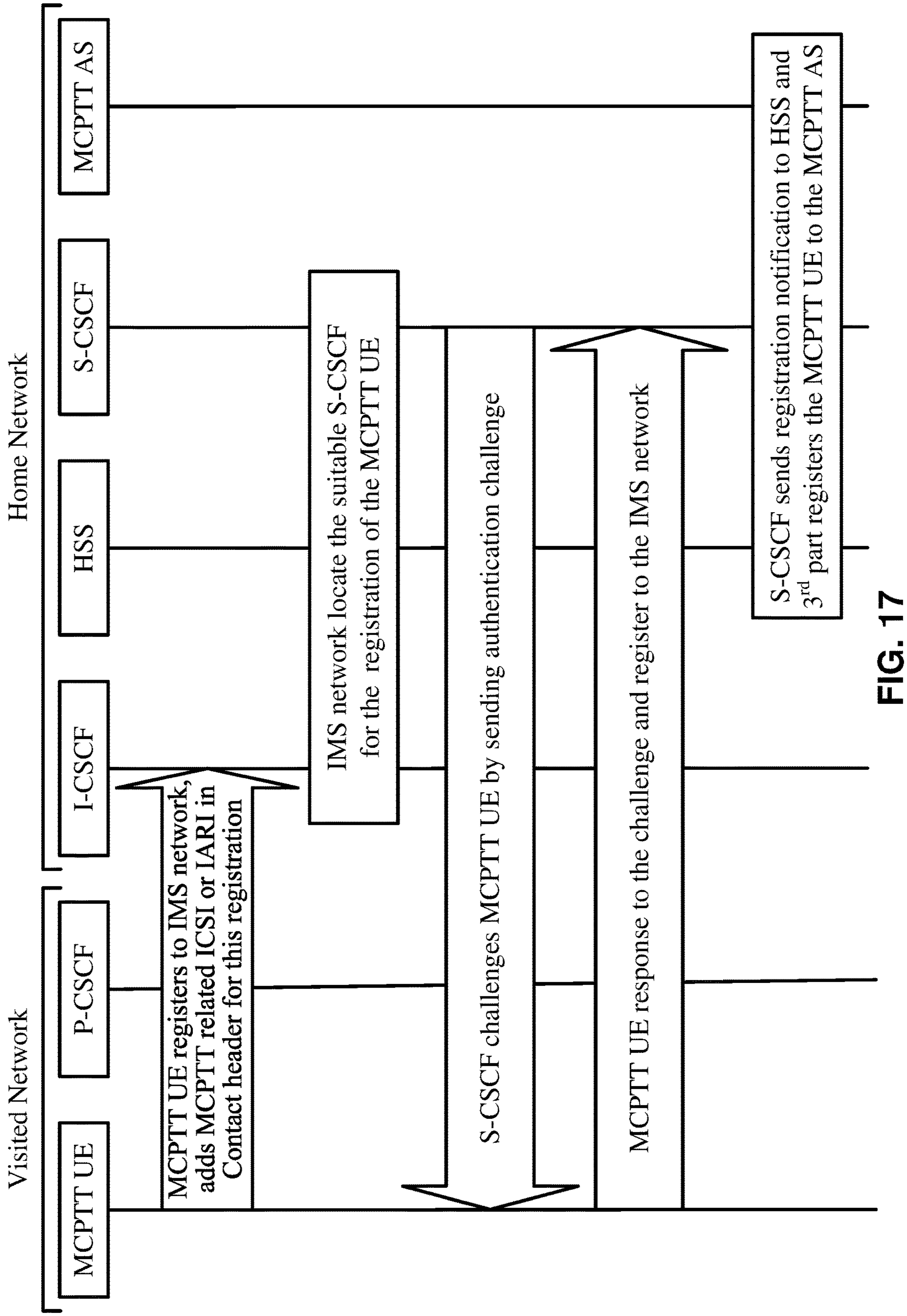
FIG. 17 is a flow diagram of an example IMS registration of an MCPTT UE as per an aspect of an embodiment.

FIG. 17 is a flow diagram of an example IMS registration of an MCPTT UE as per an aspect of an embodiment. The MCPTT UE may include the MCPTT related ICSI and IARI which it may intent to use to its contact header field of the register message when registering to the IMS network; IMS network may locate the most suitable S-CSCF for this registration and may forward the registration request to that S-CSCF; S-CSCF may challenge the MCPTT UE by sending authentication request to the UE; MCPTT UE may respond to the authentication request; and S-CSCF 3rd part may register the UE to the MCPTT AS.

A wireless device may register one or more IMS communication service identifiers (ICSIs) of push-to-talk in a wireless network. one of the one or more ICSIs may indicate at least one of video and data capabilities of the wireless device.

3GPP has defined mission critical push to talk (MCPTT) for release 13 to be limited to audio calls for MCPTT group calls and MCPTT private calls, however in release 14 the MCPTT group calls and MCPTT private calls will also include new capabilities i.e. video and data. For release 14, 3GPP WG SA1's current plan is to modify the requirement specification for MCPTT, 3GPP TS 22.179 by removing all audio related requirements and only keeping the generic requirements for MCPTT. Release 14 will also have new specifications for MCPTT audio group and private calls, MCPTT video group and private calls, and MCPTT data group and private calls. These new capabilities may result in compatibility issue at the time of session setup if the UEs are from different release or from the same release but having different capabilities. Thus, new methods disclosed here may avoid any incompatibility.

In some example cases, network (e.g. the registrar or application servers, and/or third party application servers, and/or other network enetities) may need to know the MCPTT UE's capabilities in terms of supported services and applications.

A network node may transmit a request to a registrar and/or network node storing MCPTT UE capability and request for MCPTT UE capabilities. The network node may transmit a response message to the requester (directly or indirectly) indicating the MCPTT UE capabilities of the UE. The network nodes may communicate (transmit/receive) the MCPTT user's capabilities by exchanging SIP message(s) (e.g. INVITE, MESSAGE).

The network node may transmit a SIP message (e.g. SIP INVITE request) to the UE to set up a session to stream a video clip to the MCPTT UE. Thus, the network may need to know if the MCPTT UE has the capability to receive it.

The network node may transmit a SIP message (e.g. SIP MESSAGE request) to the UE to set up a session to send information about multicast bearer and the related ports for media reception. Thus, the network may need to know about the MCPTT UE's capabilities to receive the multicast media.

A third-party entity may like to get a MCPTT UE's capabilities from the operator's network where MCPTT UE has registered to, in order to e.g. provide a service or application. A third-party entity may transmit a SIP message (e.g. SIP INVITE request) to the UE to set up a session. Therefore, the network must know the MCPTT UE's capabilities to provide this information to the third-party entity.

The UE may response to the SIP message. The network/third party may subsequently start communicating and transmitting/receiving data, audio, and/or video to/from the MCPTT UE.

Once the MCPTT UEs are all registered to the IMS network and if an MCPTT UE may like to establish an MCPTT call, the MCPTT UE may include all its supported ICSI values for the IMS communication services it may intend to use to all other SIP methods than the SIP REGISTER method. The MCPTT UE may include all its supported IARI values for the IMS applications it may intend to use to those methods.

If this is a request for a new dialog, the Contact header field may be populated as a contact header value which may be a public GRUU value, a temporary GRUU value, or SIP URI containing the contact address of the MCPTT UE; an "ob" SIP URI parameter; an ICSI that the MCPTT UE may include in a g.3gpp.icsi-ref media feature tag; and an IARI that the MCPTT UE may include in a g.3gpp.iari-ref media feature tag.

When MCPTT UE receives ICSI values corresponding to the IMS communication services that the network provides to the user, if the MCPTT UE constructs a request for a new dialog or standalone transaction and the request is related to one of the ICSI values, the MCPTT UE may populate a P-Preferred-Service header field with one of the ICSI values.

In construction of the same request for a new dialog and standalone transaction, the MCPTT UE may populate an Accept-Contact header field comprising an ICSI value which may differ from the one added to P-Preferred-Service header field. In construction of a request for a new dialog or standalone transaction, the MCPTT UE may populate an Accept-Contact header field comprising an IARI value if an IMS application indicates that an IARI is to be included in a request The MCPTT UE may modify the established dialog capabilities by e.g. adding a media or requesting a supplementary service if the modification is defined for the IMS communication service. If the modification is not defined for that IMS communication service, the MCPTT UE may initiate a new dialog.

Figure 18:
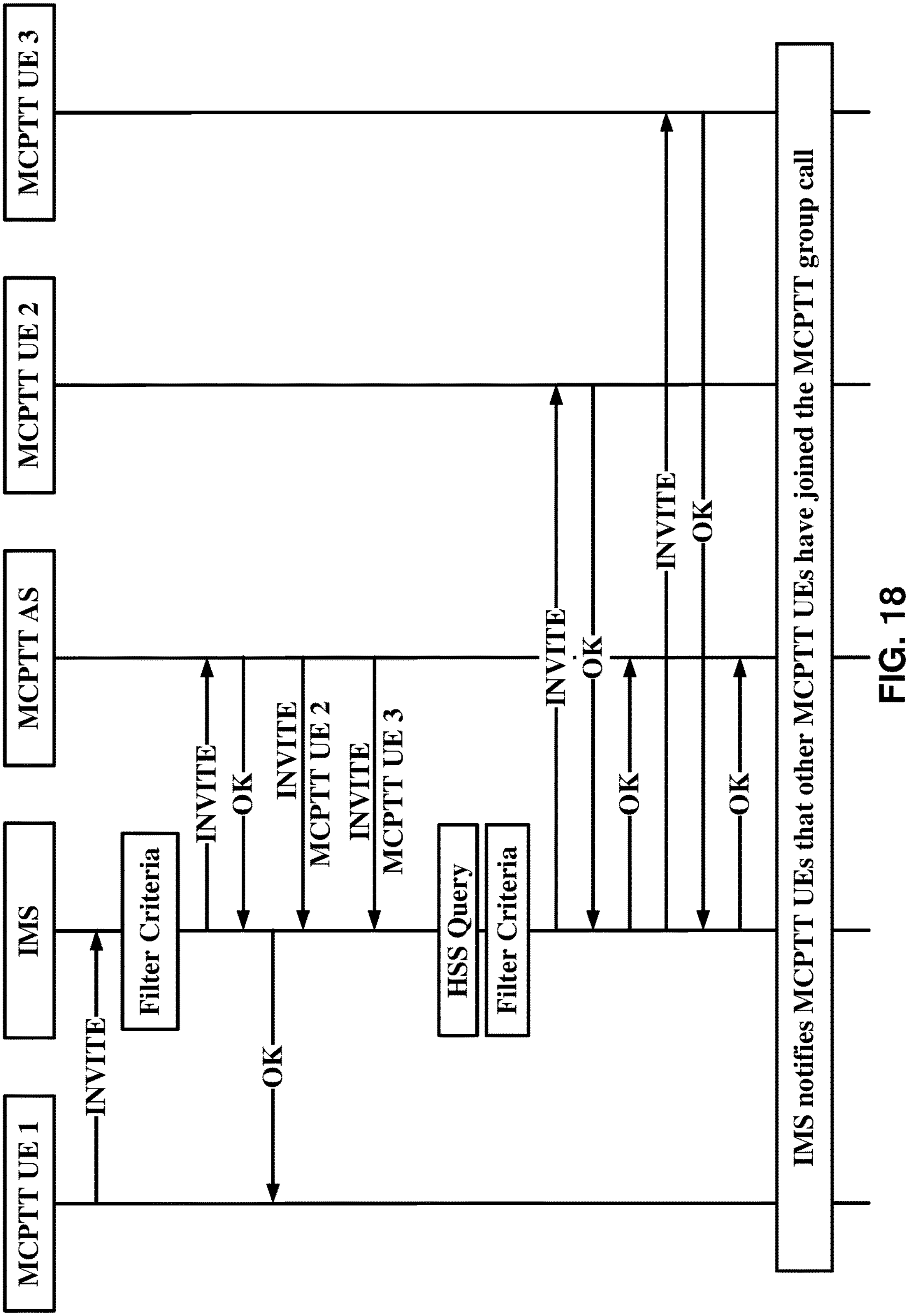
FIG. 18 is a flow diagram of an example MCPTT group session setup by an MCPTT UE as per an aspect of an embodiment.

FIG. 18 is a flow diagram of an example MCPTT group session setup by an MCPTT UE as per an aspect of an embodiment. MCPTT UE 1 may initiate an MCPTT group call with MCPTT UE 2 and MCPTT UE 3 by sending an SIP INVITE request which may comprise MCPTT feature tag in Contact header field. The Accept-Contact header field may also comprise the MCPTT feature tag which may indicate that MCPTT service may be required for the MCPTT group call; IMS may validate the service profile of the MCPTT UE 1 and evaluates the filter criteria. It may thereafter forward the invite towards MCPTT AS; MCPTT AS may accept the MCPTT group call and may invite MCPTT UE 2 and MCPTT UE 3 by sending an SIP INVITE request which may comprise MCPTT feature tag in Contact header field. The Accept-Contact header field may also contain the MCPTT feature tag which may indicate that MCPTT service may be required for the MCPTT group call; HSS may be queried to locate MCPTT UE 2 and MCPTT UE 3 and IMS may validate their service profile and may evaluate the filter criteria; MCPTT UE 2 and MCPTT UE 3 may accept the invitation for the MCPTT group call; and IMS may notify the MCPTT UEs that other MCPTT UEs have now joined the on-network MCPTT group call.

Existing MCPTT calls may include audio. The existing MCPTT does not support various enhanced call capabilities. There is a need to enhance MCPTT signaling to support advanced call capabilities. In an example embodiment, enhanced MCPTT calls may include capabilities such as audio, video and/or data. To avoid or reduce any possible compatibility issues, new service or application identifiers may be implemented for the additional capabilities. An example embodiment, enhances ICSI to indicate different capabilities for MCPTT e.g. audio, video, and/or data capabilities. One or more IMS service parameters be communicated during the new dialog establishment procedure and/standalone transaction process to indicate at least one MCPTT capability to a network server, e.g. a proxy server, a registrar server.

The wireless device may employ one or more IMS communication service identifiers (ICSIs) of push-to-talk (e.g. mission critical PTT) for new dialogs establishment or standalone transactions in a wireless network. one of the one or more ICSIs may indicate at least one of audio, video, data, full duplex, dispatching, and administering capabilities of the wireless device. ICSI may be in the form of a media feature tag. A feature tag may indicate one or more capability of the wireless device. For, example a specific feature tag, such as 3gpp-service.ims.icsi.mcpttvideo may indicate video capability. This is an example, other features tag names may be used. One or more ICSI may indicate a combination of at least two of audio, video, data, full duplex, dispatching, and administering capabilities of the wireless device. For example, a feature tag 3gpp-service.ims.icsi.mcpttmedia, may indicate capability for both audio and video.

In another example, one or more additional parameters may be included in the new dialog establishment or a standalone transaction along with a feature tag to indicate the wireless device capability or a combination of one or more capabilities of the wireless device.

In an implementation, the wireless device may transmit the message to establish a new dialog or as a standalone transaction to a UE relay which relays to message to a network node. The wireless device may discover the UE relay using discovery model A or model B. In an example, the UE relay may decode the message for new dialog establishment or for the standalone transition and may update the message headers before retransmitting the message. The UE relay may update the source and destination address in the registration message.

In an example, the message for the new dialog and the standalone transaction may further employ one or more IMS application reference identifiers (IARIs). One of the one or more IARIs may indicate at least one of audio, video, data, full duplex, dispatching, and administering capabilities of the wireless device. IARI may be in the form of a media feature tag. A feature tag may indicate one or more capability of the wireless device. For, example a specific feature tag, such as 3gpp-application.ims.iari.mcpttvideo may indicate video capability. This is an example, other features tag names may be used. One or more IARI may indicate a combination of at least two of audio, video, and data capabilities of the wireless device. For example, a feature tag 3gpp-application.ims.iari.mcpttmedia, may indicate capability for both audio and video.

In an example embodiment, the wireless device may employ one or more IMS application reference identifiers (IARIs) of push-to-talk in a wireless network for establishment of a new dialog or for standalone message. One of the one or more IARIs indicates at least one of audio, video, data, full duplex, dispatching, and administering capabilities of the wireless device. In an example, the one or more IARIs may indicate a combination of at least two of audio, video, data, full duplex, dispatching, and administering capabilities of the wireless device. The wireless device may further employing one or more IMS communication service identifiers (ICSIs) for establishing new dialog or standalone message. One of the one or more ICSIs indicates at least one of audio, video, data, full duplex, dispatching, and administering capabilities of the wireless device.

In an example, the wireless device may employ one or more IMS service parameters of push-to-talk in a wireless network for establishing a new dialog or a standalone message. The one or more IMS service parameters may indicate a combination of at least two of audio, video, data, full duplex, dispatching, and administering capabilities of the wireless device. The one or more IMS service parameters indicate at least one of audio, video, data, full duplex, dispatching, and administering capabilities of the wireless device.

In an example, the embodiments may include enhanced service identifiers representing new services such as 3gpp-service.ims.icsi.mcpttaudio; 3gpp-service.ims.icsi.mcptt-video; 3gpp-service.ims.icsi.mcpttdata; 3gpp-service.ims.icsi.mcpttfullduplex; 3gpp-service.ims.icsi.mcpttdispatcher; and 3gpp-service.ims.icsi.mcpttadminiter.

In an example, the embodiments may include enhanced application identifiers that represent applications for the MCPTT service 3gpp-service.ims.icsi.mcptt; 3gpp-application.ims.iari.mcpttaudio; 3gpp-application.ims.iari.mcpttvideo; 3gpp-application.ims.iari.mcpttdata; 3gpp-application.ims.iari.mcpttfullduplex; 3gpp-application.ims.iari.mcpttdispatcher and gpp-application.ims.iari.mcpttadminister.

Release 13 of MCPTT supports audio with service identifier 3gpp-service.ims.icsi.mcptt. In an example embodiment, in order to maintain interoperability with release 13, release 14 may create three enhanced service identifiers for MCPTT, MCPTT video, and MCPTT data, such as 3gpp-service.ims.icsi.mcpttdefault; 3gpp-service.ims.icsi.mcpttvideo; 3gpp-service.ims.icsi.mcpttdata; 3gpp-service.ims.icsi.mcpttfullduplex; 3gpp-service.ims.icsi.mcpttdispatcher; and 3gpp-service.ims.icsi.mcpttadminister.

In an example, two enhanced application identifier for MCPTT video and MCPTT data and a service identifier for default MCPTT may be employed 3gpp-service.ims.icsi.mcpttdefault; 3gpp-application.ims.iari.mcpttvideo; 3gpp-application.ims.iari.mcpttdata; 3gpp-application.ims.iari.mcpttfullduplex; 3gpp-application.ims.iari.mcpttdatadispatcher; and 3gpp-application.ims.iari.mcpttadminister.

Figure 19:
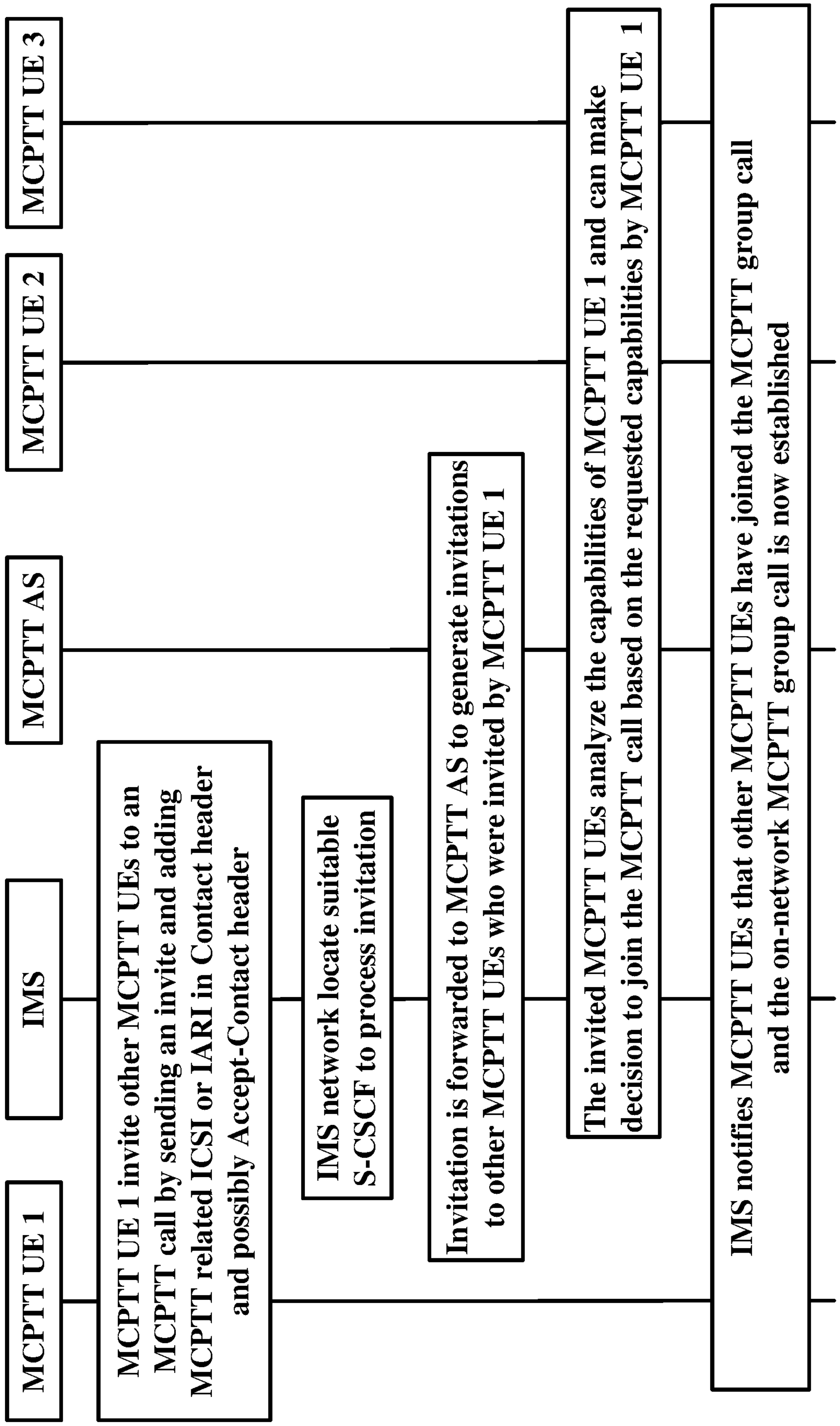
FIG. 19 is a flow diagram of an example MCPTT call setup by MCPTT UE A as per an aspect of an embodiment.

FIG. 19 is a flow diagram of an example MCPTT call setup by MCPTT UE A as per an aspect of an embodiment. MCPTT UE 1 may initiate an MCPTT call with other MCPTT UEs by sending an SIP INVITE request which may comprise MCPTT related ICSI and IARI in the Contact header field. The Accept-Contact header field may also comprise the MCPTT related ICSI and IARI which may indicate that the MCPTT service or the MCPTT application which may be required for the MCPTT call; IMS may validate the service profile of the MCPTT UE 1 and may locate the suitable S-CSCF to process the MCPTT call invitation; S-CSCF may forward the invitation to the MCPTT AS which may generate separate invitations towards other MCPTT UEs who were originally invited by MCPTT UE 1; the invited MCPTT UEs may analyze the capabilities of MCPTT UE 1 who invited them to the MCPTT call and may make decision to join the MCPTT call based on the requested capabilities by MCPTT UE 1; and IMS may notify MCPTT UEs that other MCPTT UEs have joined the MCPTT group call and the on-network MCPTT group call is now established.

In other case an MCPTT UE may need to identify its capabilities for new dialogs or a standalone transaction. For instance an MCPTT UE may like to inform the end MCPTT UE that it is capable of voice session while using packet switch; an MCPTT UE may like to share information that it is capable of audio emergency call and not video emergency call; MCPTT UE A may like to setup a video capable MCPTT group call with MCPTT UE B, MCPTT UE C, and MCPTT UE D. MCPTT UE A sends a SIP INVITE request message to MCPTT Application Server (AS) indicating the video capabilities for this MCPTT group call; and MCPTT UE A is a legacy MCPTT UE which does not support video or data. MCPTT UE B with video capabilities realizes that MCPT UE A is a legacy MCPTT UE at the time of session setup. Thus there will not be any backward incompatibility issue.

An MCPTT UE (in IMS) may transmit (e.g. share) its capabilities with the network and the end MCPTT UE by adding service feature tags and application feature tags to the SIP requests.

LTE release 13 of the mission critical service is assigned to the voice communication and it is called mission critical push to talk (MCPTT). MCPTT may enable the group members of the critical services such as fire department, police department, and/or emergency medical service setup one to one or one to many voice communications. In release 13, the MCPTT may be based on on-network and/or off-network. The on-network MCPTT may use IMS platform in combination with LTE infra structure for the mission critical voice service (MCPTT), while off-network MCPTT is based on direct communication among the group members. The MCPTT may employ floor control which may enable the group members uninterruptedly talk unless they may be interrupted by another member or a dialog with higher hierarchy/priority.

Release 14 of mission critical services are expanded to cover new services than voice communication service. These new services for mission critical communications may be based on video and data communications. For the video and data communication the floor control may not have the same concept as for the voice services. Example embodiments provides enhanced mechanism floor control and audio/media transmission mechanisms for audio, video and data services for mission critical services.

Example embodiments may be applicable to other services in addition to mission critical services. For example, example embodiments may be implemented in a video conference call service, video call service, and non-emergency audio and/or video calls (such as a conference call).

Figure 20:
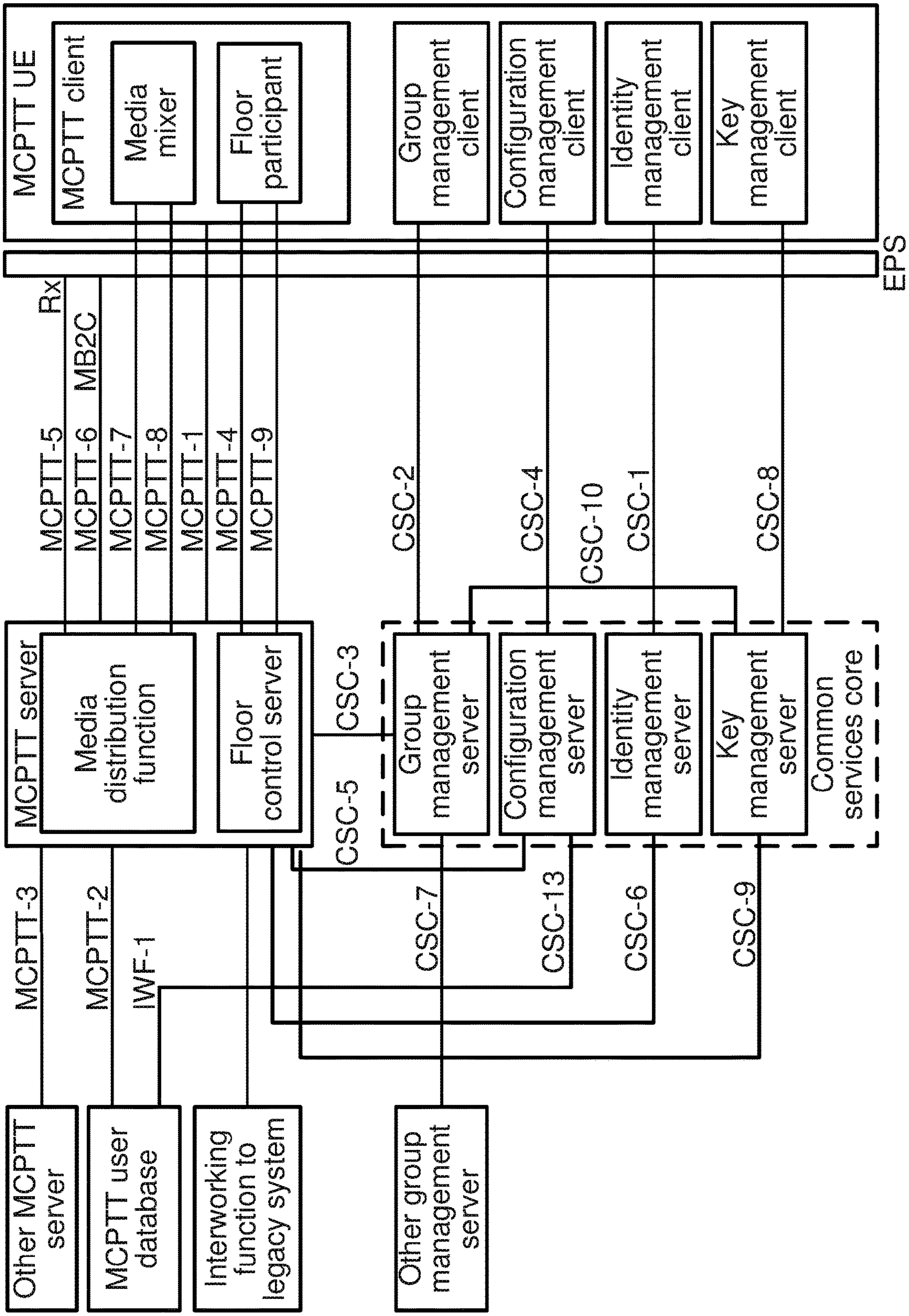
FIG. 20 is a block diagram of an example architecture of an on-network MCPTT service as per an aspect of an embodiment.

FIG. 20 is a block diagram of an example architecture of an on-network MCPTT service as per an aspect of an embodiment. In this example architecture for the on-network MCPTT service, elements and interfaces may be defined and specified as discussed in, for example, release 13 of 3GPP TS 23.179. On-network MCPTT may involve group members in one-to-one or one-to-many voice communications. When the floor control is implemented, the MCPTT group call members may receive voice media from one MCPTT sender, thus a media mixer may not be needed.

The functionality of media mixer may be used when the MCPTT participant listening to several MCPTT group calls or when there is not any floor control within the same group call.

Figure 21:
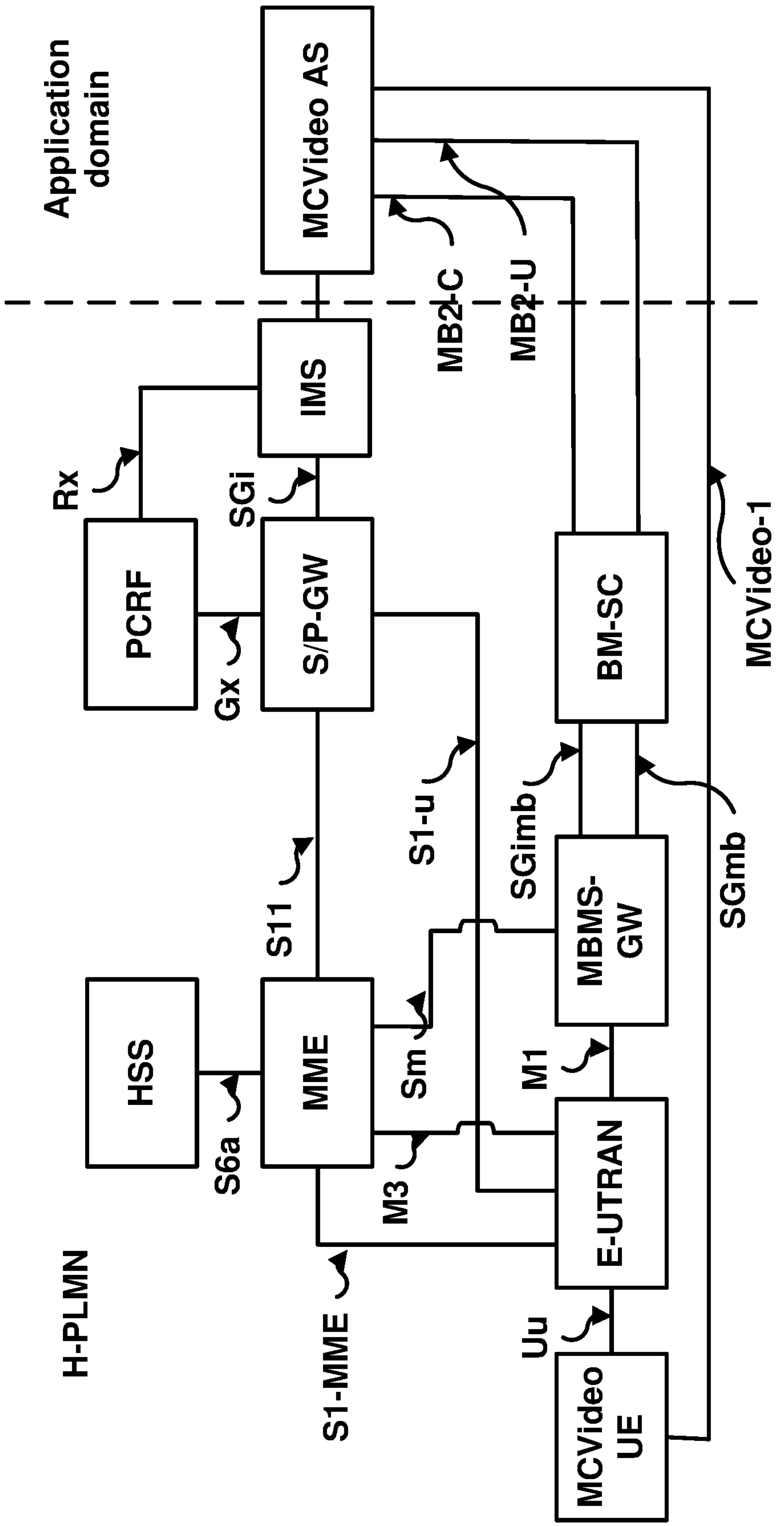
FIG. 21 is a block diagram of an example architecture for MCVideo as per an aspect of an embodiment.

In an example embodiment, the architecture of the MCVideo is shown in FIG. 21. MCVideo UE registers to IMS to get access to MCVideo service. The architecture may also provide the choice for broadcast toward the MCVideo UEs. The MB2 reference point may provide ability for MCVideo AS to request allocation of temporary mobile group identifiers (TMGIs) from broadcast multicast service center (BM-SC). The MB2 reference point may provide ability for MCVideo AS to request deallocation of TMGIs from BM-SC. The MB2 reference point may provide the ability for BM-SC to report the status of multicast broadcast multicast service (MBMS) bearer to MCVideo AS. The MCVideo-1 reference point may provide ability for MCVideo AS to send the information about connectivity to the broadcast bearer to the MCVideo UE. The MCVideo-1 reference point may provide the ability for MCVideo UE to send information about broadcast multicast coverage to the MCVideo AS.

Figure 22:
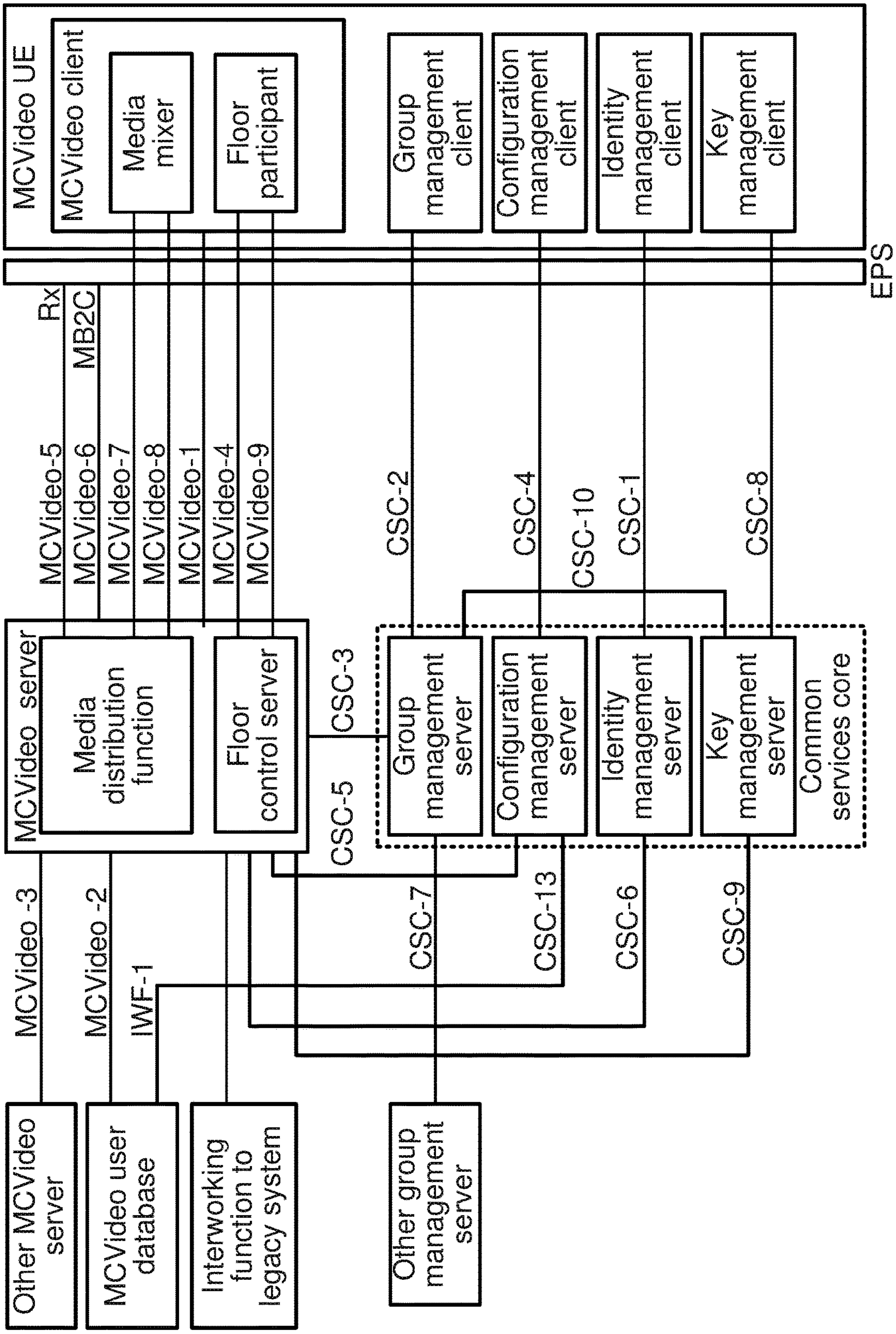
FIG. 22 is a block diagram of an example architecture for an on-network MCVideo service as per an aspect of an embodiment.

FIG. 22 is a block diagram of an example architecture for an on-network MCVideo service as per an aspect of an embodiment. In this embodiment architecture for the on-network MCVideo service, an MCVideo-1 reference point may exist between MCVideo server and the MCVideo client and may employ a SIP interface and/or an HTTP interface. This reference point may be used for MCVideo application signaling for establishing an MCVideo session. This reference point may also be used for UE to provide its location to the MCVideo server for the multicast/broadcast services. MCVideo-2 reference point may exist between MCVideo server and MCVideo user database and may be Sh reference point in 3GPP TS 23.002 and may be used to get specific user data for a MCVideo user. CVideo-3 reference point may exist between the MCVideo server and other MCVideo server. MCVideo-4 reference point may exist between floor control server and the floor participant may be used for unicast floor control signaling. MCVideo-5 reference point may exist between media distribution function and EPS to obtain unicast media bearers with appropriate QoS from the EPS. If MCVideo uses internet protocol multimedia subsystem (IMS), this functionality of media distribution function may exist in proxy-call session control function (P-CSCF). MCVideo-6 reference point may exist between MCVideo server and the EPS and may be used to request the allocation and activation of multicast transport resources for MCVideo. MCVideo-7 reference point may exist between media distribution function and media mixer and may be used to exchange unicast media. MCVideo-8 reference point may exist between the media distribution function and the media mixer and may be used for multicast media distribution from the MCVideo server to the MCVideo UE. MCVideo-9 reference point may exist between floor control server to floor participant and may provide floor control signaling over a multicast bearer. Other reference points may be similar to the ones defined for the MCPTT service the release 13 of 3GPP TS 23.179. Floor control server and the floor participant are shown by the dashed line in FIG. 22 since their functionalities may be different from the ones in MCPTT.

Figure 23:
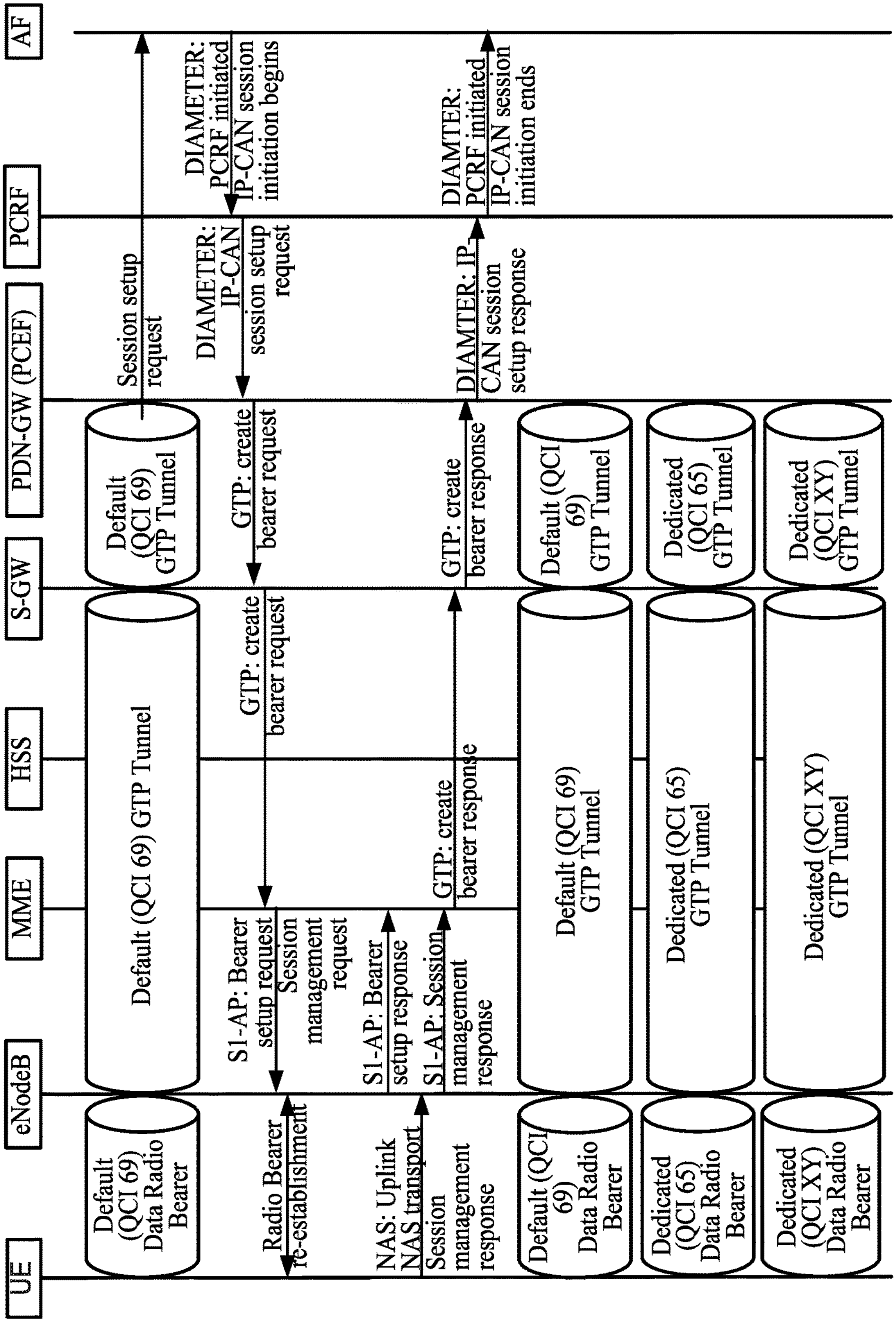
FIG. 23 is a flow diagram of example signaling as per an aspect of an embodiment.

In FIG. 23 example embodiment while the default EPS bearer with QoS class identifier (QCI) level 69 since it is for mission critical service signaling is established. The MCVideo UE may send session setup to the AF to setup the mission critical audio/video. The AF may initiate the IP-CAN session initiation procedure. The AF may use a new dedicated MCVideo attribute value pairs (AVP) indicator in the diameter AA-request transmitted by the MCVideo AF towards the PCRF. The PCRF may receive the MCVideo AVP and may attempt to trigger the IP-CAN to enable assigned resources for initiation of the MCVideo session. The PCRF may send a DIAMETER: setup bearer request comprising a PCC decision provision (QoS policy) which may request the MCVideo user's location information and MCVideo UE time zone toward the PDN-GW. The PDN-GW may use the policy to adjust the EPS bearer QoS and may use to generate the traffic flow template (TFT). The PDN-GW may create GTP: create bearer request message comprising procedure transaction identifier (PTI) for GTP: create bearer request, EPS bearer identity, EPS bearer QoS, APN-AMBR, and TFT. The PDN-GW may send the GTP: create bearer request toward the S-GW. The S-GW may send GTP: create bearer request message comprising PTI, EPS bearer identity, EPS bearer QoS, TFT, and APN-AMBR towards the MME. The MME may create S1-AP: EPS bearer setup context request message for the EPS bearer of the mission critical video comprising EPS bearer identity, EPS bearer QoS, UE-AMBR, and session management request message which is comprising PTI, EPS bearer QoS, TFT, APN-AMBR, and EPS bearer Identity. The MME may send the S1-AP: EPS bearer setup context request message towards the eNodeB. The eNodeB may map the EPS bearer setup request for mission video to the radio bearer setup. The eNodeB may send radio bearer QoS, session management request message, and EPD radio bearer towards the MCVideo UE. The MCVideo UE may store QoS for the mission critical video, radio priority, packet flow ID from the session management request message and APN-AMBR. The MCVideo UE may provide the EPS bearer QoS for mission critical video to the MCVideo application. The MVVideo UE may acknowledge the reception of the bearer setup request towards the MME via eNodeB. The MCVideo UE creates NAS: uplink NAS transport comprising session management response which is comprising EPS bearer identity and send it toward the MME via eNodeB. The MME may send GTP: session management response message comprising EPS bearer ID and the MCVideo user location towards the PDN-GW. The PDN-GW may send a provision acknowledge message towards PCRF to indicate that the new QoS for the mission critical video could have been enforced and it may inform the PCRF about user location information and the MCVideo UE time zone. The PCRF will inform the AF about the finalization of the IP-CAN session modification.

The application function (AF) of the MCVideo is triggered by e.g. an MCVideo user to downgrade the priority for the dedicated EPS bearer for the mission critical video and/or deactivate the dedicated EPS bearer for mission critical audio due to e.g. release of floor control and/or the MCVideo user stops talking which MCVideo AF may realize by as a decrease of the audio packets. Upon the MCVideo AF approval, QoS parameters of the dedicated EPS bearer for the mission critical video may be relaxed (requiring a less strict QoS requirement) with a new or existing QCI level for non-GBR resource type. This may result in that the recipients of the MCVideo call may receive lower quality of the video images of the MCVideo UE which just released floor control or stopped sending audio/video packets, to maintain a visual contact in a form of thumbnail size video of the visual media sent by that MCVideo UE. This may result in increasing available network resources in terms of EPS bearer resources for other uses. If the MCVideo user obtain the floor control or starts sending the audio packets, this may indicate to the MCVideo AF to improve QoS of the dedicated EPS bearer for the mission critical video. A similar procedure may be implemented to enhance the QoS so that other recipients in the MCVideo call may receive better quality of the visual media sent by the MCVideo UE taking the floor.

The EPS bearer resource reassignment may be triggered by the application client in the MCVideo UE when the floor control is released and/or when the user stop talking and/or sending audio and/or video. This may also be triggered by the MCVideo UE by sending ESM message bearer resource modification request toward the network to trigger ESM message modify EPS bearer context request by the network toward the MCVideo UE. This may result in that the recipients of the MCVideo call may receive lower quality of the video images of the MCVideo UE which just released floor control or stopped sending audio and/or video packets, to maintain a visual contact, e.g. in form of thumbnail size video of the visual media, sent by that MCVideo UE. This may result in increasing available network resources in terms of EPS bearer resources. If the MCVideo user obtain the floor control and/or when the MCVideo user starts talking, this may be interpreted by the application client of the MCVideo that the UE as a request for improvement of the dedicated EPS bearer for the mission critical video. A similar procedure may be implemented to enhance the QoS. Other recipients in the MCVideo call may receive better quality of the visual media sent by that MCVideo UE.

Example embodiments may be applicable to other services in addition to mission critical services. For example, example embodiments may be implemented in a video conference call service, video call service, and non-emergency audio and/or video calls (such as a conference call). In an example, other services may be implemented. For example, the above process may be implemented for a Video call, video call AF, and/or video call UE.

Figure 24:
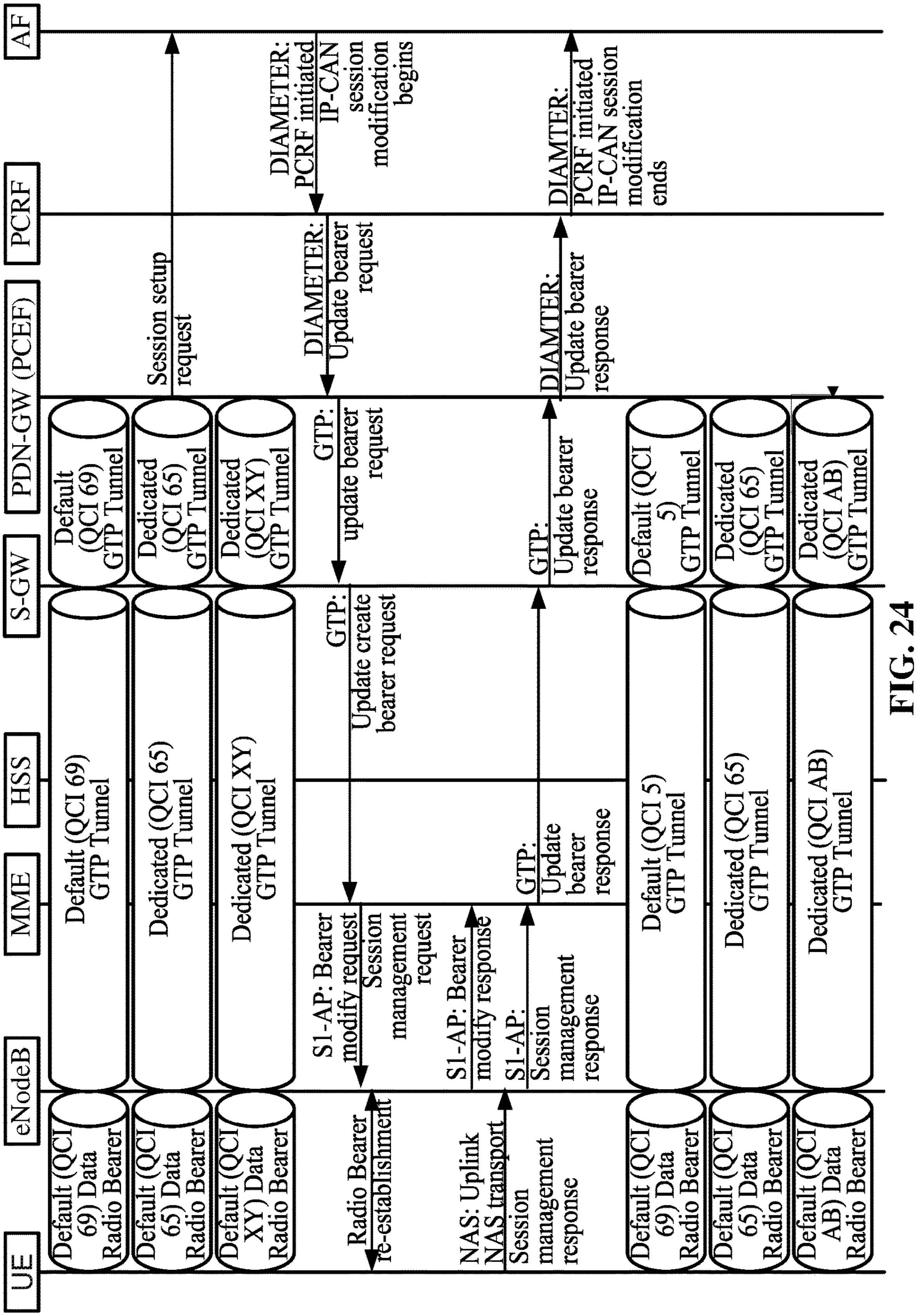
FIG. 24 is a flow diagram of example signaling as per an aspect of an embodiment.

In one example embodiment, shown in FIG. 24, there may be two dedicated bearers for mission critical video and mission critical audio of the user plan of the MCVideo application. There may be a default bearer for signaling of the MCVideo application. The AF may be triggered by e.g. the MCVideo user to downgrade or upgrade the priority for the dedicated EPS bearer for the mission critical video due to e.g. release or obtaining of floor control and/or stop or start sending audio packets. The floor control signaling may be assumed to use the dedicated EPS bearer for mission critical voice. The MCVideo user may modify the floor control by releasing or obtaining the floor control or the MCVideo user may stop or start sending audio packets. This may downgrade or upgrade the priority of the dedicated EPS bearer for the mission critical video of the MCVideo application. That may trigger as an indication to the AF which may reside in the P-CSCF considering MCVideo is an IMS application, for EPS bearer modification request. The AF may initiate the IP-CAN session modification procedure by conveying information for the floor control modification to the PCRF. The AF may use a new dedicated MCVideo attribute value pairs (AVP) together with a priority modification AVP in the diameter AA-request transmitted by the MCVideo AF towards the PCRF. The PCRF may receive the MCVideo AVP together with the priority modification AVP and may attempt to modify the IP-CAN to enable that MCVideo service receives the assigned priorities affected by the modification of the floor control. The AF and PCRF may implement a signaling using a new AVP to implement the communication between the AF and the PCRF regarding the assigned priorities of MCVideo service. The signaling may list a number of priority levels triggered by the floor control and/or by other means e.g. the MCVideo user may modify the priorities due to other needs than floor control change, such as upgrade to an emergency MCVideo call or downgrade to a regular MCVideo call. The MCVideo UE and the PCRF may use those levels to ensure the IP-CAN is accordingly assigned to that MCVideo service. Therefore, an authorized Resource-Priority header field comprising an appropriate namespace and priority value in a SIP message if MCVideo service is an IMS service. In one example embodiment, the AF and AF functionalities may exist in a P-CSCF while in another example embodiment, the AF and AF functionalities may exist in an MCVideo application server (AS). The PCRF may send a DIAMETER: update bearer request comprising a PCC decision provision (QoS policy) which may request the MCVideo user's location information and MCVideo UE time zone toward the PDN-GW. The PDN-GW may use the policy to adjust the EPS bearer QoS and may use to generate the traffic flow template (TFT). The PDN-GW may create GTP: update bearer request message comprising procedure transaction identifier (PTI) for GTP: update bearer request, EPS bearer identity, EPS bearer QoS, APN-AMBR, and TFT. The PDN-GW may send the GTP: update bearer request toward the S-GW. The S-GW may send GTP: update bearer request message comprising PTI, EPS bearer identity, EPS bearer QoS, TFT, and APN-AMBR towards the MME. If the APN-AMBR has changed, the MME may update the UE-AMBR is appropriate. The MME may create S1-AP: modify EPS bearer context request message for the EPS bearer of the mission critical video comprising EPS bearer identity, EPS bearer QoS, UE-AMBR, and session management request message which is comprising PTI, EPS bearer QoS, TFT, APN-AMBR, and EPS bearer Identity. The MME may send the S1-AP: modify EPS bearer context request message towards the eNodeB. The eNodeB may map the modified EPS bearer QoS for mission video to the radio bearer QoS. The eNodeB may send radio bearer QoS, session management request message, and EPD radio bearer towards the MCVideo UE. The MCVideo UE may store new QoS for the mission critical video, radio priority, packet flow ID from the session management request message and modified APN-AMBR. The MCVideo UE may provide the new EPS bearer QoS for mission critical video to the MCVideo application. The MVVideo UE may acknowledge the reception of the bearer modification request towards the MME via eNodeB. The MCVideo UE creates NAS: uplink NAS transport comprising session management response which is comprising EPS bearer identity and send it toward the MME via eNodeB. The MME may send GTP: session management response message comprising EPS bearer ID and the MCVideo user location towards the PDN-GW. The PDN-GW may send a provision acknowledge message towards PCRF to indicate that the new QoS for the mission critical video could have been enforced and it may inform the PCRF about user location information and the MCVideo UE time zone. The PCRF will inform the AF about the finalization of the IP-CAN session modification.

Figure 25:
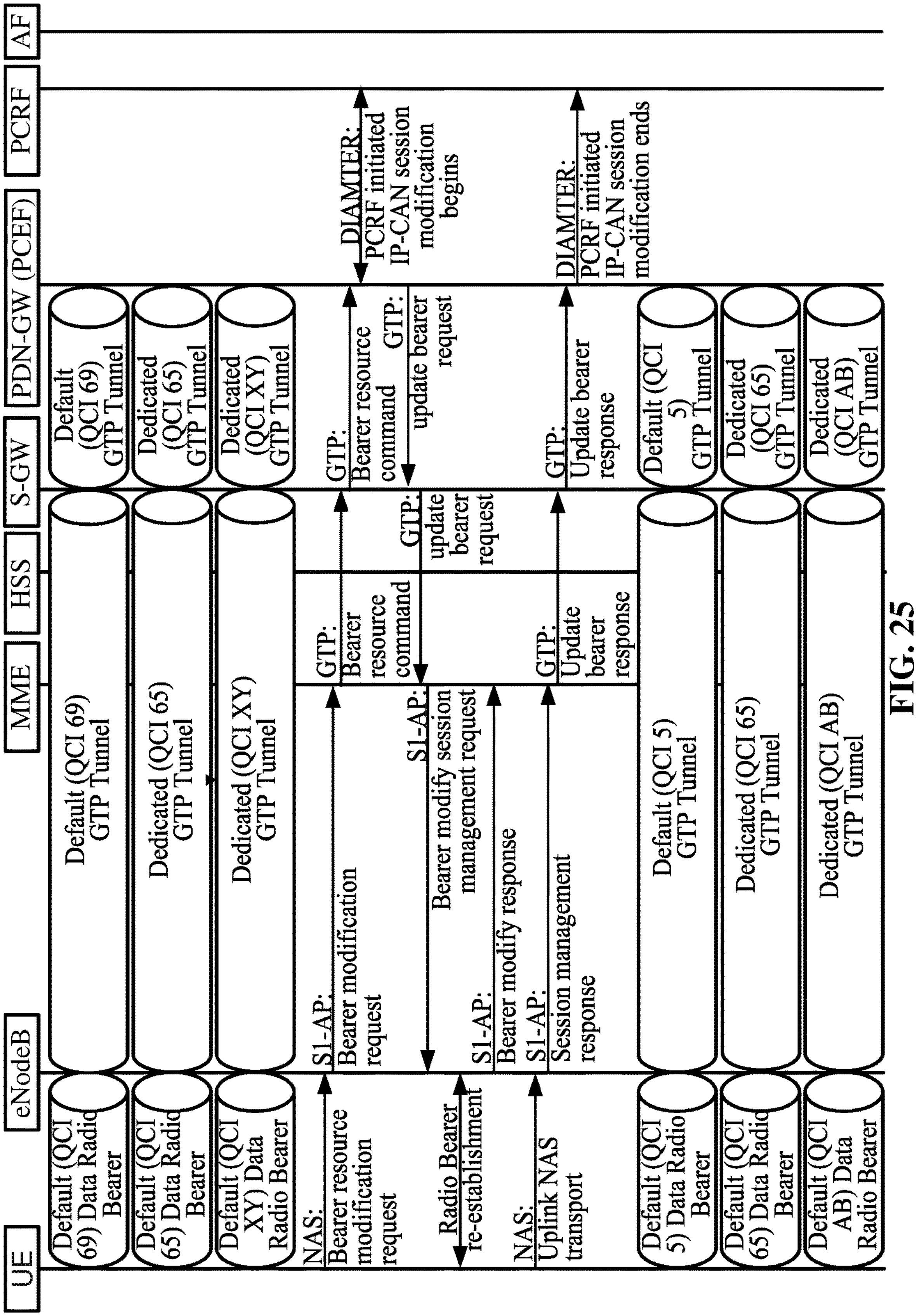
FIG. 25 is a flow diagram of example signaling as per an aspect of an embodiment.

The flow diagram in the example embodiment in FIG. 25, shows at the time of the releasing and/or obtaining the floor control and/or at the time when starting or stopping sending audio packets, the MCVideo UE modifies the priority of the dedicated EPS bearer corresponding from QCI XY to QCI AB for the mission critical video by requesting the network to modify the EPS bearer context. The new QCI may have non GBR or GBR, however, the new EPS bearer offers either lower bitrate, higher error loss rate, and higher delay budget for the uplink to release EPS resources if the floor control is released or MCVideo UE stopped sending audio packets, or higher bitrate, lower error loss rate, and lower delay budget for uplink to gain EPS resources if the floor control is obtained or the MCVideo UE started sending audio packets. The MCVideo UE may send a NAS: bearer resource modification request message comprising linked bearer identity (LBI), PTI, EPS bearer ID, QoS with QCI AB, and traffic aggregate description (TAD) towards the MME. The TAD is comprising the existing packet filter and bitrate requirement for EPS bearer to modify the bitrate. The MME may send GTP: bearer resource command message comprising IMSI, LBI, PTI, EPS bearer ID, new QoS, and TAD towards the S-GW. The S-GW may send GTP: bearer request command message comprising IMSI, LBI, PTI, EPS bearer ID, new QoS, and TAD towards the same PDN-GW as identified by the LBI. The PDN-GW may interact with the PCRF to trigger appropriate PCC decision with the MCVideo user's subscription information. In order to make this decision, the PDN-GW may provide the PCRF the content of TAD regarding the filter packet and the modified GBR requirement for the EPS bearer. The PCRF may request for the MCVideo user's location information and the MCVideo UE time zone. The PDN-GW may send the GTP: update bearer request toward the S-GW. The S-GW may send GTP: update bearer request message comprising PTI, EPS bearer identity, EPS bearer QoS, TFT, and APN-AMBR towards the MME. If the APN-AMBR has changed the MME may update the UE-AMBR is appropriate. The MME may create S1-AP: modify EPS bearer context message comprising EPS bearer identity, EPS bearer QoS, UE-AMBR, and session management request message which is comprising PTI, EPS bearer QoS, TFT, APN-AMBR, and EPS bearer Identity. The MME may send the S1-AP: modify EPS bearer context request message towards the eNodeB. The eNodeB may map the modified EPS bearer QoS to the radio bearer QoS and it may send radio bearer QoS, session management request message, and EPD radio bearer towards the MCVideo UE. The MCVideo UE may store the new QoS, radio priority, packet flow ID from the session management request message and modified APN-AMBR. The UE may provide the new EPS bearer QoS to the MCVideo application. The MCVideo UE may acknowledge the reception of the bearer modification message towards the MME via eNodeB. The MCVideo UE create NAS: uplink NAS transport comprising session management response which is comprising EPS bearer identity and may send it toward the MME via eNodeB. The MME may send GTP: session management response message comprising EPS bearer ID and the MCVideo user location towards the PDN-GW. The PDN-GW may send a provision acknowledge message towards PCRF to indicate that the new modified QoS could have been enforced and it may inform the PCRF about user location information and the MCVideo UE time zone.

Example embodiments may be applicable to other services in addition to mission critical services. For example, example embodiments may be implemented in a video conference call service, video call service, and non-emergency audio and/or video calls (such as a conference call). In an example, other services may be implemented. For example, the above process may be implemented for a Video call, video call AF, and/or video call UE.

According to various embodiments, a device such as, for example, a wireless device, a base station, a network entity, and/or the like, may comprise one or more processors and memory. The memory may store instructions that, when executed by the one or more processors, cause the device to perform a series of actions. Embodiments of example actions are illustrated in the accompanying figures and specification. Features from various embodiments may be combined to create yet further embodiments.

Figure 26:
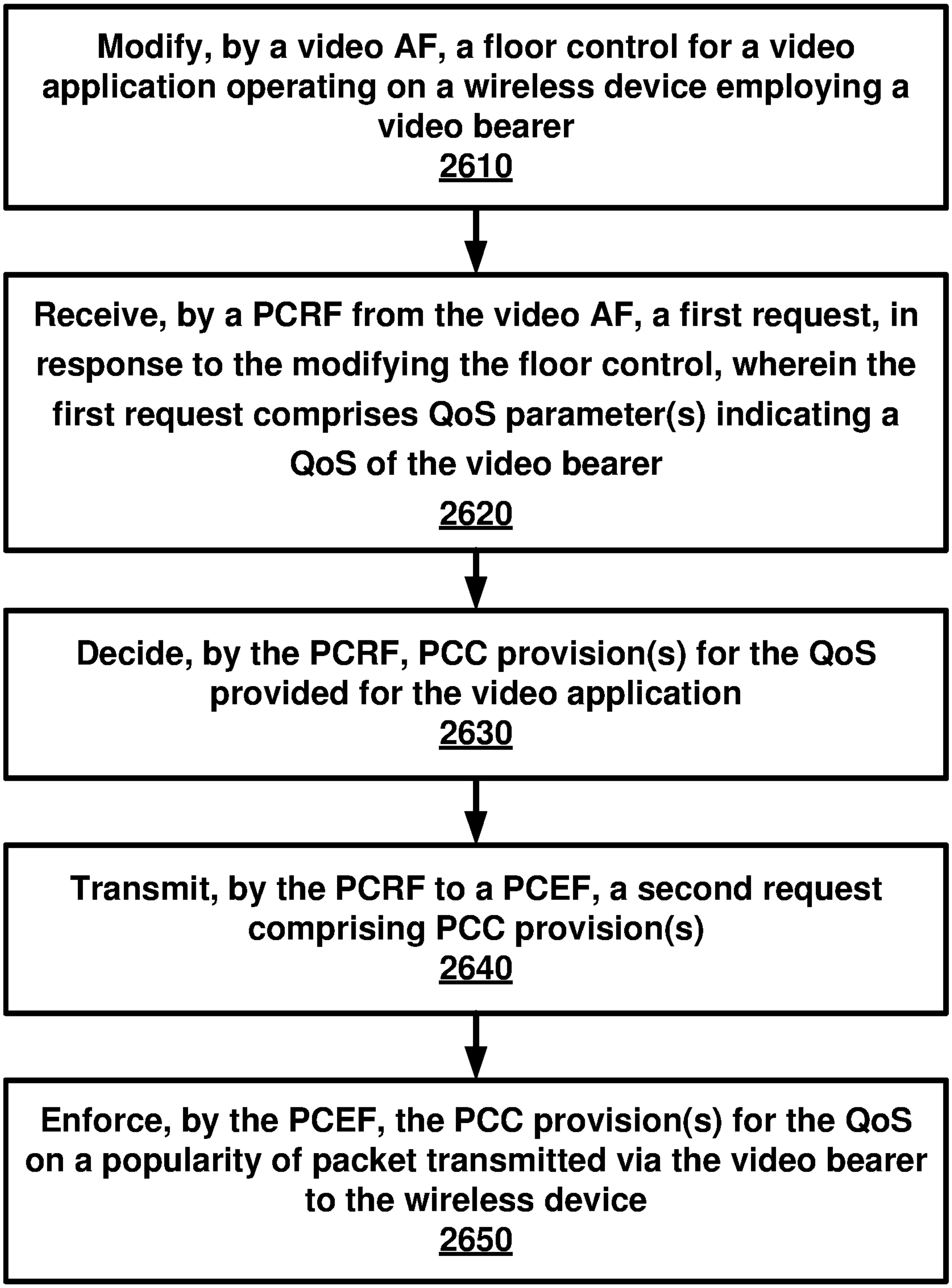
FIG. 26 is an example flow diagram as per an aspect of an embodiment of the present disclosure.

FIG. 26 is an example flow diagram as per an aspect of an embodiment of the present disclosure. At 2610, a floor control for a video application operating on a wireless device employing a video bearer may be modified by a video application function (AF). According to an embodiment, at least: the video AF may comprise a mission critical video AF, the video bearer may comprise a mission critical video bearer, and the video application may comprise a mission critical video application. According to an embodiment, the mission critical Video AF may recite at least in one of: a mission critical Video application server (AS); and a proxy call session control function (P-CSCF). According to an embodiment, the video bearer may comprise a dedicated evolved packet system (EPS) bearer. According to an embodiment, the modifying the floor control may be performed by the wireless device in response to releasing and obtaining a floor.

At 2620, a policy and charging rules function (PCRF) may receive from the video AF, a first request, in response to the modifying the floor control. The first request may comprise one or more quality of service (QoS) parameters indicating a QoS of the video bearer. According to an embodiment, the one or more QoS parameters may indicate a priority. According to an embodiment, the first request may comprise a DIAMETER AA-request (AAR) command. According to an embodiment, the first request may comprise an attribute value pairs (AVP) identifying the video application. According to an embodiment, a session initiation protocol (SIP) Resource-Priority header field may trigger the first request. According to an embodiment, a SIP Resource-Priority header field may indicate an emergency priority.

At 2630, the PCRF may decide one or more policy and charging control (PCC) provisions for the QoS provided for the video application. At 2640, the PCRF may transmit to a policy charging enforcement function (PCEF), a second request comprising the one or more PCC provisions for the QoS. According to an embodiment, the second request may comprise a DIAMETER command. At 2650, the PCEF may enforce the one or more PCC provisions for the QoS on a popularity of packet transmitted via the video bearer to the wireless device.

Figure 27:
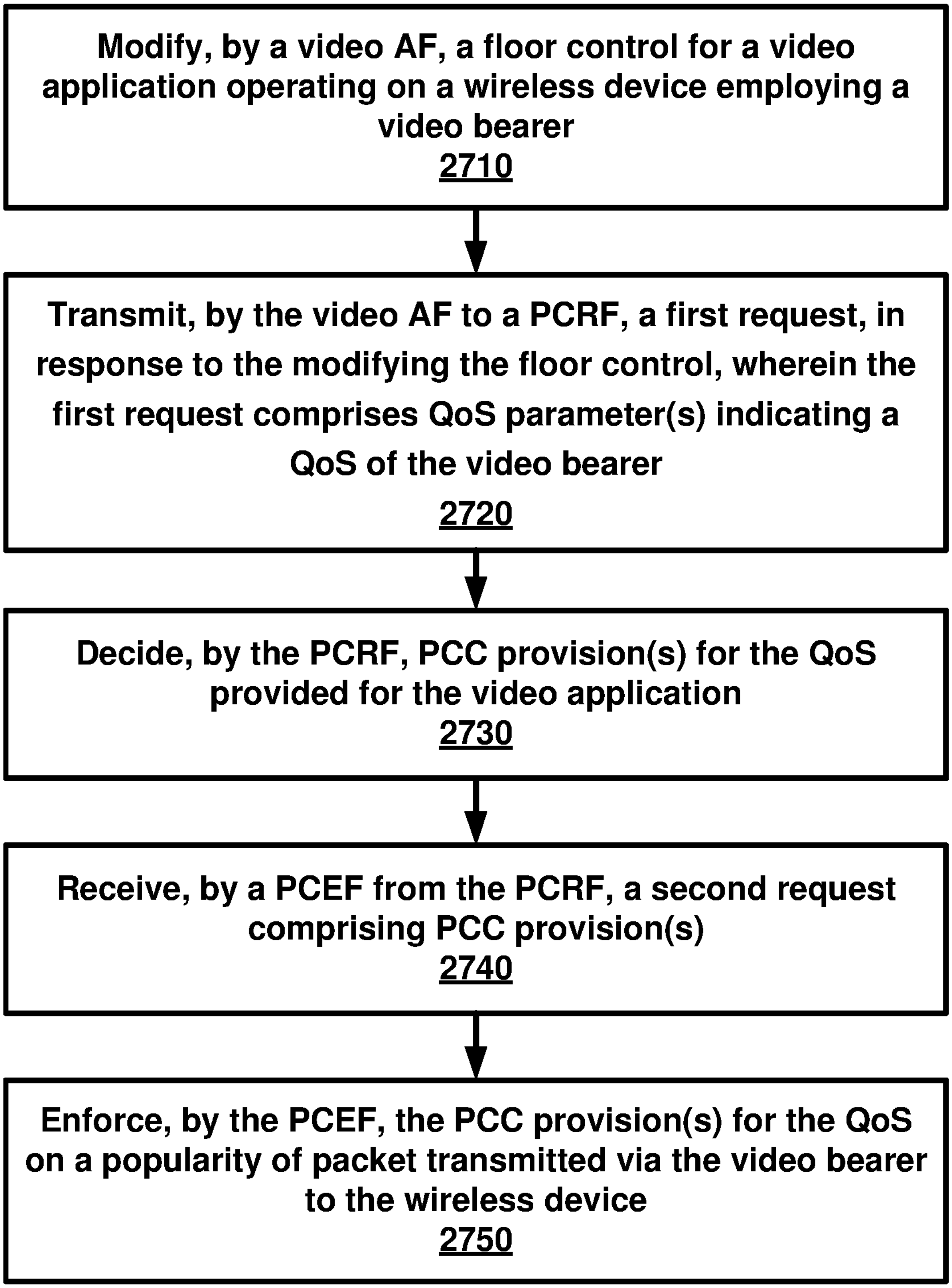
FIG. 27 is an example flow diagram as per an aspect of an embodiment of the present disclosure.

FIG. 27 is an example flow diagram as per an aspect of an embodiment of the present disclosure. At 2710, a floor control for a video application operating on a wireless device employing a video bearer may be modified by a video application function (AF). According to an embodiment, at least: the video AF may comprise a mission critical video AF, the video bearer may comprise a mission critical video bearer, and the video application may comprise a mission critical video application. According to an embodiment, the mission critical Video AF may recite at least in one of: a mission critical Video application server (AS); and a proxy call session control function (P-CSCF). According to an embodiment, the video bearer may comprise a dedicated evolved packet system (EPS) bearer. According to an embodiment, the modifying the floor control may be performed by the wireless device in response to releasing and obtaining a floor.

At 2720, the video AF may transmit, to a policy and charging rules function (PCRF), a first request in response to the modifying the floor control. The first request may comprise one or more quality of service (QoS) parameters indicating a QoS of the video bearer. According to an embodiment, the one or more QoS parameters may indicate a priority. According to an embodiment, the first request may comprise a DIAMETER AA-request (AAR) command. According to an embodiment, the first request may comprise an attribute value pairs (AVP) identifying the video application. According to an embodiment, a session initiation protocol (SIP) Resource-Priority header field may trigger the first request. According to an embodiment, a SIP Resource-Priority header field may indicate an emergency priority.

At 2730, the PCRF may decide one or more policy and charging control (PCC) provisions for the QoS provided for the video application. At 2740, the PCRF may transmit, to a policy charging enforcement function (PCEF), a second request comprising the one or more PCC provisions for the QoS. According to an embodiment, the second request may comprise a DIAMETER command. At 2750, the PCEF may enforce the one or more PCC provisions for the QoS on a popularity of packet transmitted via the video bearer to the wireless device.

Figure 28:
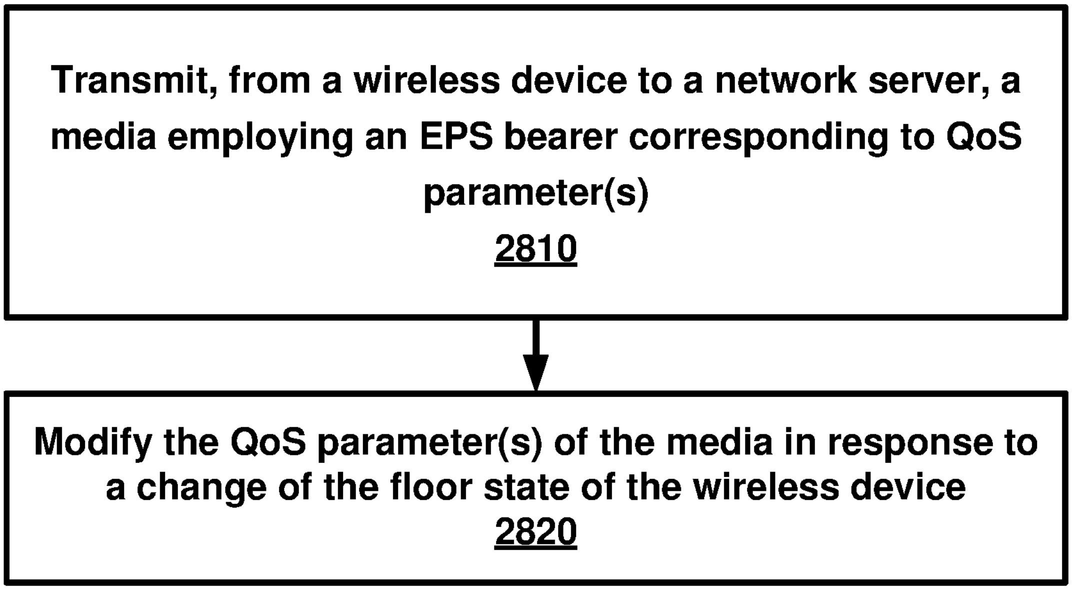
FIG. 28 is an example flow diagram as per an aspect of an embodiment of the present disclosure.

FIG. 28 is an example flow diagram as per an aspect of an embodiment of the present disclosure. At 2810, a wireless device may transmit to a network server, a media employing an EPS bearer corresponding to one or more QoS parameters. The wireless device may have a floor state related to the media. At 2820, the one or more QoS parameters of the media may be modified in response to a change of the floor state of the wireless device. According to an embodiment, the one or more QoS parameters may correspond to a QCI. According to an embodiment, the media may correspond to an MCVideo. According to an embodiment, the modification of the one or more QoS parameters may improve a QoS of the EPS bearer when the change of the floor state comprises obtaining a floor control related to the media. According to an embodiment, the modification of the one or more QoS parameters may reduce a QoS of the EPS bearer when the change of the floor state comprises releasing a floor control related to the media.

Figure 29:
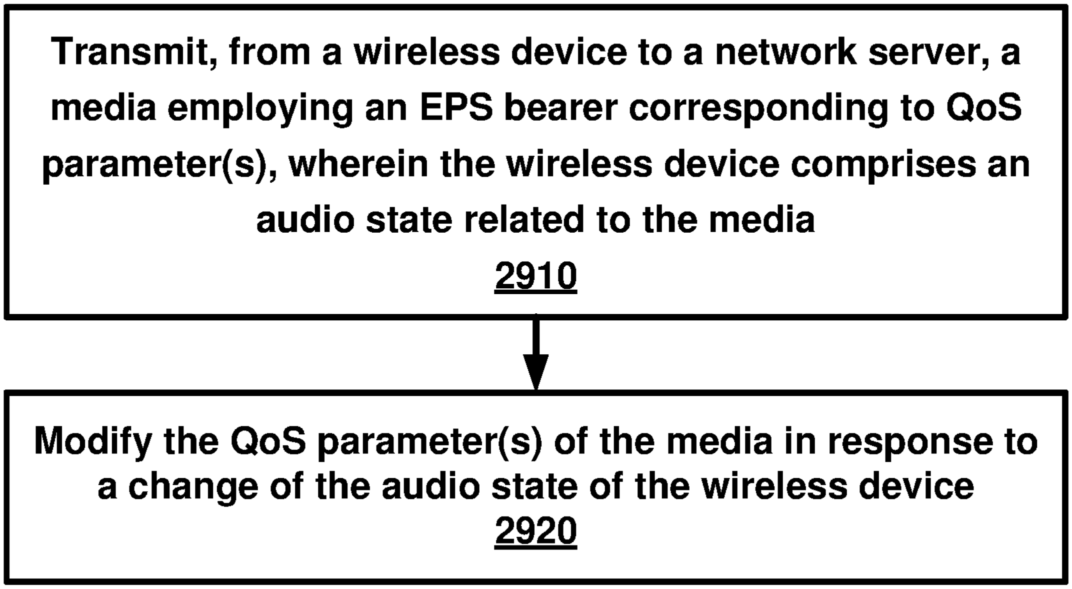
FIG. 29 is an example flow diagram as per an aspect of an embodiment of the present disclosure.

FIG. 29 is an example flow diagram as per an aspect of an embodiment of the present disclosure. At 2910, a wireless device may transmit to a network server, a media employing an EPS bearer corresponding to one or more QoS parameters. The wireless device may comprise an audio state related to the media. At 2920, the one or more QoS parameters of the media may be modified in response to a change of the audio state of the wireless device. According to an embodiment, the one or more QoS parameters may correspond to a QCI. According to an embodiment, the media may correspond to an MCVideo. According to an embodiment, the modification of the one or more QoS parameters may improve a QoS of the EPS bearer when the change of the audio state comprises generating audio packets related to the media. According to an embodiment, the modification of the one or more QoS parameters may reduce a QoS of the EPS bearer when the change of the audio state comprises stopping/discontinuing generation of audio packets related to the media.

According to an embodiment, a first wireless device may transmit and receive, from a second wireless device, a media by employing an EPS bearer context. The EPS bearer context may comprise a standardized QoS class identifier (QCI) characteristics. The standardized QCI characteristics may comprise, for example, a priority level less than 1, a packet delay budget in the range of 50 milli-second to 100 milli-second, and/or a packet error loss rate in the range 10^(−4) to 10^(−3). The standardized QCI characteristics may be employed for the EPS bearer context for mission critical video (MCVideo) communication.

Figure 30:
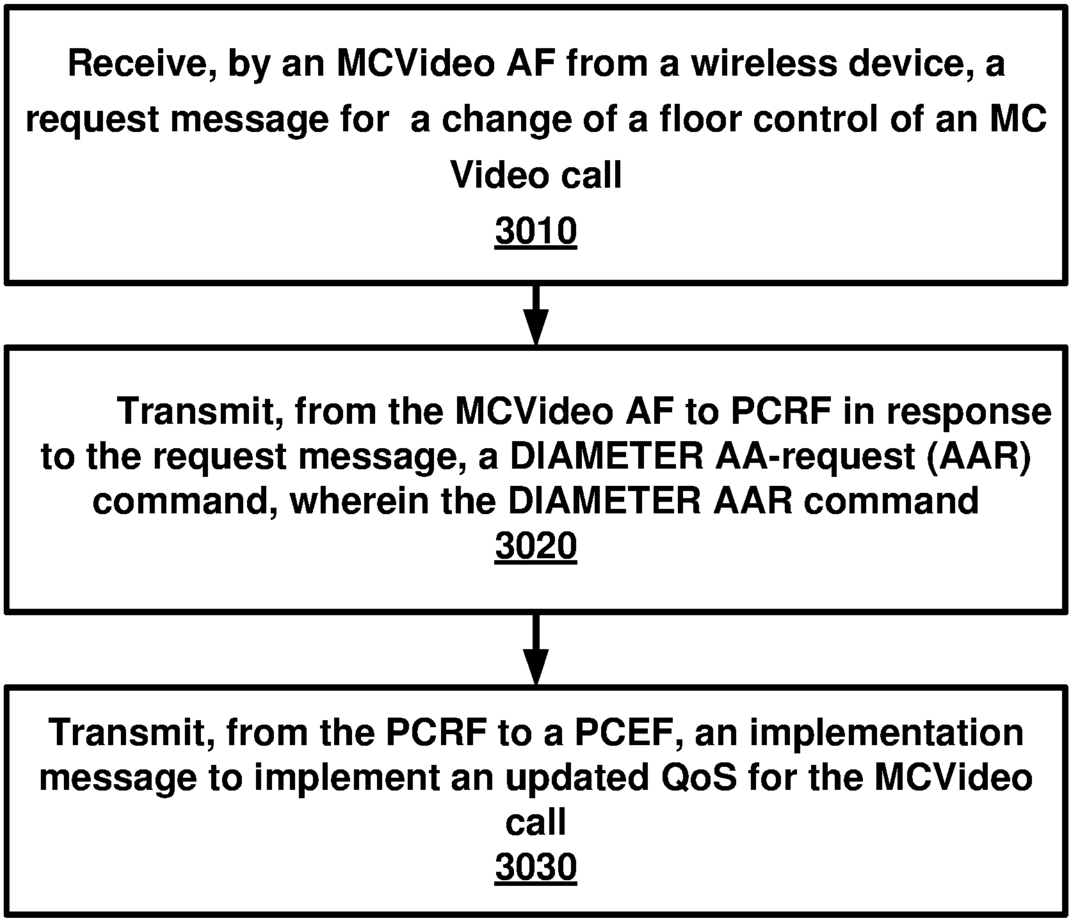
FIG. 30 is an example flow diagram as per an aspect of an embodiment of the present disclosure.

FIG. 30 is an example flow diagram as per an aspect of an embodiment of the present disclosure. At 3010, an MCVideo application function (AF) may receive from a wireless device, a request message for a change of a floor control of an MCVideo call. At 3020, the MCVideo AF may transmit to a policy and charging rules function (PCRF) in response to the request message, a DIAMETER AA-request (AAR) command. The DIAMETER AAR command may comprise: a modification bearer message, and an application identifier attribute-value pairs (AVP) corresponding to the MCVideo call. At 3030, the PCRF may transmit, to a policy and charging enforcement function (PCEF), an implementation message to implement an updated QoS for the MCVideo call. The updated QoS may comprise a QoS data bearer modification information. The updated QoS may depend on the change of the floor control. According to an embodiment, the implementation message may be configured by the PCRF employing, at least in part, subscription data associated with the wireless device. According to an embodiment, the updated QoS may depend on an updated QCI characteristics.

According to an embodiment, a wireless device may transmit, to an MCVideo application function (AF), a request message for change of a floor control of an MCVideo call. A a policy and charging rules function (PCRF) may receive, from the MCVideo AF, a DIAMETER AA-request (AAR) command. The DIAMETER AAR command may comprise: a modification bearer message, and an application identifier attribute-value pairs (AVP) corresponding to the MCVideo call. The PCRF may transmit, to a policy and charging enforcement function (PCEF), an implementation message to implement an updated QoS for the MCVideo call. The updated QoS may comprise a QoS data bearer modification information. The updated QoS may depend on the change of the floor control.

In this specification, "a" and "an" and similar phrases are to be interpreted as "at least one" and "one or more." In this specification, the term "may" is to be interpreted as "may, for example." In other words, the term "may" is indicative that the phrase following the term "may" is an example of one of a multitude of suitable possibilities that may, or may not, be employed to one or more of the various embodiments. If A and B are sets and every element of A is also an element of B, A is called a subset of B. In this specification, only non-empty sets and subsets are considered. For example, possible subsets of B={cell1, cell2} are: {cell1}, {cell2}, and {cell1, cell2}.

In this specification, various embodiments are disclosed. Limitations, features, and/or elements from the disclosed example embodiments may be combined to create further embodiments within the scope of the disclosure.

In this specification, various embodiments are disclosed. Limitations, features, and/or elements from the disclosed example embodiments may be combined to create further embodiments within the scope of the disclosure.

In this specification, parameters (Information elements: IEs) may comprise one or more objects, and each of those objects may comprise one or more other objects. For example, if parameter (IE) N comprises parameter (IE) M, and parameter (IE) M comprises parameter (IE) K, and parameter (IE) K comprises parameter (information element) J, then, for example, N comprises K, and N comprises J. In an example embodiment, when one or more messages comprise a plurality of parameters, it implies that a parameter in the plurality of parameters is in at least one of the one or more messages, but does not have to be in each of the one or more messages.

Many of the elements described in the disclosed embodiments may be implemented as modules. A module is defined here as an isolatable element that performs a defined function and has a defined interface to other elements. The modules described in this disclosure may be implemented in hardware, software in combination with hardware, firmware, wetware (i.e. hardware with a biological element) or a combination thereof, all of which are behaviorally equivalent. For example, modules may be implemented as a software routine written in a computer language configured to be executed by a hardware machine (such as C, C++, Fortran, Java, Basic, Matlab or the like) or a modeling/simulation program such as Simulink, Stateflow, GNU Octave, or LabVIEWMathScript. Additionally, it may be possible to implement modules using physical hardware that incorporates discrete or programmable analog, digital and/or quantum hardware. Examples of programmable hardware comprise: computers, microcontrollers, microprocessors, application-specific integrated circuits (ASICs); field programmable gate arrays (FPGAs); and complex programmable logic devices (CPLDs). Computers, microcontrollers and microprocessors are programmed using languages such as assembly, C, C++ or the like. FPGAs, ASICs and CPLDs are often programmed using hardware description languages (HDL) such as VHSIC hardware description language (VHDL) or Verilog that configure connections between internal hardware modules with lesser functionality on a programmable device. Finally, it needs to be emphasized that the above mentioned technologies are often used in combination to achieve the result of a functional module.

The disclosure of this patent document incorporates material which is subject to copyright protection. The copyright owner has no objection to the facsimile reproduction by anyone of the patent document or the patent disclosure, as it appears in the Patent and Trademark Office patent file or records, for the limited purposes required by law, but otherwise reserves all copyright rights whatsoever.

While various embodiments have been described above, it should be understood that they have been presented by way of example, and not limitation. It will be apparent to persons skilled in the relevant art(s) that various changes in form and detail can be made therein without departing from the spirit and scope. In fact, after reading the above description, it will be apparent to one skilled in the relevant art(s) how to implement alternative embodiments. Thus, the present embodiments should not be limited by any of the above described exemplary embodiments. In particular, it should be noted that, for example purposes, the above explanation has focused on mission critical services such as mission critical push-to-talk services employing media types such as audio services, video services and media services. However, one skilled in the art will recognize that embodiments of the invention may also be implemented in a system comprising other types of services such as, for example, data services, augmented reality services, data fusion services, combinations thereof, and/or the like.

In addition, it should be understood that any figures which highlight the functionality and advantages, are presented for example purposes only. The disclosed architecture is sufficiently flexible and configurable, such that it may be utilized in ways other than that shown. For example, the actions listed in any flowchart may be re-ordered or only optionally used in some embodiments.

Further, the purpose of the Abstract of the Disclosure is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract of the Disclosure is not intended to be limiting as to the scope in any way.

Finally, it is the applicant's intent that only claims that include the express language "means for" or "step for" be interpreted under 35 U.S.C. 112. Claims that do not expressly include the phrase "means for" or "step for" are not to be interpreted under 35 U.S.C. 112.

What is claimed is:

1. A method comprising:

receiving, by a policy control function from a mission critical video (MCVideo) application function, a DIAMETER AA-Request (AAR) command comprising:

an attribute value pair (AVP) comprising an MCVideo-identifier identifying an MCVideo service; and a quality of service (QoS) parameter indicating a QoS of the MCVideo service; and sending, by the policy control function to a network function, a Diameter command comprising one or more QoS policies based on the MCVideo-identifier and the QoS parameter.

2. The method of claim 1, wherein:

the DIAMETER AA-Request (AAR) command further comprises a priority of the MCVideo service; and the one or more QoS policies are further based on the priority of the MCVideo service.

3. The method of claim 1, further comprising enforcing, by the policy control function, the one or more QoS policies on a plurality of packets transmitted via an MCVideo bearer.

4. The method of claim 1, further comprising establishing, for an MCVideo application, an MCVideo bearer for a mission critical video call among a plurality of wireless devices comprising:

a first wireless device; and a second wireless device.

5. The method of claim 4, further comprising modifying, by the MCVideo application function, a floor of a floor control from the first wireless device to the second wireless device for the mission critical video call.

6. The method of claim 5, wherein the modifying the floor control is performed by the first wireless device in response to releasing the floor.

7. The method according to claim 1, wherein the QoS parameter indicate a priority.

8. The method of claim 1, wherein a session initiation protocol (SIP) Resource-Priority header field triggers the DIAMETER AAR command.

9. The method of claim 8, wherein the SIP Resource-Priority header field indicates an emergency priority.

10. The method of claim 1, wherein the MCVideo application function resides in at least one of:

a MCVideo application server; and a proxy call session control function.

11. A policy control function device comprising:

one or more processors; and memory storing instructions that, when executed, cause the policy control function device to:

receive, from a mission critical video (MCVideo) application function, a DIAMETER AA-Request (AAR) command comprising:

an attribute value pair (AVP) comprising an MCVideo-identifier identifying an MCVideo service; and a quality of service (QoS) parameter indicating a QoS of the MCVideo service; and send, to a network function, a Diameter command comprising one or more QoS policies based on the MCVideo-identifier and the QoS parameter.

12. The policy control function device of claim 11, wherein:

the DIAMETER AA-Request (AAR) command further comprises a priority of the MCVideo service; and the one or more QoS policies are further based on the priority of the MCVideo service.

13. The policy control function device of claim 11, wherein the instructions, when executed by the one or more processors, further cause the policy control function device to enforce the one or more QoS policies on a plurality of packets transmitted via an MCVideo bearer.

14. The policy control function device of claim 11, wherein the instructions, when executed by the one or more processors, further cause the policy control function device to establish, for an MCVideo application, an MCVideo bearer for a mission critical video call among a plurality of wireless devices comprising:

a first wireless device; and a second wireless device.

15. The policy control function device of claim 14, wherein the instructions, when executed by the one or more processors, further cause the policy control function device to modify, by the MCVideo application function, a floor of a floor control from the first wireless device to the second wireless device for the mission critical video call.

16. The policy control function device of claim 15, wherein the modification of the floor control is performed by the first wireless device in response to releasing the floor.

17. The policy control function device according to claim 11, wherein the QoS parameter indicate a priority.

18. The policy control function device of claim 11, wherein a session initiation protocol (SIP) Resource-Priority header field triggers the DIAMETER AAR command.

19. The policy control function device of claim 18, wherein the SIP Resource-Priority header field indicates an emergency priority.

20. A system comprising:

a mission critical video (MCVideo) application function device; and a policy control function device comprising:

one or more processors; and memory storing instructions that, when executed, cause the policy control function device to:

receive, from the MCVideo application function device, a DIAMETER AA-Request (AAR) command comprising:

an attribute value pair (AVP) comprising an MCVideo-identifier identifying an MCVideo service; and a quality of service (QoS) parameter indicating a QoS of the MCVideo service; and send, to a network function, a Diameter command comprising one or more QoS policies based on the MCVideo-identifier and the QoS parameter.

* * * * *